US011190370B1

(12) United States Patent
Grzegorczyk

(10) Patent No.: US 11,190,370 B1
(45) Date of Patent: Nov. 30, 2021

(54) IDENTIFYING MANUFACTURER-SPECIFIC CONTROLLER-AREA NETWORK DATA

(71) Applicant: Geotab Inc., Oakville (CA)

(72) Inventor: Ian Grzegorczyk, Kitchener (CA)

(73) Assignee: Geotab Inc., Oakville (CA)

( * ) Notice: Subject to any disclaimer, the term of this patent is extended or adjusted under 35 U.S.C. 154(b) by 0 days.

(21) Appl. No.: 17/039,877

(22) Filed: Sep. 30, 2020

Related U.S. Application Data

(60) Provisional application No. 63/068,923, filed on Aug. 21, 2020.

(51) Int. Cl.
*H04L 12/40* (2006.01)
*H04W 4/38* (2018.01)

(52) U.S. Cl.
CPC ............... *H04L 12/40* (2013.01); *H04W 4/38* (2018.02); *H04L 2012/40215* (2013.01); *H04L 2012/40273* (2013.01)

(58) Field of Classification Search
CPC ........... H04L 12/40; H04L 2012/40215; H04L 2012/40273
See application file for complete search history.

(56) References Cited

U.S. PATENT DOCUMENTS 10,124,750 B2 11/2018 Markham
10,696,306 B1 * 6/2020 Benisch .............. B60W 60/001
10,834,083 B2 11/2020 Kishikawa et al.
2015/0371457 A1 * 12/2015 Bakfan ................ G07C 5/0841 701/29.3
2017/0305368 A1 * 10/2017 Markham ............. H04L 9/3263
2018/0225554 A1 * 8/2018 Tawari .................... G06K 9/624
2018/0257663 A1 * 9/2018 Jiang ...................... G06F 11/079
2018/0316680 A1 * 11/2018 Kishikawa .............. H04L 12/40
2020/0213622 A1 7/2020 Xu et al.
2020/0294401 A1 * 9/2020 Kerecsen ............. G05D 1/0287

(Continued)

FOREIGN PATENT DOCUMENTS

CN 109947020 A 6/2019
CN 110291499 A 9/2019
CN 110891023 A 3/2020

(Continued)

OTHER PUBLICATIONS

Adhav et al., A review: Control area network (CAN) based Intelligent vehicle system for driver assistance using advanced RISC machines (ARM). 2015 International Conference on Pervasive Computing (ICPC). Jan. 8, 2015:1-3.

(Continued)

*Primary Examiner* — Philip J Chea
*Assistant Examiner* — Hassan A Khan
(74) *Attorney, Agent, or Firm* — Wolf, Greenfield & Sacks, P.C.

(57) ABSTRACT

Methods and systems for identifying manufacturer-specific controller-area (CAN) data for a vehicle type are provided. Manufacturer-specific CAN data may be identified by processing defined CAN data having a correlation relationship with the target data and undefined manufacturer-specific CAN data for determining if there is a correlation relationship therebetween. Also provided are methods and systems for identifying and automatically collecting manufacturer-specific CAN data for a vehicle type.

20 Claims, 40 Drawing Sheets

(56) References Cited

U.S. PATENT DOCUMENTS

| | | | |
|---|---|---|---|
| 2020/0342226 | A1 | 10/2020 | Bengtson et al. |
| 2021/0114534 | A1* | 4/2021 | Cha ..................... B60R 16/0232 |

FOREIGN PATENT DOCUMENTS

| | | | |
|---|---|---|---|
| CN | 111383361 A | | 7/2020 |
| JP | 2017056805 A | | 3/2017 |
| JP | WO 2019168167 A1 | | 4/2020 |

OTHER PUBLICATIONS

Liu et al. Essential feature extraction of driving behavior using a deep learning method. 2015 IEEE Intelligent Vehicles Symposium (IV), Jun. 28, 2015:1054-60.

Matus et al., Implementation of a low-cost vehicular VLC system and CAN bus interface. 2018 11th International Symposium on Communication Systems, Networks & Digital Signal Processing (CSNDSP). Jul. 18, 2018:1-5.

Sridevi et al., Vehicle identification based on the model. 2017 IEEE 7th International Advance Computing Conference (IACC). Jan. 5, 2017:566-71.

Kongezos et al., Wireless communication between A.G.V.'s (autonomous guided vehicles) and the industrial network C.A.N. (controller area network). Proceedings of the 2002 IEEE International Conference on Robotics and Automation (Cat. No. 02CH37292). May 11, 2002;1:434-437.

Murvay et al., Source identification using signal characteristics in controller area networks. IEEE Signal Processing Letters. Apr. 2014;21(4):395-9.

Yellambalase et al., Automatic node discovery in CAN (Controller Area Network) controllers using reserved identifier bits. 2007 IEEE Instrumentation & Measurement Technology Conference (IMTC 2007). May 1, 2007:1-3.

U.S. Appl. No. 17/039,757, filed Sep. 30, 2020, Grzegorczyk.

U.S. Appl. No. 17/039,792, filed Sep. 30, 2020, Grzegorczyk.

U.S. Appl. No. 17/039,836, filed Sep. 30, 2020, Grzegorczyk.

U.S. Appl. No. 17/039,910, filed Sep. 30, 2020, Grzegorczyk.

Grzegorczyk, Method for identifying manufacturer-specific controller-area network data. Co-pending U.S. Appl. No. 17/039,757, filed Sep. 30, 2020.

Grzegorczyk, System for identifying manufacturer-specific controller-area network data. Co-pending U.S. Appl. No. 17/039,792, filed Sep. 30, 2020.

Grzegorczyk, Method and system for collecting manufacturer-specific controller-area network data. Co-pending U.S. Appl. No. 17/039,836, filed Sep. 30, 2020.

Grzegorczyk, Telematics system for identifying manufacturer-specific controller-area network data. Co-pending U.S. Appl. No. 17/039,910, filed Sep. 30, 2020.

* cited by examiner 800 804 807

| | First Ref Data | Payload Data |
|---|---|---|
| Slot 1 | 804a | 807a |
| Slot 2 | xx | xx |
| Slot 3 | xx | xx |
| Slot 4 | xx | xx |
| Slot 5 | xx | xx |
| Slot 6 | xx | xx |
| Slot 7 | xx | xx |

800

| | First Ref Data | Payload Data |
|---|---|---|
| Slot 1 | 804d | 807d |
| Slot 2 | 804c | 807c |
| Slot 3 | 804b | 807b |
| Slot 4 | 804a | 807a |
| Slot 5 | xx | xx |
| Slot 6 | xx | xx |
| Slot 7 | xx | xx |

800

| | First Ref Data | Payload Data |
|---|---|---|
| Slot 1 | 804g | 807g |
| Slot 2 | 804f | 807f |
| Slot 3 | 804e | 807e |
| Slot 4 | 804d | 807d |
| Slot 5 | 804c | 807c |
| Slot 6 | 804b | 807b |
| Slot 7 | 804a | 807a |

901

| Slot | Engine Load Data (902) | Hex (903) | Dec | Engine Load (Dec*100/255) (904) | Relative % Load Increase (905) |
|---|---|---|---|---|---|
| Slot 1 | 804g | 0A | 10 | 3.9% | - |
| Slot 2 | 804f | 0F | 15 | 5.9% | 51% |
| Slot 3 | 804e | 17 | 23 | 9.0% | 53% |
| Slot 4 | 804d | 24 | 36 | 14.1% | 57% |
| Slot 5 | 804c | 38 | 56 | 22.0% | 55% |
| Slot 6 | 804b | 64 | 100 | 39.2% | 78% |
| Slot 7 | 804a | 96 | 150 | 58.8% | 50% |

| Slot | Bytes | Hex (907) | Dec (908) | Relative Increase (910) |
|---|---|---|---|---|
| 1 | 807ga | 0A | 10 | - |
| 2 | 807fa | 0C | 12 | 20% |
| 3 | 807ea | 0F | 15 | 25% |
| 4 | 807da | 19 | 25 | 67% |
| 5 | 807ca | 23 | 35 | 40% |
| 6 | 807ba | 32 | 50 | 43% |
| 7 | 807aa | 3C | 60 | 20% |

| Slot | Bytes | Hex (911) | Dec (912) | Relative Increase (913) |
|---|---|---|---|---|
| 1 | 807gd, 807ge | 00 0A | 10 | |
| 2 | 807fd, 807fe | 00 0C | 12 | 20% |
| 3 | 807ed, 807ee | 00 0F | 15 | 25% |
| 4 | 807dd, 807de | 00 19 | 25 | 67% |
| 5 | 807cd, 807ce | 00 23 | 35 | 40% |
| 6 | 807bd, 807be | 00 32 | 50 | 43% |
| 7 | 807ad, 807ae | 00 3C | 60 | 20% |

| Slot | Bytes | Hex (915) | Dec (916) | Relative Increase (917) |
|---|---|---|---|---|
| 1 | 807ge, 807gd | 0A 00 | 2560 | |
| 2 | 807fe, 807fd | 0C 00 | 3072 | 20% |
| 3 | 807ee, 807ed | 0F 00 | 3840 | 25% |
| 4 | 807de, 807dd | 19 00 | 6400 | 67% |
| 5 | 807ce, 807cd | 23 00 | 8960 | 40% |
| 6 | 807be, 807bd | 32 00 | 12800 | 43% |
| 7 | 807ae, 807ad | 3C 00 | 15360 | 20% |

| | Byte position | Second Counter |
|---|---|---|
| 1001a | [0] | Second counter[0] = 3 |
| 1001b | [3,4] | Second counter[3,4] = 5 |
| 1001c | [4,3] | Second counter[4,3] = 44 |

| Subset Byte position | Subset Byte position | Subset Byte position | Subset Byte position | Subset Byte position |
|---|---|---|---|---|
| [0] | [0,1] | [1,0] | [0,1,2] | [2,1,0] |
| [1] | [1,2] | [2,1] | [1,2,3] | [3,2,1] |
| [2] | [2,3] | [3,2] | [2,3,4] | [4,3,2] |
| [3] | [3,4] | [4,3] | [3,4,5] | [5,4,3] |
| [4] | [4,5] | [5,4] | [4,5,6] | [6,5,4] |
| [5] | [5,6] | [6,5] | [5,6,7] | [7,6,5] |
| [6] | [6,7] | [7,6] | - | - |
| [7] | - | - | - | - |

| Byte position | Second Counter |
|---|---|
| [4,3] | 44 |

| CAN ID | Byte position | Second Counter |
|---|---|---|
| 0x400 | [4,3] | 44 |

| Slot | Engine Load Data | Hex (1202) | Dec (1203) | Engine Load (Dec*100/255) (1204) | Difference (1205) |
|---|---|---|---|---|---|
| 1 | 804g | 0A | 10 | 3.92% | 0.78 |
| 2 | 804f | 0B | 11 | 4.31% | 0.39 |
| 3 | 804e | 0C | 12 | 4.71% | 0.01 |
| 4 | 804d | 0D | 13 | 5.10% | 0.40 |
| 5 | 804c | 0E | 14 | 5.49% | 0.79 |
| 6 | 804b | 0E | 14 | 5.49% | 0.79 |
| 7 | 804a | 0F | 10 | 3.92% | 0.78 |

1220 Avg. engine load = 4.7%

| Slot | Bytes | Hex (1207) | Dec (1208) | % Difference (1210) |
|---|---|---|---|---|
| 1 | 807ga | AA | 170 | 22% |
| 2 | 807fa | BE | 190 | 9% |
| 3 | 807ea | CA | 202 | 2.5% |
| 4 | 807da | EE | 238 | 13% |
| 5 | 807ca | AB | 171 | 21% |
| 6 | 807ba | FF | 255 | 19% |
| 7 | 807aa | DE | 222 | 6.8% |

1222 Avg = 207

| | Byte position | Fourth Counter |
|---|---|---|
| 1301a | [0] | Fourth counter[0] = 10 |
| 1301b | [5,6] | Fourth counter[5,6] = 4 |
| 1301c | [4,3] | Fourth counter[4,3] = 47 |

| Subset Byte position | Subset Byte position | Subset Byte position | Subset Byte position | Subset Byte position |
|---|---|---|---|---|
| [0] | [0,1] | [1,0] | [0,1,2] | [2,1,0] |
| [1] | [1,2] | [2,1] | [1,2,3] | [3,2,1] |
| [2] | [2,3] | [3,2] | [2,3,4] | [4,3,2] |
| [3] | [3,4] | [4,3] | [3,4,5] | [5,4,3] |
| [4] | [4,5] | [5,4] | [4,5,6] | [6,5,4] |
| [5] | [5,6] | [6,5] | [5,6,7] | [7,6,5] |
| [6] | [6,7] | [7,6] | - | - |
| [7] | - | - | - | - |

| Byte position | Fourth Counter |
|---|---|
| [4,3] | 47 |

| CAN ID | Byte position | Second Counter | Fourth Counter |
|---|---|---|---|
| 0x400 | [4,3] | 44 | 47 |

| | First Ref Data | Payload Data | Second Ref Data |
|---|---|---|---|
| Slot 1 | 804g | 807g | 1507g |
| Slot 2 | 804f | 807f | 1507f |
| Slot 3 | 804e | 807e | 1507e |
| Slot 4 | 804d | 807d | 1507d |
| Slot 5 | 804c | 807c | 1507c |
| Slot 6 | 804b | 807b | 1507b |
| Slot 7 | 804a | 807a | 1507a |

1520

Avg. speed = 110 km/hr

FIG. 15A 1512 1513 1514

| Slot | Subset | Hex | Dec km/h | Difference relative to average km/h |
|---|---|---|---|---|
| 1 | 1507g | 6D | 109 | 1 |
| 2 | 1507f | 6E | 110 | 0 |
| 3 | 1507e | 6F | 111 | 1 |
| 4 | 1507d | 6e | 110 | 0 |
| 5 | 1507c | 6F | 111 | 1 |
| 6 | 1507b | 6e | 110 | 0 |
| 7 | 1507a | 6d | 109 | 1 |

| CAN ID | Byte Position | Vehicle Type ID |
|---|---|---|
| 0x400 | [4,3] | 6002 |
| 0x1A4 | [6] | 4628 |
| 0x1A4 | [6] | 4628 |
| 0x400 | [4,3] | 6002 |
| 0x60C | [1,2] | 4487 |
| 0x400 | [4,3] | 6002 |
| 0x400 | [4,3] | 6002 |
| 0x022 | [0,1] | 6002 |
| 0x67E | [5] | 5923 |
| 0x1A4 | [6] | 4628 |
| 0x1A4 | [6] | 4628 |
| 0x60C | [1,2] | 4487 |
| 0x67E | [5] | 5923 |
| 0x67E | [5] | 5923 |
| 0x60C | [1,2] | 4487 |
| 0x400 | [4,3] | 6002 |
| 0x60C | [1,2] | 4487 |
| 0x400 | [4,3] | 6002 |
| 0x67E | [5] | 5923 |

| Vehicle Type ID | Make | Model | Year |
|---|---|---|---|
| 5674 | Toyota | Corolla | 2017 |
| 5923 | Honda | Civic | 2018 |
| 4628 | Nissan | Ultima | 2016 |
| 4487 | Volkswagen | Jetta | 2016 |
| 6002 | Toyota | Corolla | 2020 |
| 5983 | Honda | Civic | 2020 |

| CAN ID | Byte Position |
| --- | --- |
| 0x400 | [4,3] |
| 0x400 | [4,3] |
| 0x400 | [4,3] |
| 0x400 | [4,3] |
| 0x022 | [0,1] |
| 0x400 | [4,3] |
| 0x400 | [4,3] |

| Fuel Rate Data for 2020 Toyota Corolla | |
| --- | --- |
| CAN ID | Byte Position |
| 0x400 | [4,3] |

| | 2202 Engine Load Data | 2204 RPM Data | 2207 CAN Payload Data |
|---|---|---|---|
| Slot 1 | 2202-1 | 2204-1 | 2207-1 |
| Slot 2 | 2202-2 | 2204-2 | 2207-2 |
| Slot 3 | 2202-3 | 2204-3 | 2207-3 |
| Slot 4 | 2202-4 | 2204-4 | 2207-4 |
| Slot 5 | 2202-5 | 2204-5 | 2207-5 |
| ... | 2202-... | 2204-... | 2207-... |
| Slot 12 | 2202-12 | 2204-12 | 2207-12 |

| Product Data (Engine Load Data* RPM Data) |
|---|
| 2210-1 |
| 2210-2 |
| 2210-3 |
| 2210-4 |
| 2210-5 |
| 2210-... |
| 2210-12 |

FIG. 22C 2207-z-1,0

| | [1] | [0] |
|---|---|---|
| Slot 1 | 2207-1-4 | 2207-1-3 |
| Slot 2 | 2207-2-4 | 2207-2-3 |
| Slot 3 | 2207-3-4 | 2207-3-3 |
| Slot 4 | 2207-4-4 | 2207-4-3 |
| Slot 5 | 2207-5-4 | 2207-5-3 |
| ... | 2207-...-4 | 2207-...-3 |
| Slot 12 | 2207-12-4 | 2207-12-3 |

FIG. 22D

2207 — 2207-z-0,1 (spanning [0] and [1]); 2207-z-0 (column [0])

| | [0] | [1] | [2] | [3] | [4] | [5] | [6] | [7] | |
|---|---|---|---|---|---|---|---|---|---|
| Slot 1 | 2207-1-0 | 2207-1-1 | 2207-1-2 | 2207-1-3 | 2207-1-4 | 2207-1-5 | 2207-1-6 | 2207-1-7 | 2207-1 |
| Slot 2 | 2207-2-0 | 2207-2-1 | 2207-2-2 | 2207-2-3 | 2207-2-4 | 2207-2-5 | 2207-2-6 | 2207-2-7 | 2207-2 |
| Slot 3 | 2207-3-0 | 2207-3-1 | 2207-3-2 | 2207-3-3 | 2207-3-4 | 2207-3-5 | 2207-3-6 | 2207-3-7 | 2207-3 |
| Slot 4 | 2207-4-0 | 2207-4-1 | 2207-4-2 | 2207-4-3 | 2207-4-4 | 2207-4-5 | 2207-4-6 | 2207-4-7 | 2207-4 |
| Slot 5 | 2207-5-0 | 2207-5-1 | 2207-5-2 | 2207-5-3 | 2207-5-4 | 2207-5-5 | 2207-5-6 | 2207-5-7 | 2207-5 |
| ... | 2207-...-0 | 2207-...-1 | 2207-...-2 | 2207-...-3 | 2207-...-4 | 2207-...-5 | 2207-...-6 | 2207-...-7 | 2207-... |
| Slot 12 | 2207-12-0 | 2207-12-1 | 2207-12-2 | 2207-12-3 | 2207-12-4 | 2207-12-5 | 2207-12-6 | 2207-12-7 | 2207-12 |

| Engine Load | RPM |
|---|---|
| 110.4 | 7530 |
| 113.8 | 7196 |
| 76 | 5488 |
| 57.4 | 4966 |
| 54.8 | 3310 |
| 53.4 | 6563.2 |
| 54.8 | 3402.4 |
| 92.2 | 3608.4 |
| 77.2 | 8845.2 |
| 71 | 4945.6 |
| 83.8 | 7392.4 |
| 54.2 | 6355.2 |

| Product Data Value (EL*RPM) |
|---|
| 831312 |
| 818905 |
| 417088 |
| 285048 |
| 181388 |
| 350475 |
| 186452 |
| 332694 |
| 682849 |
| 351138 |
| 619483 |
| 344452 |

| 1st Data Values $(xi - \overline{x})^2$ |
|---|
| 145317246942.27 |
| 136011812367.54 |
| 1090254801.25 |
| 27244343634.74 |
| 72209904543.92 |
| 9926560664.12 |
| 69514215649.44 |
| 13785701418.25 |
| 54169040273.92 |
| 9794943455.95 |
| 28688267767.91 |
| 11163014243.36 |

FIG. 23C 2307 2307-0 2307-0-1

| Slot | [0] |
|---|---|
| 1 | 45 |
| 2 | 49 |
| 3 | 25 |
| 4 | 8.2 |
| 5 | 2 |
| 6 | 13.6 |
| 7 | 0 |
| 8 | 13.8 |
| 9 | 39.2 |
| 10 | 19.4 |
| 11 | 35.4 |
| 12 | 17.2 |

FIG. 23D 2309 2309-1

| 2nd Data Values $(yi - \bar{y})^2$ |
|---|
| 514.53 |
| 712.00 |
| 7.20 |
| 199.28 |
| 412.77 |
| 75.98 |
| 498.03 |
| 72.53 |
| 285.05 |
| 8.51 |
| 171.17 |
| 26.18 |

FIG. 23E 2312 2312-1

| 3rd Data Values $(xi - \bar{x})*(yi - \bar{y})$ |
|---|
| 8646999.93 |
| 9840754.45 |
| -88601.00 |
| 2330077.33 |
| 5459474.49 |
| 868460.04 |
| 5883911.61 |
| 999963.35 |
| 3929468.08 |
| 288660.77 |
| 2216004.15 |
| 540602.27 |

| Subset Byte Position | | First Correlation Coefficient |
|---|---|---|
| [0] | 2400_0 | .90 |
| [1] | 2400_1 | .45 |
| [2] | 2400_2 | .72 |
| [3] | 2400_3 | .45 |
| [4] | 2400_4 | .10 |
| [5] | 2400_5 | .36 |
| [6] | 2400_6 | .80 |
| [7] | 2400_7 | .66 |
| [0,1] | 2400_01 | .45 |
| [1,2] | 2400_12 | .91 |
| [2,3] | 2400_23 | .53 |
| [3,4] | 2400_34 | 72 |
| [4,5] | 2400_45 | .64 |
| [5,6] | 2400_56 | .27 |
| [6,7] | 2400_67 | .22 |
| [1,0] | 2400_10 | .40 |
| [2,1] | 2400_21 | .19 |
| [3,2] | 2400_32 | .34 |
| [4,3] | 2400_43 | .08 |
| [5,4] | 2400_54 | .92 |
| [6,5] | 2400_65 | .28 |
| [7,6] | 2400_76 | .13 |

| CAN ID | Byte position | r1 |
|---|---|---|
| 0x400 | [0] | .90 |
| 0x400 | [1,2] | .91 |
| 0x400 | [5,4] | .92 |

| | |
|---|---|
| 2600A_0 | 0.86 |
| 2600A_1 | 0.41 |
| 2600A_2 | 0.78 |
| 2600A_3 | 0.47 |
| 2600A_4 | 0.04 |
| 2600A_5 | 0.4 |
| 2600A_6 | 0.82 |
| 2600A_7 | 0.65 |
| 2600A_01 | 0.43 |
| 2600A_12 | 0.88 |
| 2600A_23 | 0.6 |
| 2600A_34 | 0.73 |
| 2600A_45 | 0.62 |
| 2600A_56 | 0.26 |
| 2600A_67 | 0.21 |
| 2600A_10 | 0.48 |
| 2600A_21 | 0.19 |
| 2600A_32 | 0.31 |
| 2600A_43 | 0.03 |
| 2600A_54 | 0.91 |
| 2600A_65 | 0.22 |
| 2600A_76 | 0.12 |

| | |
|---|---|
| 2600B_0 | 0.87 |
| 2600B_1 | 0.42 |
| 2600B_2 | 0.79 |
| 2600B_3 | 0.42 |
| 2600B_4 | 0.02 |
| 2600B_5 | 0.36 |
| 2600B_6 | 0.87 |
| 2600B_7 | 0.7 |
| 2600B_01 | 0.49 |
| 2600B_12 | 0.87 |
| 2600B_23 | 0.6 |
| 2600B_34 | 0.78 |
| 2600B_45 | 0.63 |
| 2600B_56 | 0.26 |
| 2600B_67 | 0.22 |
| 2600B_10 | 0.48 |
| 2600B_21 | 0.17 |
| 2600B_32 | 0.3 |
| 2600B_43 | 0.05 |
| 2600B_54 | 0.91 |
| 2600B_65 | 0.23 |
| 2600B_76 | 0.17 |

| | |
|---|---|
| 2600C_0 | 0.86 |
| 2600C_1 | 0.88 |
| 2600C_2 | 0.87 |
| 2600C_3 | 0.9 |
| 2600C_4 | 0.93 |
| 2600C_5 | 0.93 |
| 2600C_6 | 0.88 |
| 2600C_7 | 0.88 |
| 2600C_01 | 0.94 |
| 2600C_12 | 0.93 |
| 2600C_23 | 0.88 |
| 2600C_34 | 0.9 |
| 2600C_45 | 0.91 |
| 2600C_56 | 0.85 |
| 2600C_67 | 0.88 |
| 2600C_10 | 0.94 |
| 2600C_21 | 0.87 |
| 2600C_32 | 0.93 |
| 2600C_43 | 0.94 |
| 2600C_54 | 0.93 |
| 2600C_65 | 0.95 |
| 2600C_76 | 0.93 |

| | |
|---|---|
| 2600D_0 | 0.94 |
| 2600D_1 | 0.45 |
| 2600D_2 | 0.73 |
| 2600D_3 | 0.42 |
| 2600D_4 | 0.06 |
| 2600D_5 | 0.33 |
| 2600D_6 | 0.81 |
| 2600D_7 | 0.66 |
| 2600D_01 | 0.47 |
| 2600D_12 | 0.88 |
| 2600D_23 | 0.52 |
| 2600D_34 | 0.74 |
| 2600D_45 | 0.64 |
| 2600D_56 | 0.27 |
| 2600D_67 | 0.23 |
| 2600D_10 | 0.4 |
| 2600D_21 | 0.2 |
| 2600D_32 | 0.3 |
| 2600D_43 | 0.02 |
| 2600D_54 | 0.93 |
| 2600D_65 | 0.28 |
| 2600D_76 | 0.12 |

| | |
|---|---|
| 2600E_0 | 0.97 |
| 2600E_1 | 0.42 |
| 2600E_2 | 0.78 |
| 2600E_3 | 0.46 |
| 2600E_4 | 0.07 |
| 2600E_5 | 0.34 |
| 2600E_6 | 0.81 |
| 2600E_7 | 0.69 |
| 2600E_01 | 0.45 |
| 2600E_12 | 0.99 |
| 2600E_23 | 0.5 |
| 2600E_34 | 0.77 |
| 2600E_45 | 0.63 |
| 2600E_56 | 0.3 |
| 2600E_67 | 0.3 |
| 2600E_10 | 0.44 |
| 2600E_21 | 0.19 |
| 2600E_32 | 0.39 |
| 2600E_43 | 0 |
| 2600E_54 | 0.92 |
| 2600E_65 | 0.28 |
| 2600E_76 | 0.18 |

| | |
|---|---|
| 2600F_0 | 0.9 |
| 2600F_1 | 0.52 |
| 2600F_2 | 0.79 |
| 2600F_3 | 0.53 |
| 2600F_4 | 0.22 |
| 2600F_5 | 0.47 |
| 2600F_6 | 0.84 |
| 2600F_7 | 0.72 |
| 2600F_01 | 0.56 |
| 2600F_12 | 0.91 |
| 2600F_23 | 0.62 |
| 2600F_34 | 0.78 |
| 2600F_45 | 0.69 |
| 2600F_56 | 0.39 |
| 2600F_67 | 0.37 |
| 2600F_10 | 0.55 |
| 2600F_21 | 0.32 |
| 2600F_32 | 0.45 |
| 2600F_43 | 0.21 |
| 2600F_54 | 0.92 |
| 2600F_65 | 0.39 |
| 2600F_76 | 0.30 |

| $(zi - \bar{z})^2$ |
|---|
| 1259.07 |
| 1511.91 |
| 1.17 |
| 306.83 |
| 404.68 |
| 462.97 |
| 404.68 |
| 298.71 |
| 5.21 |
| 15.34 |
| 78.91 |
| 429.18 |

| $(zi - \bar{z}) * (yi - \bar{y})$ |
|---|
| 804.88 |
| 1037.54 |
| 2.91 |
| 247.28 |
| 408.70 |
| 187.55 |
| 448.94 |
| -147.20 |
| 38.55 |
| 11.42 |
| 116.22 |
| 106.00 |

| Subset Byte Position | | Second Correlation Coefficient |
|---|---|---|
| [0] | 2806_0 | .44 |
| [1] | 2806_1 | .45 |
| [2] | 2806_2 | .23 |
| [3] | 2806_3 | .05 |
| [4] | 2806_4 | .13 |
| [5] | 2806_5 | .11 |
| [6] | 2806_6 | .45 |
| [7] | 2806_7 | .67 |
| [0,1] | 2806_01 | .31 |
| [1,2] | 2806_12 | .99 |
| [2,3] | 2806_23 | .72 |
| [3,4] | 2806_34 | .45 |
| [4,5] | 2806_45 | .10 |
| [5,6] | 2806_56 | .36 |
| [6,7] | 2806_67 | .80 |
| [1,0] | 2806_10 | .66 |
| [2,1] | 2806_21 | .45 |
| [3,2] | 2806_32 | .87 |
| [4,3] | 2806_43 | .53 |
| [5,4] | 2806_54 | .98 |
| [6,5] | 2806_65 | .64 |
| [7,6] | 2806_76 | .27 |

| CAN ID | Byte position | r1 |
|---|---|---|
| 0x400 | [0] | .90 |

| | |
|---|---|
| 3000A_0 | 0.41 |
| 3000A_1 | 1 |
| 3000A_2 | 0.95 |
| 3000A_3 | 0.97 |
| 3000A_4 | 0.99 |
| 3000A_5 | 0.92 |
| 3000A_6 | 0.96 |
| 3000A_7 | 0.89 |
| 3000A_01 | 0.95 |
| 3000A_12 | 0.99 |
| 3000A_23 | 1 |
| 3000A_34 | 0.95 |
| 3000A_45 | 0.97 |
| 3000A_56 | 0.99 |
| 3000A_67 | 0.92 |
| 3000A_10 | 0.96 |
| 3000A_21 | 0.89 |
| 3000A_32 | 0.95 |
| 3000A_43 | 0.99 |
| 3000A_54 | 0.98 |
| 3000A_65 | 0.95 |
| 3000A_76 | 0.95 |

| | |
|---|---|
| 3000B_0 | 0.42 |
| 3000B_1 | 0.99 |
| 3000B_2 | 0.95 |
| 3000B_3 | 0.94 |
| 3000B_4 | 0.96 |
| 3000B_5 | 0.94 |
| 3000B_6 | 1 |
| 3000B_7 | 0.97 |
| 3000B_01 | 0.94 |
| 3000B_12 | 0.99 |
| 3000B_23 | 0.99 |
| 3000B_34 | 0.95 |
| 3000B_45 | 0.94 |
| 3000B_56 | 0.96 |
| 3000B_67 | 0.94 |
| 3000B_10 | 1 |
| 3000B_21 | 0.97 |
| 3000B_32 | 0.94 |
| 3000B_43 | 0.99 |
| 3000B_54 | 0.95 |
| 3000B_65 | 0.94 |
| 3000B_76 | 0.94 |

| | |
|---|---|
| 3000C_0 | 0.5 |
| 3000C_1 | 0.88 |
| 3000C_2 | 0.98 |
| 3000C_3 | 0.99 |
| 3000C_4 | 0.97 |
| 3000C_5 | 0.99 |
| 3000C_6 | 0.9 |
| 3000C_7 | 0.99 |
| 3000C_01 | 0.99 |
| 3000C_12 | 1 |
| 3000C_23 | 0.88 |
| 3000C_34 | 0.98 |
| 3000C_45 | 0.99 |
| 3000C_56 | 0.97 |
| 3000C_67 | 0.99 |
| 3000C_10 | 0.9 |
| 3000C_21 | 0.99 |
| 3000C_32 | 0.99 |
| 3000C_43 | 1 |
| 3000C_54 | 1 |
| 3000C_65 | 0.99 |
| 3000C_76 | 0.95 |

| | |
|---|---|
| 3000D_0 | 0.5 |
| 3000D_1 | 0.88 |
| 3000D_2 | 0.98 |
| 3000D_3 | 0.99 |
| 3000D_4 | 0.97 |
| 3000D_5 | 0.99 |
| 3000D_6 | 0.9 |
| 3000D_7 | 0.99 |
| 3000D_01 | 0.99 |
| 3000D_12 | 1 |
| 3000D_23 | 0.88 |
| 3000D_34 | 0.98 |
| 3000D_45 | 0.99 |
| 3000D_56 | 0.97 |
| 3000D_67 | 0.99 |
| 3000D_10 | 0.9 |
| 3000D_21 | 0.99 |
| 3000D_32 | 0.99 |
| 3000D_43 | 1 |
| 3000D_54 | 1 |
| 3000D_65 | 0.99 |
| 3000D_76 | 0.95 |

| | |
|---|---|
| 3000E_0 | 0.42 |
| 3000E_1 | 0.99 |
| 3000E_2 | 0.95 |
| 3000E_3 | 0.96 |
| 3000E_4 | 0.94 |
| 3000E_5 | 0.95 |
| 3000E_6 | 0.95 |
| 3000E_7 | 0.95 |
| 3000E_01 | 0.98 |
| 3000E_12 | 0.99 |
| 3000E_23 | 0.95 |
| 3000E_34 | 0.95 |
| 3000E_45 | 0.96 |
| 3000E_56 | 0.94 |
| 3000E_67 | 0.95 |
| 3000E_10 | 0.95 |
| 3000E_21 | 0.95 |
| 3000E_32 | 0.98 |
| 3000E_43 | 0.99 |
| 3000E_54 | 1 |
| 3000E_65 | 0.95 |
| 3000E_76 | 0.99 |

| | |
|---|---|
| 3000F_0 | 0.45 |
| 3000F_1 | 0.95 |
| 3000F_2 | 0.96 |
| 3000F_3 | 0.97 |
| 3000F_4 | 0.97 |
| 3000F_5 | 0.96 |
| 3000F_6 | 0.94 |
| 3000F_7 | 0.96 |
| 3000F_01 | 0.97 |
| 3000F_12 | 0.99 |
| 3000F_23 | 0.94 |
| 3000F_34 | 0.96 |
| 3000F_45 | 0.97 |
| 3000F_56 | 0.97 |
| 3000F_67 | 0.96 |
| 3000F_10 | 0.94 |
| 3000F_21 | 0.96 |
| 3000F_32 | 0.97 |
| 3000F_43 | 0.99 |
| 3000F_54 | 0.99 |
| 3000F_65 | 0.96 |
| 3000F_76 | 0.96 |

FIG. 30F

IDENTIFYING MANUFACTURER-SPECIFIC CONTROLLER-AREA NETWORK DATA

RELATED APPLICATIONS

This application claims the benefit under 35 U.S.C. § 119(e) to U.S. Provisional Application Ser. No. 63/068,923, filed on Aug. 21, 2020, which is herein incorporated by reference in its entirety.

BACKGROUND

Traffic data collection and analysis are routinely conducted by road agencies, for example, government organizations responsible for traffic management, road maintenance and/or road network planning. Road agencies may obtain measurements of traffic metrics, (e.g., traffic performance), from traffic data, to understand current traffic conditions at a roadway section of interest, such as a portion of a road or a traffic junction—a location where multiple roads intersect, allowing traffic to change from one road to another (e.g., intersection, roundabout, interchange). Traffic metrics are generally used to ascertain an existing, or to predict a future, need of changes to roadway infrastructure and/or traffic control equipment. Examples of traffic metrics include traffic volume, average vehicle speed, vehicle delay, among others.

Controller-area network messages transmitted between nodes on a vehicle CAN bus are often monitored by 3$^{rd}$ party devices for diagnostic purposes and for collection of vehicle operating data, for example, for fleet management. Although standardized CAN messages carrying specific vehicle operating data have been adopted by industry, most vehicle manufacturers also employ non-standardized CAN messages for communication between nodes on a vehicle CAN bus. Such manufacturer-specific CAN messages may carry vehicle operating data that would be useful for fleet management.

Manufacturer-specific CAN messages carrying specific vehicle operating data vary not only between manufacturers, but often between different vehicle models of the same make, and even between different years of the same model. Furthermore, manufacturer-specific CAN messages carrying specific vehicle operating data may even be different for a vehicle of the same make, model and year depending on when or where the vehicle was manufactured.

A common technique currently employed for reverse engineering of manufacturer-specific CAN messages requires a technician to gain access to each vehicle to collect and analyze CAN data. Using such a method to identify specific vehicle operating data carried in manufacturer-specific CAN messages for each of the plethora of unique vehicles is manually intensive, time consuming and prone to human error.

SUMMARY

According to a broad aspect there is a method for identifying manufacturer-specific controller area network (CAN) data for a first vehicle type of a plurality of vehicle types comprising: a plurality of first subprocesses, a first subprocess comprising, collecting CAN payload data corresponding to a first CAN ID, collecting first reference data corresponding to a second CAN ID having at least a first correlation relationship with the manufacturer-specific CAN data, storing the first reference data and the CAN payload data in a rolling buffer, following receipt of new first reference data and new CAN payload data, determining whether the first reference data present in the rolling buffer meets a first criterion, in response to determining the first reference data present in the rolling buffer meeting the first criterion, determining whether one or more first subsets of the CAN payload data present in the rolling buffer meets a second criterion, each of the one or more first subsets occupying a first byte position in each slot of the rolling buffer, dependent on first reference data meeting the first criterion exceeding a first counting threshold, for each of the one or more first subsets meeting the second criterion exceeding a second counting threshold, forming first position data indicative of the first byte position in each slot of the rolling buffer occupied thereby, forming first candidate data indicative of a first candidate of the manufacturer-specific CAN data corresponding to the first position data and the first CAN ID, a second subprocess comprising, selecting a subset of a plurality of the first candidate data corresponding to the first vehicle type to form second candidate data, and selecting from the second candidate data a second candidate, and generating identification data corresponding to the identity of the manufacturer-specific CAN data for the first vehicle type, the identification data indicative of a manufacturer-specific CAN data byte position and corresponding manufacturer-specific CAN data CAN ID associated with the second candidate data.

Identifying manufacturer-specific controller area network (CAN) data for a first vehicle type of a plurality of vehicle types may include reiterating the plurality of first subprocesses for a plurality of first CAN IDs. The first byte position may include a plurality of byte positions. The first criterion and the second criterion may be indicative of the at least first correlation relationship. Determining whether the first reference data present in the rolling buffer meets a first criterion may comprise determining whether the first reference data in each slot in the rolling buffer exceeds an immediately previously received first reference data by at least a first predefined threshold. Determining whether the first reference data present in the rolling buffer meets a first criterion may comprise determining whether a value represented by the first reference data in each slot in the rolling buffer exceeds a value represented by an immediately previously received first reference data by at least a first predefined threshold. Determining one or more first subsets of the CAN payload data meets a second criterion may comprise determining for each subset thereof, whether a difference between each consecutive pair of bytes in the first byte position of the rolling buffer exceeds a second predefined threshold. Collecting first reference data having at least a first correlation relationship with the manufacturer-specific CAN data may comprise collecting first reference data having a first correlation relationship with the manufacturer-specific CAN data and collecting first reference data having a second correlation relationship with the manufacturer-specific CAN data. The first reference data may include first reference data corresponding to a second CAN ID and second reference data corresponding to a third CAN ID, the first reference data and the second reference data having at least a first correlation relationship with the manufacturer-specific CAN data. Collecting first reference data having at least a first correlation relationship with the manufacturer-specific CAN data may include collecting first reference data and second reference data having a first correlation relationship with the manufacturer-specific CAN data.

Identifying manufacturer-specific controller area network (CAN) data for a first vehicle type of a plurality of vehicle types may further include, following receipt of the new first reference data and the new CAN payload data, determining whether the first reference data present in the rolling buffer meets a third criterion, in response to determining the first reference data present in the rolling buffer meeting the third criterion, determining whether one or more second subsets of the CAN payload data present in the rolling buffer meets a fourth criterion, each of the one or more second subsets occupying a second byte position in each slot of the rolling buffer, dependent on the first reference data meeting a third criterion exceeding a third counting threshold, for each of the one or more second subsets meeting the fourth criterion exceeding a fourth counting threshold, forming second position data indicative of the second byte position in each slot of the rolling buffer occupied thereby, and wherein forming first candidate data indicative of the first position data and the first CAN ID comprises forming first candidate dependent on the first byte position of the first position data and the second byte position of the second position data being same, and the first CAN ID. The third criterion and the fourth criterion may be indicative of the second correlation relationship. Determining whether the first reference data in the rolling buffer meets a third criterion may include determining whether a value represented by the first reference data in each slot of the rolling buffer is within a predefined value of the average value represented thereby. Determining whether one or more second subsets of the CAN payload data present in the rolling buffer meets a fourth criterion may include determining whether the relative difference in value of the one or more second subsets in each slot of the rolling buffer. Collecting reference data having a second correlation relationship with the manufacturer-specific CAN data ay include collecting first reference data and second reference data having a second correlation relationship with the manufacturer-specific CAN data.

Identifying manufacturer-specific controller area network (CAN) data for a first vehicle type of a plurality of vehicle types may further include collecting a plurality of second reference data corresponding to a third CAN ID having at least a second correlation relationship with the first reference data and the manufacturer-specific CAN data, storing the second reference data in the rolling buffer, following receipt of the new first reference data, new second reference data and the new CAN payload data, determining whether the first reference data present in the rolling buffer meets a fifth criterion and the second reference data present in the rolling buffer meets a sixth criterion, in response to determining the first reference data present in the rolling buffer meeting the fifth criterion and the second reference data present in the rolling buffer meeting the sixth criterion, determining whether one or more second subsets of the CAN payload data present in the rolling buffer meets a fourth criterion, each of the one or more second subsets occupying a second byte position in each slot of the rolling buffer, dependent on the first reference data meeting a fifth criterion and the second reference data meeting the sixth criterion exceeding a third counting threshold, for each of the one or more second subsets meeting the fourth criterion exceeding a fourth counting threshold, forming second position data indicative of the second byte position in each slot of the rolling buffer occupied thereby, and wherein forming first candidate data indicative of the first position data and the first CAN ID comprises forming first candidate dependent on the first byte position of the first position data and the second byte position of the second position data being same, and the first CAN ID. The fourth criterion, fifth criterion and the sixth criterion may be indicative of the second correlation relationship. Determining whether the first reference data present in the rolling buffer meets a fifth criterion may include determining whether the value represented by first reference data in each slot of the rolling buffer is within a predefined value of the average thereof. Determining whether the first reference data present in the rolling buffer meets a first criterion may include determining whether the first reference data and the second reference data in the rolling buffer meets a first criterion. Selecting from the second candidate data a second candidate may comprise selecting a second candidate indicated in the greatest number of instances of the second candidate data.

BRIEF DESCRIPTION OF THE DRAWINGS

Embodiments of the invention are now described by way of non-limiting example and are illustrated in the following figures in which like reference numbers indicate like features, and wherein:

FIG. 9A depicts a table comprising exemplary engine load data presently stored in a rolling buffer;

FIG. 9B depicts a table comprising exemplary CAN payload data bytes presently stored in a rolling buffer;

FIG. 9C depicts a table comprising exemplary CAN payload data bytes in position [3,4] presently stored in a rolling buffer;

FIG. 9D depicts a table comprising exemplary CAN payload data bytes in position [4,3] presently stored in a rolling buffer;

FIG. 10A depicts a conceptual diagram of exemplary first subset data;

FIG. 10B depicts an exemplary group of predefined subsets of CAN payload data that may be processed;

FIG. 10C depicts exemplary first position data based on first subset data;

FIG. 10D depicts exemplary first candidate data indicative of a candidate of the target data;

FIG. 12A depicts a table of exemplary engine load data presently stored in a rolling buffer;

FIG. 12B depicts a table comprising exemplary bytes presently stored a in rolling buffer;

FIG. 13A depicts a conceptual diagram of exemplary second subset data;

FIG. 13B depicts an exemplary group of predefined subsets CAN payload data that may be processed;

FIG. 13C depicts exemplary second position data;

FIG. 13D depicts exemplary first candidate data;

FIG. 15A depicts a conceptual diagram of the contents of a rolling buffer;

FIG. 15B depicts a table comprising exemplary speed data presently stored in a rolling buffer;

FIG. 17A depicts a conceptual diagram of exemplary first candidate data received by a remote server;

FIG. 17B depicts a table of exemplary vehicle type IDs;

FIG. 17C depicts exemplary second candidate data;

FIG. 17D depicts a conceptual diagram of exemplary data indicating manufacturer-specific CAN data;

FIG. 22A depicts a conceptual diagram of a rolling buffer of size 12;

FIG. 22B depicts a conceptual diagram of CAN payload data presently stored in slots 1 to 12 of a rolling buffer;

FIG. 22C depicts a conceptual diagram of product data;

FIG. 22D depicts an exemplary subset of two bytes of CAN payload data in reverse ordered byte positions;

FIG. 23A depicts exemplary engine load values indicative of engine load data and exemplary RPM values indicative of RPM data presently stored in a rolling buffer;

FIG. 23B depicts exemplary values of product data;

FIG. 23C depicts exemplary values of first data;

FIG. 23D depicts exemplary values of a subset of CAN payload data;

FIG. 23E depicts exemplary values of second data;

FIG. 23F depicts exemplary values of third data;

FIG. 24A depicts first correlation coefficient data and corresponding first correlation coefficients between a subset CAN payload data and product data;

FIG. 24B depicts a conceptual diagram of first candidate data;

FIG. 26A depicts first correlation coefficient data and exemplary values thereof;

FIG. 26B depicts first correlation coefficient data and exemplary values thereof;

FIG. 26C depicts first correlation coefficient data and exemplary values thereof;

FIG. 26D depicts first correlation coefficient data and exemplary values thereof;

FIG. 26E depicts first correlation coefficient data and exemplary values thereof;

FIG. 26F depicts averaged first correlation coefficient data and exemplary values thereof;

FIG. 28A depicts exemplary values of fourth data;

FIG. 28B depicts exemplary values of fifth data;

FIG. 28C depicts second correlation coefficient data and corresponding second correlation coefficients between a subset CAN payload data and product data;

FIG. 28D depicts a conceptual diagram of first candidate data;

FIG. 30A depicts second correlation coefficient data and exemplary values thereof;

FIG. 30B depicts second correlation coefficient data and exemplary values thereof;

FIG. 30C depicts second correlation coefficient data and exemplary values thereof;

FIG. 30D depicts second correlation coefficient data and exemplary values thereof;

FIG. 30E depicts second correlation coefficient data and exemplary values thereof;

FIG. 30F depicts averaged second correlation coefficient data and exemplary values thereof;

DESCRIPTION

An engine control unit (ECU) is an embedded computer for controlling mechanical and/or electrical vehicle systems/subsystems. For instance, an ECU may receive an input from a sensor or other ECU and use actuators to control functionalities of the vehicle. An example of an ECU is an engine control module (ECM) that controls a series of actuators on an internal combustion engine to ensure optimal engine performance. It does this by reading values from a multitude of sensors within the engine bay, interpreting the data, and adjusting the engine actuators.

ECUs may receive inputs from sensors and switches that sense/measure vehicle variables such as temperature, pressure, voltage, acceleration, braking of the vehicle, steering angle, engine revolutions per minute (RPM), among others.

Although some ECUs form independent subsystems, communication between other ECUs is necessary for proper vehicle operation. In some instances, ECUs communicate vehicle information relating to a sensed/measured vehicle variable to other ECUs. For example, the Anti-Lock Brake System (ABS) may receive information from the Powertrain Control Module (PCM) to determine whether the traction control is working.

Communication between vehicle components is facilitated by one or more controller-area networks (CAN(s)). ECUs, and other vehicle components, may communicate by transmitting standardized CAN frames over a CAN bus. For example, CAN 2.0A and CAN 2.0B standards for in-vehicle communication systems are well known in the art.

Figure 1:
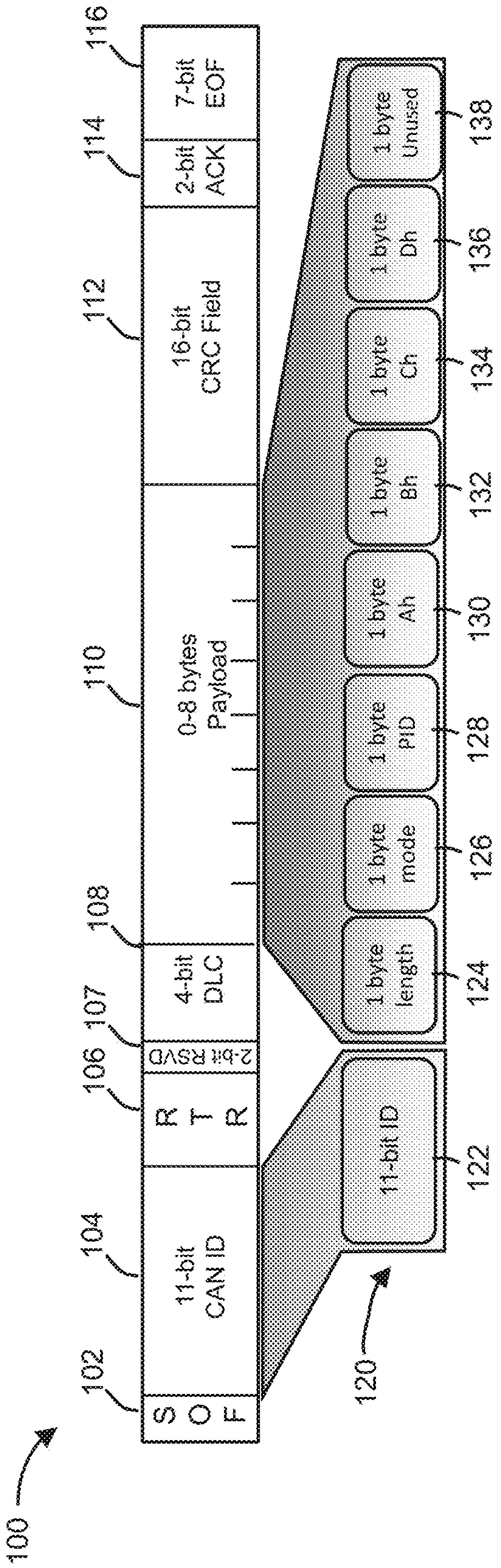
FIG. 1 depicts a simplified diagram of a CAN 2.0A frame and a simplified diagram of an OBD2 message mapped to the CAN 2.0A frame.

Illustrated in FIG. 1 is a simplified diagram of a typical CAN 2.0A frame 100 comprising, a start of frame bit (SOF) 102, 11-bit CAN identifier (ID) 104, remote transmission request bit (RTR) 106, 2-bit reserved field 107, 4-bit data length code (DLC) 108 indicating the number of data bytes in the payload data, 8-byte CAN payload data 110, 16-bit cyclical redundancy check (CRC) 112, 2-bit acknowledgement field 114, and a 7-bit frame delimiter indicating end of frame (EOF) 116. In addition to fields of a CAN 2.0A frame, a CAN 2.0B frame includes an 18-bit identifier extension allowing for additional nodes on the CAN bus and for the transport of messages that exceed the 8-byte maximum of CAN 2.0A frames. 8-byte CAN payload data 110 may include any number of 0 up to 8 bytes.

An ECU may continuously broadcast CAN frames on a CAN bus. In some instances, an ECU may transmit sensor, programming information and/or vehicle variable information at frequent and regular intervals, regardless if the information has been requested or not. For example, an ECU may transmit a CAN message every, 50 ms, 100 ms, 500 ms, or at another time interval. On a CAN bus there is no central hub or routing system, just a continuous flow of broadcasted CAN messages. Each ECU monitors the CAN bus to detect relevant data from the plethora of CAN messages for it to carry out its work.

In some instances, higher-layer communication protocols for communicating over a vehicle bus (e.g., CAN bus) have been adopted by industry. These protocols are documented in vehicle bus standards which specify a set of defined CAN messages embedded in CAN frames. Such standards may provide a definition of a CAN message, including CAN ID, meaning/format of the corresponding CAN payload data, and data conversion rules, if applicable.

For example, the Society of Automotive Engineers (SAE) standard J1939 is a vehicle bus standard commonly used for communication and diagnostics among vehicle components, e.g., ECUs, of commercial vehicles, e.g., heavy duty vehicle. This standard describes a common messaging protocol for transferring vehicle variable values and control information between nodes on a CAN bus. SAE 1939 further defines standard message formats for vehicle diagnostic data as well as a J1939 connector enabling access to an in-vehicle communication bus. For example, a 3rd party device may be coupled to a CAN bus via a J1939 connector for collecting vehicle diagnostic information, communicating with vehicle components and monitoring vehicle information exchanged between nodes on the CAN bus.

In another example, the SAE J1962 standard is a vehicle bus standard commonly used for diagnostics among consumer vehicles, e.g., cars, light duty trucks. This standard describes a common messaging protocol for communicating with a vehicle's self-diagnostic system (i.e., on-board diagnostics II (OBD2)) as well as an OBD2 connector enabling access to a CAN bus. For example, a 3rd party device may couple to a CAN bus via an OBD2 connector for collecting vehicle diagnostic information, communicating with vehicle components and monitoring vehicle information exchanged between nodes on the CAN bus.

Referring again to FIG. 1, illustrated is a simplified diagram of an OBD2 message 120 defined in SAE J1962 standard mapped to CAN 2.0A frame 100. In this example, message 120 comprises an 11-bit identifier (ID) 122 corresponding to CAN ID 104. The remaining portion of OBD2 message 120 corresponds to CAN payload data 110 and comprises 1-byte length field 124, 1-byte mode field 126, 1-byte parameter ID field 128, 1-byte data fields including: Ah 130, Bh 132, Ch 134, Dh 136, and a 1-byte unused field 138. SAE J1962 standard describes in detail how to create and decode OBD2 messages, including ID, the meaning/format of message fields and data conversion rules for interpreting data.

Figure 2:
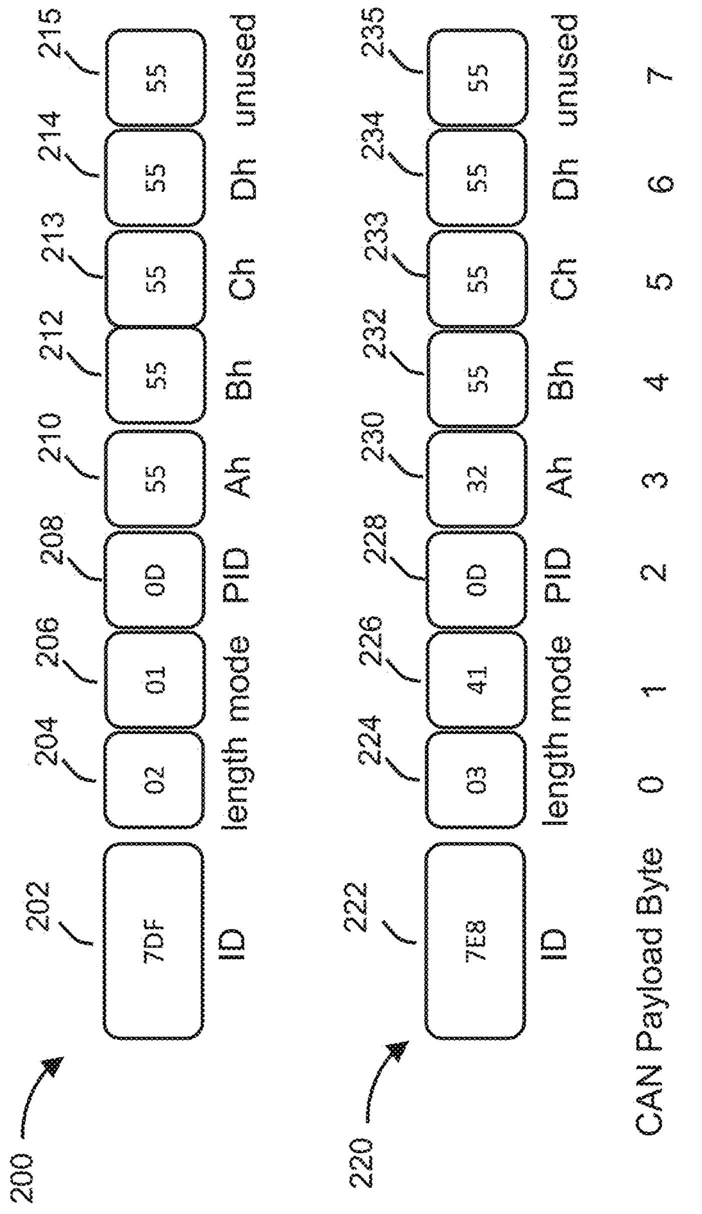
FIG. 2 depicts simplified block diagrams of two exemplary OBD2 messages.

For example, shown in FIG. 2 are simplified block diagrams of two exemplary OBD2 messages, message 200, 220, each defined in the SAE J1962 standard. Message 200 comprises ID 202, 7DFh, indicating that message 200 is a request message. Length field 204, 0x02, indicates that the next two bytes, mode field 206 and PID field 208, comprise valid data. Remaining bytes, Ah-Dh fields and unused field, 210-215, respectively, are to be ignored. A length field of an OBD2 message may have a value of 0x02 to 0x07. Mode field 206, 0x01, indicates that the request is for current data. For request messages, a mode field may have a value in the range 0x01 to 0Ah. In message 200, PID field 208 is OD. For mode 01, a PID OD indicates vehicle speed. Accordingly, message 200 may be understood as a request for a vehicle's current speed.

Message 220 comprises ID 222, 0x7E8, indicating that message 220 is a response message, possibly a response to message 200. In response messages, an ID also identifies the CAN node that is transmitting a response and may have a value of 0x7E8 to 0x7EF. Length field 224, 0x03, indicates that the next three bytes, mode field 226, PID field 228, and Ah field 230, comprise valid data. The remaining bytes, Bh-Dh fields and unused field, 232-235, respectively, are to be ignored. Mode field 226, 0x41, indicates that message 220 comprises current data. For response messages, the mode field may have a value in the range of 0x41 to 4Ah. In message 220, PID field 228 is OD. For mode 41, a PID of OD, specifies data bytes in the OBD2 message indicate speed and a data conversion rule. In this example, the data conversion rule for determining the vehicle speed from data byte Ah field 230, 0x32, is to convert the hexadecimal (Hex) value thereof in into decimal (Dec), i.e., 0x32 indicates a speed of 50 km/h.

As mentioned hereinabove, vehicle bus standards, e.g., J1939, J1962, have been adopted by industry. Accordingly, CAN message definitions specified in vehicle bus standards are implemented across vehicle manufacturers. Thus, vehicles having in-vehicle communication systems supporting a same vehicle bus standard, exchange data, e.g., speed data, in a same CAN message format.

Although CAN messages for transmitting some vehicle data are defined by vehicle bus standards, CAN messages for transmitting all possible vehicle data are defined in vehicle bus standards. In such circumstances, a vehicle manufacturer may define a unique CAN message for communicating vehicle data on a vehicle's CAN bus.

For example, a vehicle manufacturer may select an available CAN ID, (e.g., a CAN ID unreserved in one or more vehicle bus standards) and designate bytes of the corresponding CAN payload data to represent specific data. Optionally, a vehicle manufacturer may also create data conversion rules, if necessary. Such manufacturer defined CAN messages are referred to herein as manufacturer-specific CAN messages.

For instance, an ECU may collect specific vehicle information that is to be shared with other ECUs on a CAN bus. However, a CAN message comprising data indicative of this specific vehicle information has not been specified in any vehicle bus standard supported by the vehicle. As such, the vehicle manufacturer may define a CAN message for communicating the specific vehicle information between nodes (e.g., ECUs) on the CAN bus.

In practise, manufacturer-specific CAN messages are often unique to a vehicle type. Vehicle types may be defined by vehicle make, vehicle make and model, and/or vehicle make, model and year.

For instance, exemplary vehicle types defined by vehicle make include, Ford, Buick, Mercedes-Benz, Toyota, and the like. Examples of a vehicle type defined by vehicle make and model include Ford F-150, Buick Encore, Mercedes-Benz Metris Van, Toyota Corolla, and the like. Finally, examples of a vehicle type defined by vehicle make, model and year include, 2017 Ford F-150, 2016 Buick Encore, 2006 Mercedes-Benz Metris Van, 2014 Toyota Corolla, and the like.

Figure 3A:
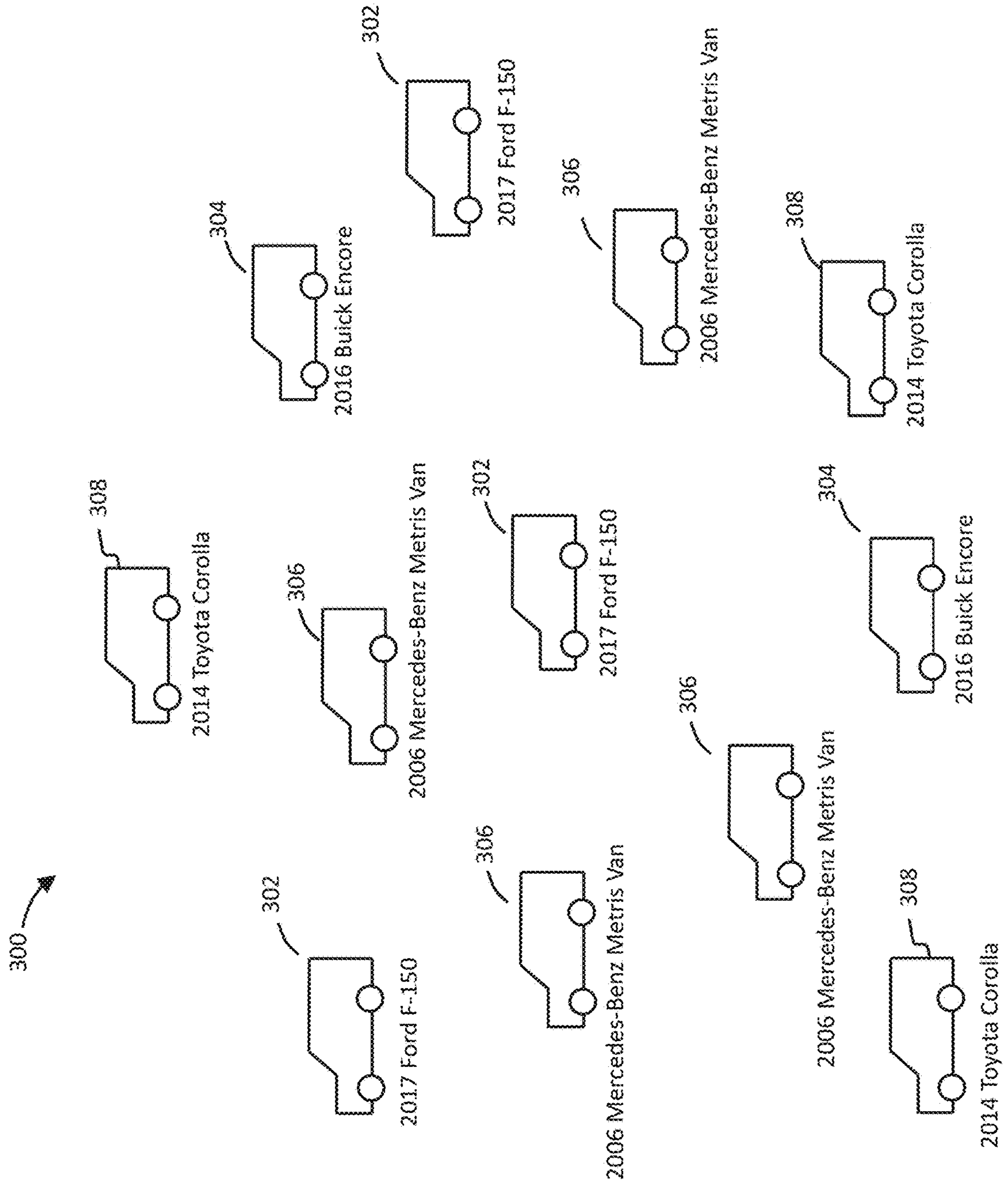
FIG. 3A depicts a simplified diagram of an exemplary fleet including a plurality of vehicles comprising various vehicle types.

Shown in FIG. 3A is a simplified diagram of an exemplary fleet 300 including a plurality of vehicles comprising various vehicle types. For example, fleet 300 comprises vehicles 302, 304, 306 and 308 corresponding to vehicle types, 2017 Ford F-150, 2016 Buick Encore, 2006 Mercedes-Benz Metris Van and 2014 Toyota Corolla, respectively.

Figure 3B:
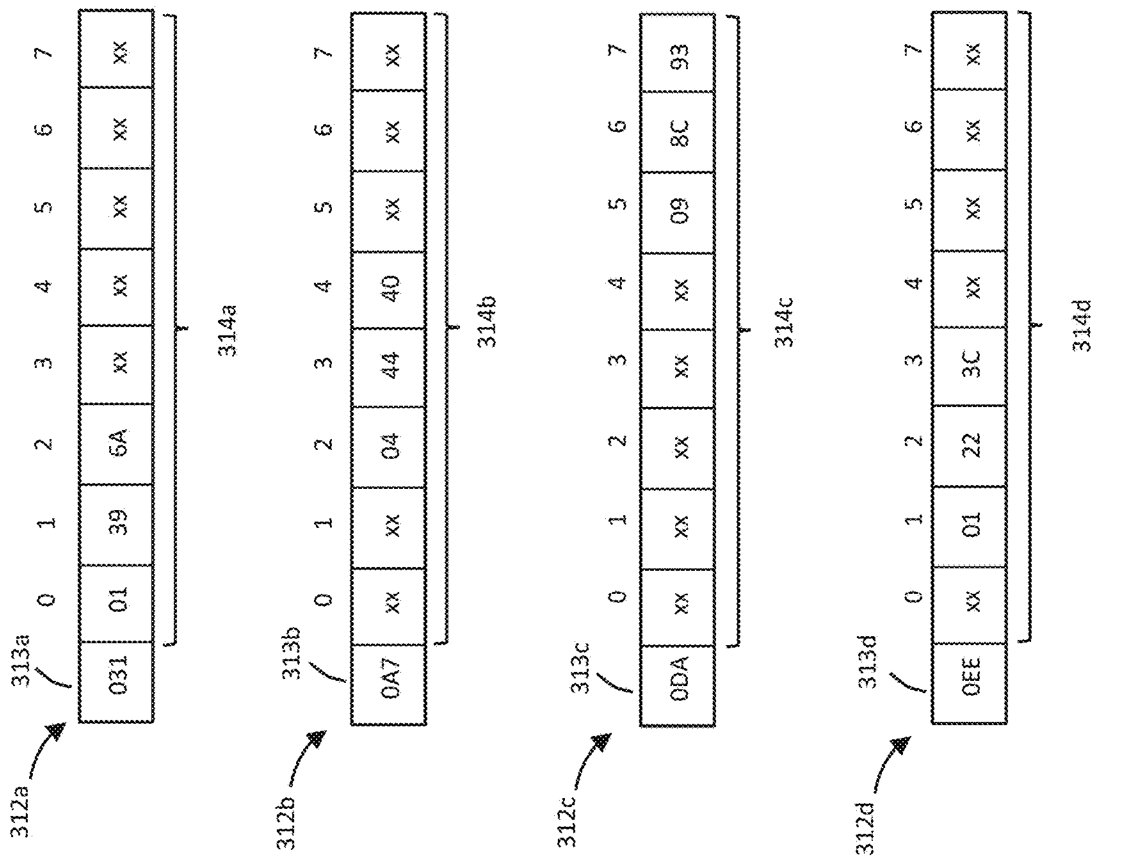
FIG. 3B depicts simplified diagrams of exemplary manufacturer-specific CAN messages comprising odometer data each corresponding to one of four vehicle types.

In this example, there is no standard CAN message comprising odometer data defined in any vehicle bus standard supported by the vehicles in fleet 300. As such, each vehicle manufacturer creates a manufacturer-specific CAN message, unique to each vehicle type, for communicating odometer data on a CAN bus. For example, shown in FIG. 3B, are exemplary manufacturer-specific CAN messages 312*a*, 312*b*, 312*c* and 312*d* comprising odometer data corresponding to each of the four vehicle types, 2017 Ford F-150, 2016 Buick Encore, 2006 Mercedes-Benz Metris Van and 2014 Toyota Corolla, respectively.

For example, vehicle manufacturer of vehicle 302 defines manufacturer-specific CAN message 312*a* for communicating odometer data over a CAN bus for vehicle type 2017 Ford F-150. Manufacturer-specific CAN message 312*a* is assigned CAN ID 313*a*, 0x031, and bytes in positions 0 to 2 of the corresponding CAN payload data 314*a* are specified as comprising odometer data. Data in payload bytes 3 to 7 are invalid and are to be ignored. In this instance, odometer data carried in payload bytes 0 to 2 of CAN payload data 314*a* is 0x01396A. A data conversion rule to calculate the odometer value is to convert the hex number into decimal, i.e., 0x01396A=80234 km.

In a second example, vehicle manufacturer of vehicle 304 defines manufacturer-specific CAN message 312*b* for communicating odometer information over a CAN bus for vehicle type 2016 Buick Encore. Manufacturer-specific CAN message 312*b* is assigned CAN ID 313*b*, 0x0A7, and bytes in positions 2 to 4 of the corresponding CAN payload data 314*b* are specified as comprising odometer data. Data in payload bytes 0, 1, and 5 to 7 are invalid and are to be ignored. In this instance, odometer data carried in payload bytes 2 to 4 of CAN payload data 314*b* is 0x044440. A data conversion rule to calculate the odometer value is to convert the hex number into decimal, i.e., 0x044440=279616 km.

In a third example, vehicle manufacturer of vehicle 306 defines manufacturer-specific CAN message 312*c* for communicating odometer information over a CAN bus for vehicle type 2006 Mercedes-Benz Metris Van. Manufacturer-specific CAN message 312*c* is assigned CAN ID 313*c*, 0x0DA, and bytes in positions 5 to 7 of the corresponding CAN payload data 314*c* are specified as comprising odometer data. Data in payload bytes 0 to 4 are invalid and are to be ignored. In this instance, odometer data carried in payload bytes 5 to 7 of CAN payload data 314*c* is 0x098C93. A data conversion rule to calculate the odometer value is to convert the hex number into decimal, i.e., 0x098C93=625811 km.

In a fourth example, vehicle manufacturer of vehicle 308 defines manufacturer-specific CAN message 312*d* for communicating odometer information over a CAN bus for vehicle type 2014 Toyota Corolla. Manufacturer-specific CAN message 312*d* is assigned CAN ID 313*d*, 0x0EE, and bytes in positions 1 to 3 of the corresponding CAN payload data 314*d* are specified as comprising odometer data. Data in payload bytes 0, and 4 to 7 are invalid and are to be ignored. In this instance, odometer data carried in payload bytes 1 to 3 of CAN payload data 314*d* is 0x01223C. A data conversion rule to calculate the odometer value is to convert the hex number into decimal, i.e., 0x01223C=74300 km.

As described hereinabove, manufacturer-specific CAN messages carrying a same vehicle information, e.g., odometer data, may have a unique for each vehicle type. In contrast, defined CAN messages provided in industry adopted standards may be supported by all vehicle types.

However, defined CAN data may include any CAN data having a known definition, e.g., known data type, data byte position(s) and corresponding CAN ID. Specific and non-limiting examples of defined CAN data may include data defined in an industry bus standard, and manufacturer-specific CAN data wherein a definition thereof has been determined.

A fleet comprising four vehicle types is described in this example for explanation purposes only and embodiments are not intended to be limited to the examples described herein. In practise, a fleet may comprise one or more vehicle types.

Telematics System

Figure 4:
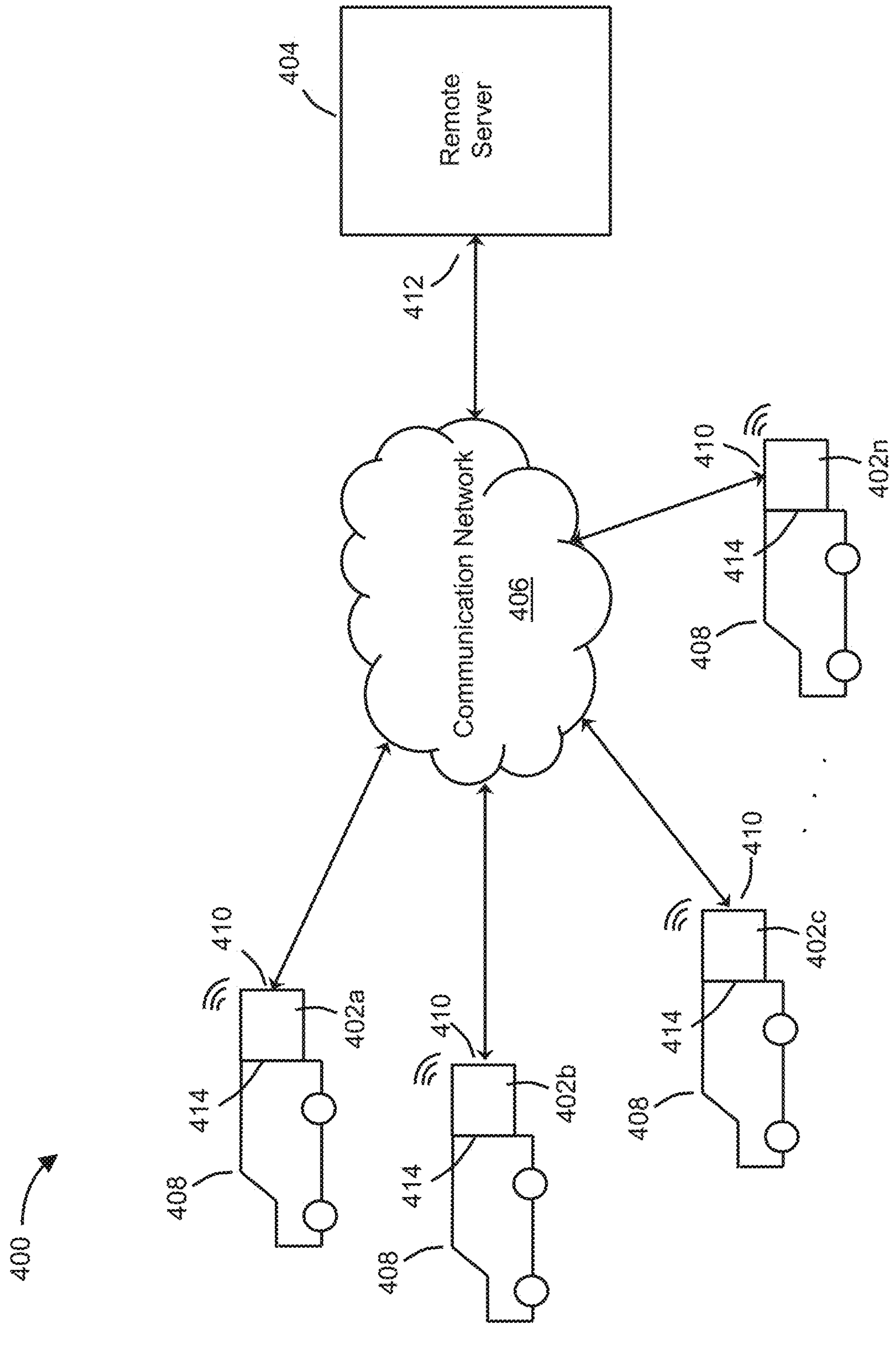
FIG. 4 depicts a simplified diagram of an exemplary telematics system according to an embodiment.

Now referring to FIG. 4, shown is a simplified diagram of an exemplary telematics system according to an embodiment. Telematics system 400 comprises a remote server 404 having a network interface 412 and a plurality of monitoring devices 402*a*, 402*b*, and 402*c*, each thereof having network interfaces, 410, 412, respectively. Remote server further including a processing resource, datastore, RAM or another type of memory device. The datastore may be or include one or more non-transitory computer-readable storage media, such as optical, magnetic, organic, or flash memory, among other data storage devices and may take any form of computer readable storage media.

Remote server 404 and monitoring devices 402 are configured for coupling to a communication network, for example, communication network 406, as shown in FIG. 4. Communication network 406 may include one or more computing systems and may be any suitable combination of networks or portions thereof to facilitate communication between network components. Communication network 406 may operate according to one or more communication protocols, such as, Universal Mobile Telecommunications Service (UMTS), GSM, Enhanced Data Rates for GSM Evolution (EDGE), LTE, CDMA, LPWAN, Wi-Fi, Bluetooth, Ethernet, HTTP/S, TCP, and CoAP/DTLS, or other suitable protocol. Communication network 406 may take other forms as well.

Monitoring device 402 also includes a CAN bus interface 414 for communicatively coupling to a CAN bus of corresponding vehicle 408, as shown in FIG. 4.

Alternatively, telematics system 400 may comprise up to 'n' monitoring devices, as indicated by monitoring device 402*n*, in FIG. 4. Examples of monitoring devices described above are provided for explanation purposes only and embodiments are not intended to be limited to the examples described herein.

Figure 5:
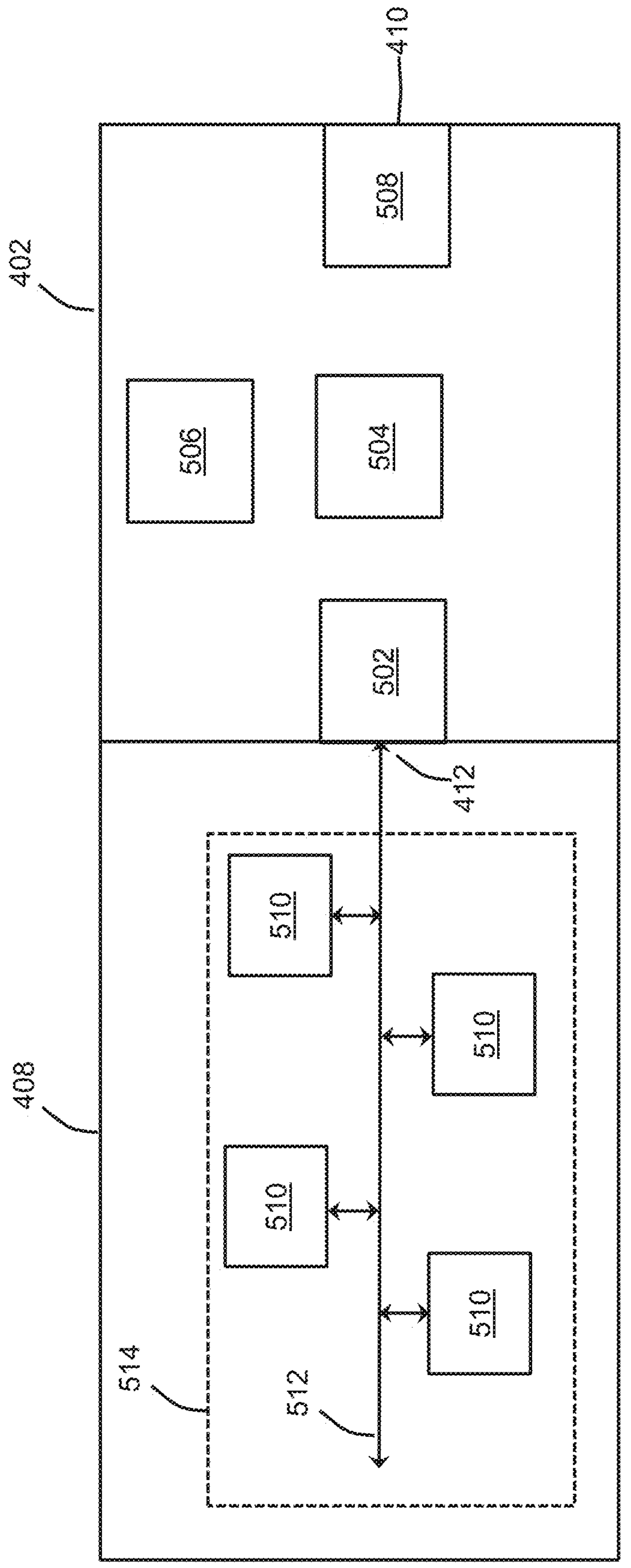
FIG. 5 depicts a simplified block diagram of an exemplary monitoring device and a simplified block diagram of in-vehicle communication system of a vehicle comprising CAN bus nodes according to an embodiment.

Shown in FIG. 5 is a simplified block diagram of exemplary monitoring device 402 comprising processing resource 504, datastore 506, e.g., RAM or another type of memory device, a CAN communication device 502 providing CAN bus interface 412, and a network communication device 508, e.g., wireless modem, providing network interface 410 to a communication network, such as communication network 406.

In this example, monitoring device 402 is communicatively coupled to CAN bus 512 of vehicle 408, via CAN bus interface 412, as shown. Communication device 502 may support wired communication to a CAN bus, for instance, via an OBD2 connector. Alternatively, communication device 502 may support wireless communication to a CAN bus, for example, via Bluetooth®, Wi-Fi, or other wireless communication technology.

Also illustrated in FIG. 5 is a simplified block diagram of in-vehicle communication system 514 of vehicle 408 comprising CAN bus nodes 510, e.g., ECUs, communicatively coupled to CAN bus 512. In this example, monitoring device 402 monitors information exchanged between nodes on CAN bus 512 and collects data that may be useful for fleet management and monitoring. Monitoring device 402 then transmits this data to remote server 404 for future use.

In a first instance, in-vehicle communication system 514 of vehicle 408 supports the SAE J1962 standard. Monitoring device 402 may be configured to detect and log specific data carried in a CAN message defined in the SAE J1962 standard.

For example, SAE J1962 standard provides a definition of a CAN message comprising speed data specified to have a CAN ID 0x78E and speed data carried in byte 3 of the CAN payload data. Shown in FIG. 2 is an exemplary CAN message, message 220, defined in SAE J1962 standard comprising speed data. In this example, monitoring device 402 may be configured to identify CAN messages having CAN ID 0x78E and to save speed data, 0x32, stored in byte 3 228. Speed data 0x32 may be stored, for example, in datastore 506 of monitoring device 402. Monitoring device 402 transmits speed data 0x32 to remote server 404 for future processing.

Monitoring device 402 may collect speed data from any vehicle, and/or vehicle type, provided the vehicle's in-vehicle communication system supports SAE J1962 standard. For example, monitoring device 402 may collect speed data from the following exemplary vehicle types, 2017 Ford F-150, 2016 Buick Encore, 2006 Mercedes-Benz Metris Van, and others, by identifying CAN messages with CAN ID 0x78E and storing data in byte 3 of the corresponding CAN payload data.

Similarly, monitoring device 402 may collect any data carried in a CAN message from any vehicle, and/or vehicle type, provided the vehicle's in-vehicle communication system supports SAE J1962 standard. For instance, a same data, e.g., RPM, engine load . . . , may be collected by monitoring device 402 from a plurality of vehicle types based on a definition of the CAN message carrying that data specified in SAE J1962 standard.

In some instances, manufacturer-specific CAN messages may also comprise data useful for fleet management and monitoring. However, as definitions of manufacturer-specific CAN messages may be unknown (e.g., not publicly available) such data may be undetectable by a 3rd party. For example, monitoring device 402 cannot be configured to collect data unless the CAN ID and meaning/format of CAN payload data of a CAN message carrying that data of is known.

Furthermore, for a monitoring device 402 to collect a same data from a plurality of vehicle types, the definition of a CAN message carrying that same data for each vehicle type must also be known.

For instance, a CAN message carrying odometer data is not specified in a vehicle bus standard supported by any vehicles in fleet 300 in FIG. 3A. In order for a monitoring device 402 to collect odometer data for each vehicle therein, a definition of a manufacturer-specific CAN messages 312*a*-312*d* carrying odometer data for each vehicle type in fleet 300 must be known.

For example, for vehicle 302—vehicle type 2017 Ford F-150, monitoring device 402 is be configured to collect CAN payload data bytes 0 to 2 corresponding to CAN ID 0x031. For vehicles 304—vehicle type 2016 Buick Encore, monitoring device 402 is be configured to collect CAN payload data bytes 0 to 2 corresponding to CAN ID 0x0A7. For vehicles 306—vehicle type 2006 Mercedes-Benz Metris Vans, monitoring device 402 is be configured to collect CAN payload data bytes 5 to 7 corresponding to CAN ID 0x0DA. For vehicles 308—vehicle type 2014 Toyota Corollas, monitoring device 402 is be configured to collect CAN payload data bytes 1 to 3 corresponding to CAN ID 0x0EE.

In some instances, vehicle variables may be correlated one to another. For example, vehicle variables fuel consumption (i.e., rate of fuel consumption) and engine load are correlated. An exemplary correlation relationship between fuel consumption and engine load may be characterized as an increase in engine load correlates to an increase in fuel consumption. Subsequently, it is reasonable to expect data (e.g., data transmitted by ECUs that sense/measure vehicle variables), representing correlated vehicle variables have a similar correlation relationship.

For example, if engine load and fuel consumption are correlated, it is anticipated that engine load data and fuel rate data have a similar correlation relationship. For instance, fuel rate data indicates the rate of fuel consumption of the vehicle at the time of collection thereof. One of ordinary skill in the art will appreciate that a correlation relationship between vehicle variables may be specified based on, for example, an understanding of vehicle operation, empirical testing, and/or by another means.

Described herein are various embodiments relating to identifying manufacturer-specific CAN data, also referred to herein as target data. Some embodiments relate to utilizing a known correlation relationship between target data, representing a first vehicle variable, and first reference data, representing a second vehicle variable, for identifying target data. Identifying target data may include processing CAN payload data of undefined CAN messages, (e.g., CAN messages not defined in a vehicle bus standard), and first reference data for determining whether CAN payload data, and/or a portion thereof, satisfies the known correlation relationship therebetween.

Various embodiments relate to utilizing one or more known correlation relationships between target data representing a first vehicle variable and one or more reference data representing other vehicle variables for identifying target data.

Identifying target data may include identifying a CAN ID of a CAN message carrying target data and byte position(s) of target data within corresponding CAN payload data.

Process 600

Figure 6:
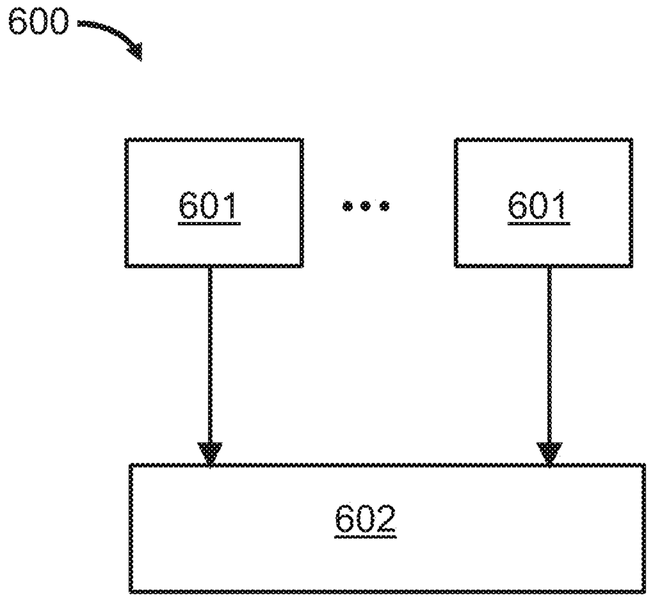
FIG. 6 depicts a simplified high-level flow diagram of a process for identifying manufacture-specific CAN data, (i.e., target data), for a vehicle type according to an embodiment.

Shown in FIG. 6 is a simplified high-level flow diagram of a process 600 for identifying manufacture-specific CAN data, i.e., target data, for a vehicle type according to an embodiment. Process 600 comprises one or more subprocesses 601 and subprocess 602, as shown.

Subprocess 601 may include utilizing at least one correlation relationship between target data and at least one reference data for identifying one or more candidates for target data. The one or more candidates are associated with a vehicle type. Subprocess 601 provides first candidate data indicative of the one more candidates, to subprocess 602.

A plurality of subprocesses 601 may provide a plurality of first candidate data associated with a plurality of vehicle types.

Subprocess 602 may include processing first candidate data provided by subprocess(es) 601 for identifying target data specific to a vehicle type. Identifying target data specific to a vehicle type may include identifying a CAN ID and byte position(s) of target data within corresponding CAN payload data.

For purposes of illustration, process 600 is described as being carried out by telematics system 400. In particular, subprocess 601 is described as being carried out by monitoring device 402 and subprocess 602 is described as being carried out by remote server 404. However, process 600, subprocess 601 and subprocess 602 may be carried out by a combination of other systems, subsystems, devices or other suitable means provided the operations described herein are performed. Process 600 may be automated, semi-automated and some blocks thereof may be manually performed.

Subprocess 700

Figure 7A:
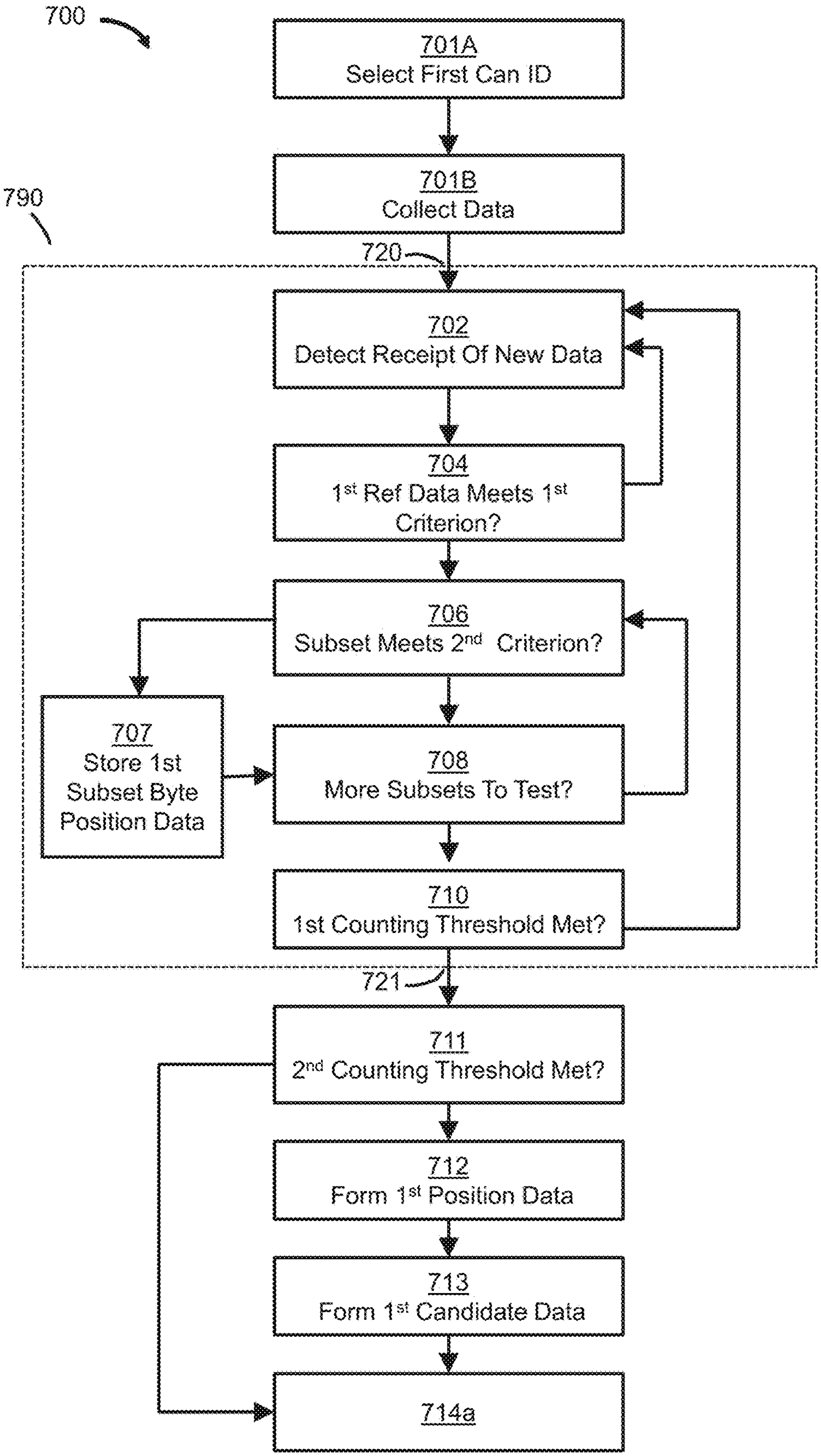
FIG. 7A depicts a simplified flow diagram of a subprocess for identifying one or more candidates for target data according to an embodiment.

Illustrated in FIG. 7A is a simplified flow diagram of a subprocess 700 for identifying one or more candidates for target data according to an embodiment. Subprocess 700 may include identifying candidates based on a first correlation relationship between a target data and a first reference data.

For instance, a target data may be in the form of fuel rate data and a first reference data may be in the form of engine load data. An exemplary first correlation relationship between fuel consumption and engine load may be characterized as an increase in engine load correlates to an increase in fuel consumption.

Starting at block 701A, subprocess 700 may include selecting a first CAN ID from a group of available CAN IDs. Some examples of available CAN IDs may include unreserved CAN IDs in the SAE J1939 standard, the SAE J1962 standard, and/or other vehicle bus standards.

In the present example, monitoring device 402 selects first CAN ID 0x400 from a group of available CAN IDs comprising 0x001 to 0x7FF. However, any available CAN ID from the group may be selected.

At block 701B, subprocess 700 may include collecting a plurality of first reference data and a plurality of CAN payload data from a CAN bus and storing that data in a rolling buffer of size S.

In some instances, first reference data and CAN payload data are collected at predefined intervals. Once all S slots of the rolling buffer are filled, subprocess 700 proceeds to the next block. Notwithstanding subprocess 700 proceeding to block 702, samples of first reference data and CAN payload data may continue to be collected and stored in the rolling buffer at predefined intervals.

Figures 8A, 8B, 8C, 8D:
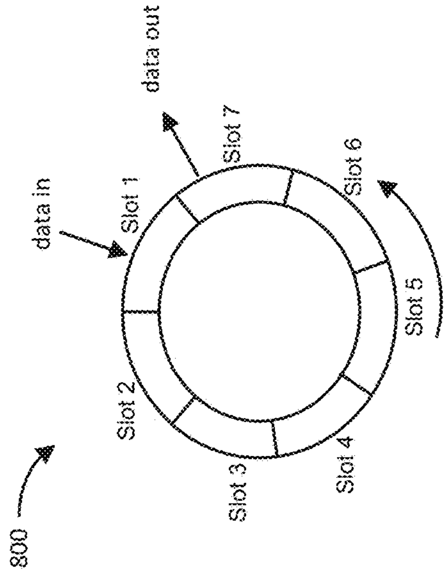
FIG. 8A depicts a conceptual diagram of an exemplary rolling buffer.
FIG. 8B depicts a conceptual diagram of the contents of an exemplary rolling buffer after collecting and storing a first sample of engine load data and CAN payload data.
FIG. 8C depicts a conceptual diagram of the contents of a rolling buffer after collecting and storing four samples of engine load data and undefined payload data.
FIG. 8D depicts a conceptual diagram of contents of a rolling buffer after collecting and storing seven samples of engine load data and CAN payload data.

Shown in FIG. 8A is a conceptual diagram of an exemplary rolling buffer 800 of size 7. In the present example, monitoring device 402 collects first reference data in the form of engine load data 804 and CAN payload data corresponding to first CAN ID 0x400 from a CAN bus, such as, CAN bus 512, at a predefined interval of 1s. Engine load data and CAN payload data is then stored in rolling buffer 800. In this example, rolling buffer is size 7, however, a rolling buffer may have any number of slots.

For descriptive purposes, first reference data and CAN payload data are described to be collected at a predefined interval of 1 second. In practise, however, first reference data and CAN payload data may be collected at another predefined interval.

Alternatively, each of the plurality of CAN payload data is collected at a time temporally proximate a time each of the plurality of first reference data is collected. For example, CAN payload data may be collected at the same time as, or at a time close to, the time first reference data is collected.

Now referring to FIG. 8B, shown is a conceptual diagram of the contents of rolling buffer 800 after collecting and storing a first sample of engine load data 804 and CAN payload data 807. For example, first reference data **804*a* and CAN payload data 807*a* are stored in slot 1 of rolling buffer 800**, whereas slots 2 to 7 comprise invalid data and/or no data.

In FIG. 8C, shown is a conceptual diagram of the contents of rolling buffer 800 after collecting and storing four samples of engine load data 804 and undefined payload data 807. For example, rolling buffer 800 comprises first reference data **804*d* to 804*a* in slots 1 to 4, respectively, and CAN payload data 807*d* to 807*a* in slots 1 to 4, respectively. Slots 5 to 7 of rolling buffer 800** comprise invalid data and/or no data.

Finally, in FIG. 8D, shown is a conceptual diagram of the contents of rolling buffer 800 after collecting and storing seven samples of engine load data 804 and CAN payload data 807. For example, rolling buffer 800 comprises first reference data **804*g* to 804*a* in slots 1 to 7, respectively, and CAN payload data 807*g* to 807*a* in slots 1 to 7, respectively. Once each slot of rolling buffer 800 is filled, subprocess 700** may proceed to the next block.

Although subprocess 700 proceeds to block 702, samples of first reference data 804 and CAN payload data 807 continue to be collected and stored in rolling buffer 800 by monitoring device 402 at predefined intervals of 1 second.

Next, at block 702, subprocess 700 includes monitoring the rolling buffer and, upon receipt of new first reference data and new CAN payload data, subprocess 700 proceeds to the next block.

For example, monitoring device 402 monitors rolling buffer 800 and upon storage of new engine load data **804*g* and CAN payload data 807*g*, for example in slot 1, subprocess 700** proceeds to the next block.

At block 704, subprocess 700 may include determining whether the first reference data stored in the rolling buffer provides a valid test condition for evaluating whether the first reference data and CAN payload data satisfy the first correlation relationship.

A specific and non-limiting example of a method for determining whether the first reference data provides a valid test condition is by determining whether the first reference data meets a first criterion indicative of the first correlation relationship. An exemplary first criterion may be engine load represented by engine load data 804 in rolling buffer 800 exceeds the engine load represented by an immediately previously received engine load data 804 by a first predefined threshold, for instance, 49%.

Referring now to FIG. 9A, shown is table 901 comprising exemplary engine load data 804*a*-804*g* presently stored in rolling buffer 800. Table 901 includes the value of engine load data 804*a*-804*g* in Hex 902 and in Dec 903, and engine load 904 calculated as per data conversion rule, engine load=(Dec*100/255). Engine load 904 is a percentage of load on an engine and may range between [0-100%]. In addition, table 901 includes the relative percentage load increase 905 between an engine load 904 in rolling buffer 800 and an immediately previously received engine load 904.

In the present example, monitoring device 402 calculates the actual engine load 904 using the data conversion rule described hereinabove. Next, monitoring device 402 determines the relative percentage load increase 905 between each engine load 904 indicated by engine load data 804 and an engine load 904 indicated by an immediately previously received engine load data 804.

For example, engine load data 804*g* in slot 1 indicates an engine load of 3.9%. The immediately previously received engine load data 804 of engine load data 804*g* is engine load data 804*f* in slot 2. Engine load data 804*f* indicates an engine load of 5.9%. The relative percentage load increase therebetween is 51%, (i.e., (5.9−3.9)/3.9=51%).

Monitoring device 402 determines the relative percentage load increase 905 between the remaining engine load 904 indicated by engine load data 804*f*-804*b* and an engine load 904 indicated by an immediately previously received engine load data 804*e*-804*a*, respectively, as shown in FIG. 9A. As each of the relative percentage load increase 905 exceeds the first predefined threshold, 49%, engine load data 804 meets the first criterion.

Still at block 704, subprocess 700 may include incrementing a first counter provided the first reference data meets the first criterion. The first counter indicates the total number of instances first reference data provides a valid test condition for evaluating whether the first reference data and CAN payload data satisfy the first correlation relationship. If the first reference data provides a valid test condition for evaluating whether the first reference data and CAN payload data satisfy the first correlation relationship subprocess 700 proceeds to block 706, otherwise, subprocess 700 proceeds to block 702.

In the present example, engine load data 804 met the first criterion indicating engine load data 804 provided a valid test condition for evaluating whether the engine load data 804 and CAN payload data satisfy the first correlation relationship. Thus, monitoring device 402 increments a first counter by 1 and subprocess 700 proceeds to block 706.

The first criterion described in this example is provided for explanation purposes only and embodiments are not intended to be limited to the examples described herein.

Next, at block 706, subprocess 700 may include processing CAN payload data for identifying one or more subsets of the CAN payload data satisfying the first correlation relationship. If one or more of the subsets satisfies the first correlation relationship, subprocess 700 proceeds to block 707, otherwise subprocess returns to block 702.

Figure 8E:
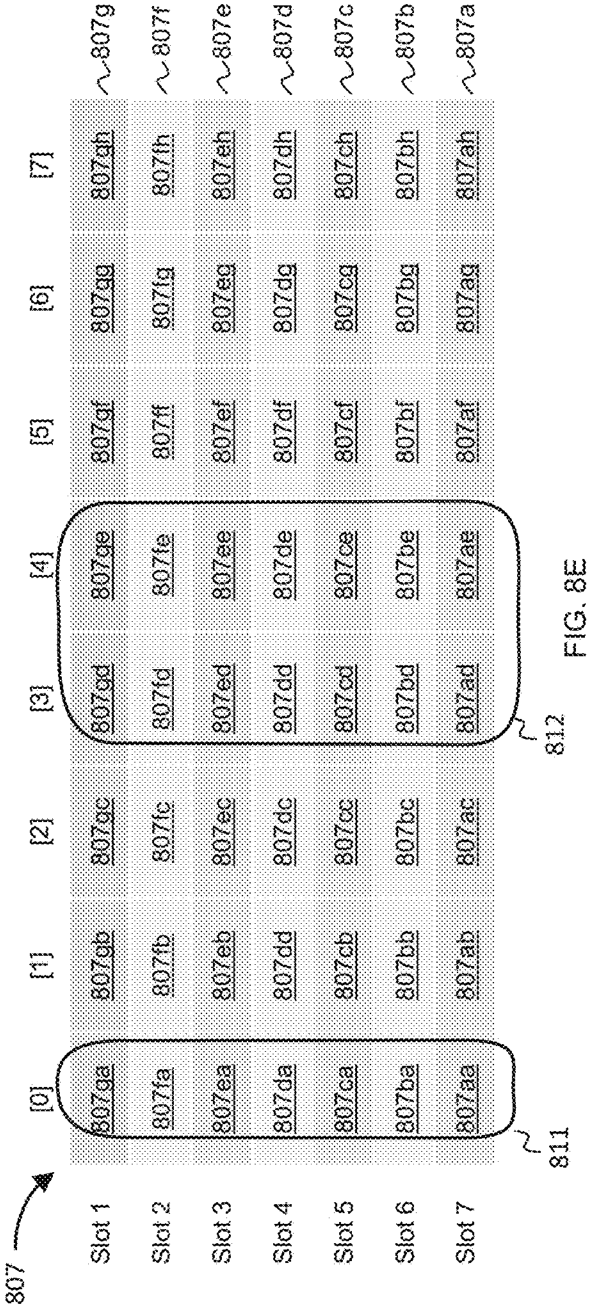
FIG. 8E depicts a conceptual diagram of CAN payload data presently stored in a rolling buffer.

Shown in FIG. 8E, is a conceptual diagram of CAN payload data 807*g* to 807*a* presently stored in slots 1 to 7, respectively, of rolling buffer 800. For instance, CAN payload data 807*g* in slot 1 includes byte 807*ga* in byte position [0], 807*gb* in byte position [1], 807*gc* in byte position [2], 807*gd* in byte position [3], 807*ge* in byte position [4], 807*gf* in byte position [5], 807*gg* in byte position [6], and 807*gh* in byte position [7], as indicated in FIG. 8E. Similarly, CAN payload data 807*f* in slot 2 comprises bytes 807*fa* to 807*fh* corresponding to byte positions [0] to [7], respectively, and so forth.

Target data may be comprised of one or more bytes in any byte positions [0] to [7] of an undefined CAN message payload. Accordingly, processing CAN payload data for determining one or more subsets of the CAN payload data that satisfies the first correlation relationship may include processing a plurality of subsets of data of CAN payload data in any byte position(s) [0] to [7].

A specific and non-limiting example of a method for determining whether one or more subsets of CAN payload data satisfies the first correlation relationship may include determining whether the one or more subsets of the CAN payload data meets a second criterion indicative of the first correlation relationship. An exemplary second criterion may be a relative increase between consecutive pairs of data in a same byte position in the rolling buffer exceeds a second predefined threshold, for instance, 20%.

In a first instance, determining whether a subset of CAN payload data satisfies the first correlation relationship may include processing single bytes in a same byte position of CAN payload data in each slot of the rolling buffer.

For example, monitoring device 402 processes subset 811, shown in FIG. 8E, for determining whether subset 811 meets the second criterion. Subset 811 includes single bytes of CAN payload data 807 occupying a same byte position, position [0]. For instance, monitoring device 402 processes subset 811 for determining the relative increase between the following consecutive pairs of single bytes in position [0] in rolling buffer 800: (807*ga* and 807*fa*) (807*fa* and 807*ea*), (807*ea* and 807*da*), (807*da* and 807*ca*), (byte 807*ca* and byte 807*ba*), and (807*ba* and 807*aa*). Next, monitoring device 402 then determines whether the relative increase between the consecutive pairs of single bytes exceeds the second predefined threshold, 20%.

Shown in FIG. 9B is table 906 comprising exemplary bytes 804*ga*-804*aa* presently stored in rolling buffer 800. Table 906 includes exemplary values of bytes 804*ga*-804*aa* in Hex 907 and Dec 908. Also included in table 906 is an example of the relative increase 910 between consecutive pairs of bytes in position [0] in the rolling buffer 800 determined by monitoring device 402.

In this example, the relative increase of each consecutive pair of bytes subset exceeds the second predefined threshold 20% indicating that subset 811 meets the second criterion. As such, subset 811 corresponding to CAN ID 0x400, byte position [0], may be a candidate for target data.

In the present example, since subset 811 meets the second criterion, subprocess 700 proceeds to block 707. However, if subset 811 did not meet the second criterion subprocess would proceed to block 708.

Additionally, and/or alternatively, one or more subsets comprised of single bytes in another byte position of CAN payload data, position [1] to [7], may be processed.

In another instance, determining whether a subset of CAN payload data satisfies the first correlation relationship may include processing a plurality of ordered bytes in same byte positions of the CAN payload data in each slot of the rolling buffer. The same byte positions may include any byte positions [0] to [7]. Some examples of a plurality of ordered bytes that may be processed include bytes in the following byte positions: [0,1], [1,2], [2,3], [3,4], [4,5], [5,6], [6,7], [0,1,2], [1,2,3], [2,3,4], [3,4,5], [4,5,6], [5,6,7], among others.

For example, monitoring device 402 processes subset 812, shown in FIG. 8E, for determining whether subset 812 meets the second criterion. Subset 812 includes two ordered bytes of CAN payload data in a same byte position, position [3,4].

For instance, monitoring device 402 processes subset 811 for determining the relative increase between the following consecutive pairs of two ordered bytes in positions [3,4] in rolling buffer 800: ([807*gd*, 807*ge*] and [807*fd*, 807*fe*]), ([807*fd*, 807*fe*] and [807*ed*, 807*ee*]), ([807*ed*, 807*ee*] and [807*dd*, 807*de*]), ([807*dd*, 807*de*] and [807*cd*, 807*ce*]), ([807*cd*, 807*ce*] and [807*bd*, 807*be*]), and ([807*bd*, 807*be*] and [807*ad*, 807*ae*]). Next, monitoring device 402 then determines whether the relative increase between the consecutive pairs of two ordered bytes exceeds the second predefined threshold, 20%.

Shown in FIG. 9C is table 907 comprising exemplary bytes in position [3,4] presently stored in rolling buffer 800. Table 906 includes the value of bytes [807*gd*, 807*ge*] to [807*ad*, 807*ae*] in Hex 9011 and Dec 912. Also included in table 906 is an example of the relative increase 913 between the consecutive pairs of ordered bytes in position [3,4] in the rolling buffer 800 determined by monitoring device 402. In this example, the relative increase between each consecutive pair of ordered bytes in position [3,4] exceeds the second predefined threshold 20% indicating that subset 812 meets the second criterion. As such, subset 812 corresponding to CAN ID 0x400, byte positions [3,4], may be a candidate for target data.

In the present example, since subset 812 meets the second criterion, subprocess 700 proceeds to block 707. However, if subset 812 did not meet the second criterion subprocess 700 would proceed to block 708.

Additionally, and/or alternatively, one or more subsets comprised of two ordered bytes in other byte positions of CAN payload data, other than positions [3,4] may be processed.

In another instance, determining whether a subset of CAN payload data satisfies the first correlation relationship may include processing a plurality of reverse ordered bytes in same byte positions of the CAN payload data in each slot of the rolling buffer. The same byte positions may include any byte positions [0] to [7]. Some examples of a plurality of reversed ordered bytes that may be processed include bytes in the following byte positions: [1,0], [2,1], [3,2], [4,3], [5,4], [6,5], [7,6], [2,1,0], [3,2,1], [4,3,2], [5,4,3], [6,5,4], [7,6,5], among others.

Figure 8F:
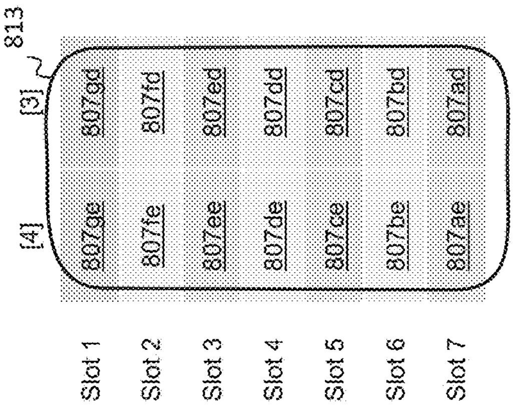
FIG. 8F depicts a conceptual diagram of a subset of CAN payload data stored in a rolling buffer.

For example, monitoring device 402 processes subset 813, shown in FIG. 8F, for determining whether subset 813 meets the second criterion. Subset 813 includes two ordered bytes of CAN payload data in a same byte position, position [4,3].

For instance, monitoring device 402 processes subset 813 for determining the relative increase between the following consecutive pairs of two reverse ordered bytes in positions [4,3] in rolling buffer 800: ([807*ge*, 807*gd*] and [807*fe*, 807*fd*]), ([807*fe*, 807*fd*] and [807*ee*, 807*ed*]), ([807*ee*, 807*ed*] and [807*de*, 807*dd*]), ([807*de*, 807*dd*] and [807*ce*, 807*cd*]), ([807*ce*, 807*cd*] and [807*be*, 807*bd*]), and ([807*be*, 807*bd*] and [807*ae*, 807*ad*]). Next, monitoring device 402 then determines whether the relative increase between the consecutive pairs of the reverse ordered bytes exceeds the second predefined threshold, 20%.

Shown in FIG. 9D is table 914 comprising exemplary bytes in position [4,3] presently stored in rolling buffer 800. Table 914 includes the values of bytes [807*ge*, 807*gd*] to [807*ae*, 807*ad*] in Hex 915 and Dec 916. Also included in table 914 is an example of the relative increase 917 between the consecutive pairs of reverse ordered bytes in position [4,3] in the rolling buffer 800 determined by monitoring device 402. In this example, the relative increase between each consecutive pair of reverse ordered bytes in position [4,3] exceeds the second predefined threshold 20% indicating that subset 813 meets the second criterion. As such, subset 813 corresponding to CAN ID 0x400, byte positions [4,3], may be indicate a candidate for target data.

In the present example, since subset 813 meets the second criterion, subprocess 700 proceeds to block 707. However, if subset 813 did not meet the second criterion subprocess 700 would proceed to block 708.

Additionally, and/or alternatively, one or more subsets comprised of two reversed ordered bytes in other byte positions of CAN payload data, other than positions [4,3] may be processed.

The example above describes target data, i.e., undefined manufacturer-specific CAN data, as fuel rate data and first reference data as engine load data for descriptive purposes only. Target data may be any vehicle variable-related data and first reference data may also be any vehicle variable-related data having a correlation relationship with the target data. Specific and non-limiting examples of target data include, odometer data and speed data, e.g., speed data included in manufacturer-specific CAN data.

The subsets of CAN payload data evaluated to meet the second criterion described in the examples above are provided for explanation purposes only and embodiments are not intended to be limited to the examples described herein.

At block 707, subprocess 700 may include incrementing a second counter if a subset of CAN payload data meets the second criterion. A second counter indicates the total number of instances a subset corresponding to a specific byte position(s) satisfies the first correlation relationship. If a subset of undefined CAN payload meets the second criterion, an indication of the byte position(s) of that subset, and a second counter associated therewith, is stored for future use. Subprocess 700 then proceeds to block 708.

For example, as described hereinabove, subset 811 corresponding to byte position [0] of CAN payload data meets the second criterion. Accordingly, monitoring device 402 increments secondcounter[0] by 1 and stores first subset data indicating byte position [0] and secondcounter[0], for example, in datastore 506 of monitoring device 402.

A conceptual diagram of exemplary first subset data 1001 is shown in FIG. 10A. In this example, first subset data 1001*a* indicates byte position [0] and associated secondcounter[0], 3. For instance, first subset data 1001*a* indicates that a data byte in position[0] of CAN payload data corresponding to a first CAN ID, e.g., 0x400, has met the second criterion 3 times.

First subset data 1001*b* indicates byte positions [3,4] and associated secondcounter[3,4], 5. For instance, first subset data 1001*b* indicates that data bytes in positions [3,4] of CAN payload data corresponding to a first CAN ID, e.g., 0x400, has met the second criterion 5 times.

Finally, first subset data 1001*c* indicates byte positions [4,3] and associated secondcounter[4,3], 44. For instance, first subset data 1001*c* indicates that a data bytes in position [4,3] of CAN payload data corresponding to a first CAN ID, e.g., 0x400, has met the second criterion 44 times. Monitoring device 402 may store first subset data 1001 in datastore 506 or other datastore of monitoring device 402.

At block 708, subprocess 700 may include determining whether all subsets, from a group predefined subsets, of CAN payload data has been processed for identifying one or more subsets of the CAN payload data satisfying the first correlation relationship. In the event there are other subsets still to be processed, the loop of blocks 706 to 708 will be repeated. Otherwise subprocess 700 will proceed to the next block.

An exemplary group of predefined subsets is shown in table 1002 of FIG. 10B. At block 708, monitoring device 402 determines whether all subsets in table 1002 have been processed. If so, subprocess 700 proceeds to the next block. Otherwise subprocess 700 returns to block 706.

At block 710, subprocess 700 may include comparing the first counter to a first counting threshold. The first counter not exceeding the first counting threshold indicates that the number of instances of valid test conditions for evaluating whether the first reference data and CAN payload data satisfy the first correlation relationship is insufficient. Should the first counter exceed the first counting threshold subprocess 700 proceeds to block 711. Otherwise subprocess 700 returns to block 702

An exemplary first counting threshold is 49. In the present example the first counter is 50 indicating that there were 50 instances of valid test conditions for evaluating whether the first reference data and CAN payload data satisfy the first correlation relationship. As the first counter 50 exceeds the first counting threshold 49, subprocess 700 proceeds to the next block.

Next, at block 711, subprocess 700 includes comparing one or more second counters with a second counting threshold. A second counting threshold indicates a minimum number of instances a subset must satisfy the first correlation relationship to be a candidate for target data. If a second counter exceeds the second counting threshold, subprocess 700 proceeds to block 712, otherwise subprocess 700 proceeds to block 714A and is complete.

An exemplary second counting threshold is 39. In the present example, monitoring device 402 processes first subset data 1001 to determine if one or more of secondcounter[0], secondcounter[3,4] and secondcounter[4,3], exceeds the second counting threshold. Monitoring device 402 determines secondcounter[4,3], exceeds the second counting threshold 39. Accordingly, subprocess proceeds to block 712. However, if none of the second counters exceeded the second count threshold, subprocess 700 would proceed to block 714A and be complete.

At block 712, subprocess 700 forms first position data based on first subset data having a second counter exceeding the second counting threshold.

For example, secondcounter[4,3] of position data 1001*c* exceeds the second counting threshold. Monitoring device 402 forms first position data 1003, as shown in FIG. 10C, based on first subset data 1001*c*. For instance, first position data 1003 indicates subset position [4,3] and associated secondcounter[4,3], 44.

Next, at block 713, subprocess 700 forms first candidate data based on the first position data and the first CAN ID. The first candidate data provides an indication of a first candidate for target data. In some instances, first candidate data may also include an indication of the second counter. Still at block 713, subprocess 700 may include providing first candidate data to a second subprocess for further processing, such as, subprocess 601.

In the present example, monitoring device 402 forms first candidate data based on first position data 1003 and first CAN ID 0x400. For instance, first candidate data 1004, shown in FIG. 10D, indicates a candidate of the target data in byte position [4,3] of an undefined CAN payload corresponding to CAN ID 0x400. In some instances, first candidate data 1004 may include an indication of secondcounter [4,3], 44, as shown.

In some instances, monitoring device 402 may transmit first candidate data 1004 to remote server 404 via communication network 406 for future use.

One of ordinary skill will appreciate that a plurality of candidates corresponding to a same first CAN ID may be identified. For instance, if secondcounter[3,4] of position data 1001*b* exceeded the second counting threshold, first candidate data may also indicate another candidate of the target data in byte position [3,4] of an undefined CAN payload corresponding to CAN ID 0x400.

Finally, at block 714A subprocess 700 is complete.

Target data, first reference data and first correlation relationship described in the examples described above are provided for explanation purposes only. Similarly, other first criterion and/or other second criterion indicative if the first correlation relationship may be used. Embodiments are not intended to be limited to the examples described herein.

In some instances, CAN messages corresponding to a selected first CAN ID are not transmitted on the CAN bus. In such instances, subprocess 700 may timeout and proceed directly to block 714A.

Subprocess 700'

Figure 7B:
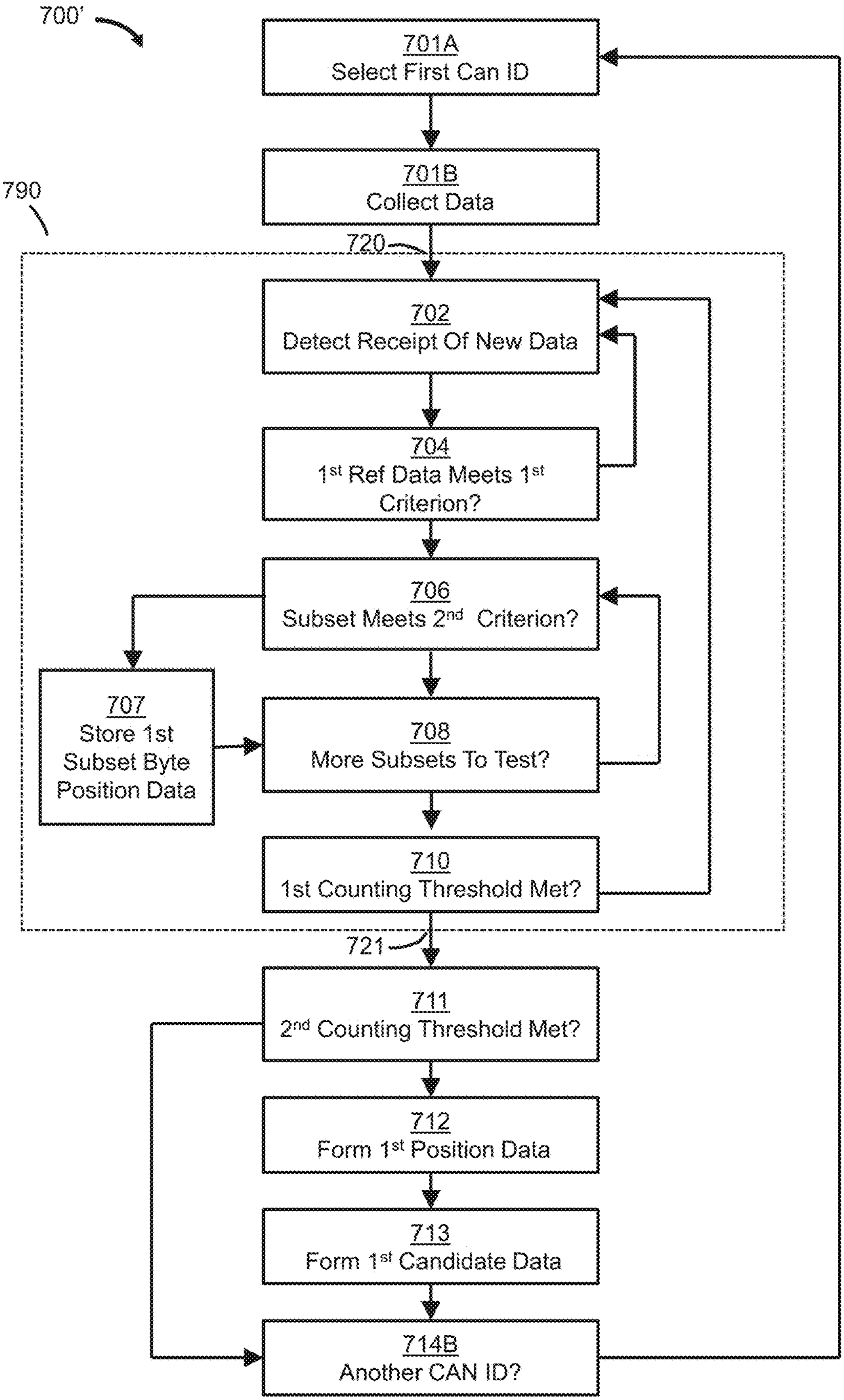
FIG. 7B depicts a simplified flow diagram of another subprocess for identifying one or more candidates for target data according to an embodiment.

Illustrated in FIG. 7B is a simplified flow diagram of another subprocess 700' for identifying one or more candidates for target data according to an embodiment. Subprocess 700' may include identifying candidates based on a first correlation relationship between a target data and a first reference data.

The functionality of blocks of subprocess 700' to be described below are the same and/or substantially similar to blocks of subprocess 700 and the previous description of the latter can be applied to the former with the exceptions as described below.

In subprocess 700', block 714A of subprocess 700 is replaced with block 714B.

At block 714B, subprocess 700' includes determining whether there is other CAN payload data corresponding to another first CAN ID of the group of available CAN IDs to be processed. If so, subprocess 700' returns to block 701A, otherwise, subprocess 700' proceeds to block 714B and is complete.

For example, monitoring device 402 determines whether CAN payload data corresponding to another first CAN ID in the group of available CAN IDs comprising 0x001 to 0x7FF, is still to be processed. If this is the case, subprocess 700 returns to block 701A wherein another first CAN ID is selected, for instance, 0x689.

In some instances, CAN messages corresponding to a selected first CAN ID are not transmitted on the CAN bus. In such instances, subprocess 700' may timeout and proceed directly to block 714B.

Subprocess 1100

Figure 11:
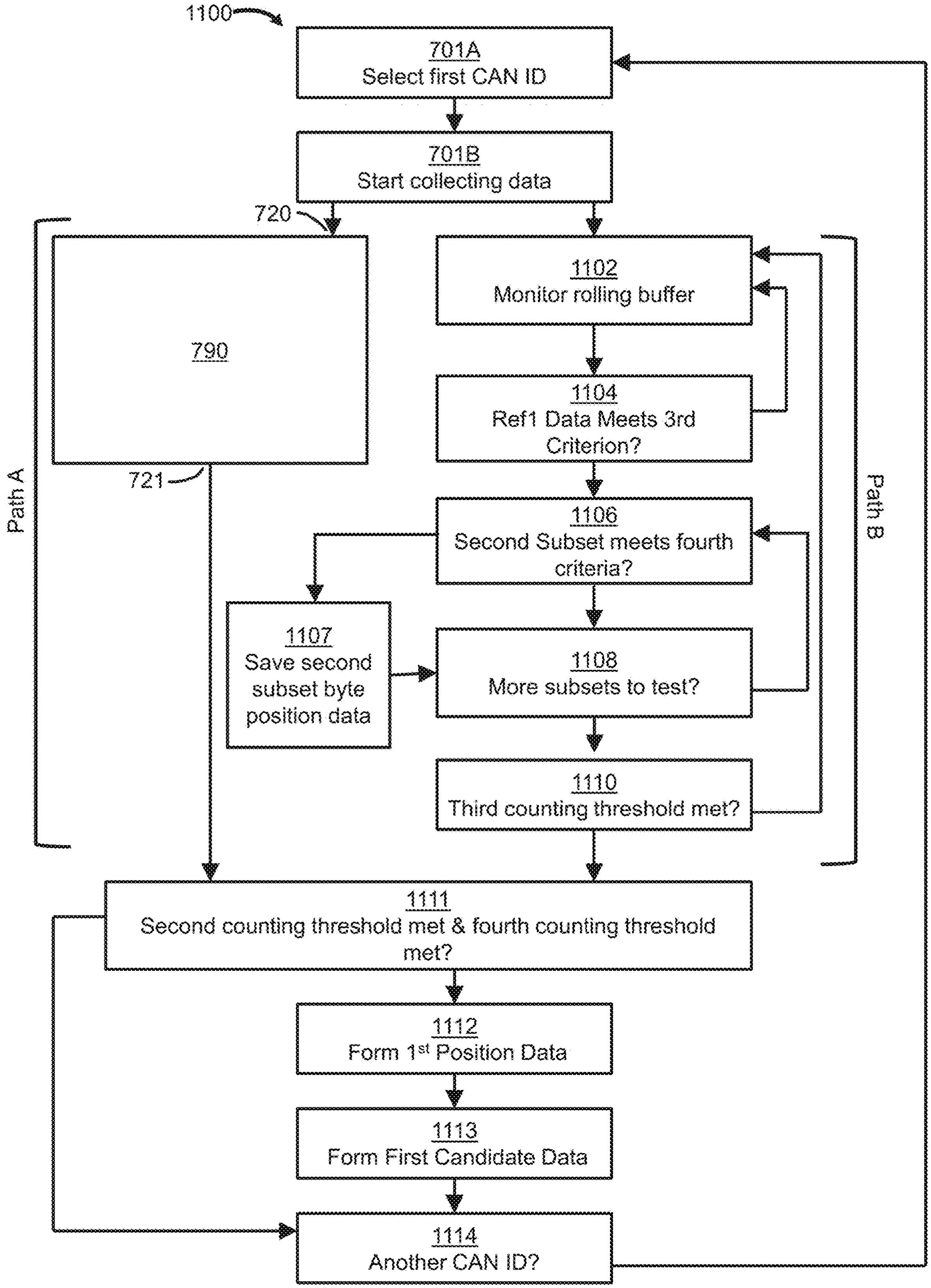
FIG. 11 depicts a simplified flow diagram of a subprocess for identifying one or more candidates for target data according to an embodiment.

Illustrated in FIG. 11 is a simplified flow diagram of a subprocess 1100 for identifying one or more candidates for target data according to an embodiment. Subprocess 1100 may include identifying candidates based on a first correlation relationship between target data and first reference data, and a second correlation relationship between target data and first reference data.

In a present example, a target data may be in the form of fuel rate data and first reference data may be in the form of engine load data. An exemplary first correlation relationship between fuel consumption and engine load may be characterized as an increase in engine load correlates to an increase in fuel consumption. An exemplary second correlation relationship between fuel consumption and engine load may be characterized as a constant engine load correlates to constant fuel consumption.

The functionality of blocks of subprocess 1100 to be described below are the same and/or substantially similar to blocks of subprocesses 700 and 700', and the previous description of the latter can be applied to the former with the exceptions as described below.

Subprocess 1100 begins at block 701A and proceeds therefrom to block 701B. From block 701B, subprocess 1100 diverges along two paths, A and B.

Referring to path A, subprocess 1100 proceeds to block 790 comprising blocks 702 to 710 via interface 720, as shown. Functionality of blocks 702 to 710 are described above with reference to subprocesses 700 in FIG. 7A.

At block 790, subprocess 1100 includes identifying candidates based on the first correlation relationship between target data and first reference data, by forming, for example, first subset data 1001 in FIG. 10A. When the first counter exceeds the first counting threshold, subprocess 1100 proceeds to block 1111 via interface 721 of block 790.

Referring now to path B, at block 1102, subprocess 1100 may include monitoring the rolling buffer and, upon receipt of new first reference data and new CAN payload data, subprocess 1100 proceeds to block 1104.

For example, monitoring device 402 monitors rolling buffer 800 and upon storage of new engine load data 804*g* and CAN payload data 807*g*, for example in slot 1, subprocess 1100 proceeds to the next block.

At block 1104, subprocess 1100 may include determining whether the first reference data stored in the rolling buffer provides a valid test condition for evaluating whether the first reference data and CAN payload data satisfy the second correlation relationship.

A specific and non-limiting example of a method for determining whether the first reference data provides a valid test condition is by determining whether the first reference data meets a third criterion indicative of the second correlation relationship.

An exemplary third criterion may be engine load represented by engine load data 804 in each slot of rolling buffer 800 must be within a predefined value of the average thereof. An exemplary predefined value is 1.

Referring now to FIG. 12A, shown is table 1201 comprising exemplary engine load data 804*a*-804*g* presently stored in rolling buffer 800. Table 1201 includes the value of engine load data 804*a*-804*g* in Hex 1202 and in Dec 1203, and engine load 1204 calculated as per data conversion rule, engine load=(Dec*100/255). Engine load 1204 represents a percentage of load on an engine and may range between [0-100%].

In the present example, monitoring device 402 calculates the actual engine load 1204 using the data conversion rule described hereinabove and the average engine load 1220 to be 4.7%. Next, monitoring device determines the absolute difference 1205 between an engine load 1204 and the average engine load 1220, as shown in table 1201.

For example, engine load data 804*g* in slot 1 indicates an engine load of 3.92%. The absolute difference 1205 between engine load 1204 indicated by engine load data 804*g* and average engine load 1220, 4.7%, is 0.78, (i.e., 13.92−4.71=0.78).

Monitoring device 402 determines whether the difference 1205 between engine load 1204 represented by engine load data 804 in each slot of rolling buffer 800 is within 1 of the average engine load 1220, 4.7%. In this example, the difference 1205 of the average engine load 1204 and engine load data 804 in each slot is within 1, indicating engine load data 804 meets the third criterion.

Still at block 1104, subprocess 1100 may include incrementing a third counter provided the first reference data meets the third criterion. The third counter indicates the total number of instances first reference data provides a valid test condition for evaluating whether the first reference data and CAN payload data satisfy the second correlation relationship. If first reference data provides a valid test condition for evaluating whether the first reference data and CAN payload data satisfy the second correlation relationship, subprocess 1100 proceeds to block 1106, otherwise, subprocess 1100 proceeds to block 1102.

In the present example, engine load data 804 met the third criterion indicating engine load data 804 provided a valid test condition for evaluating whether the engine load data 804 and CAN payload data satisfy the second correlation relationship. Thus, monitoring device 402 incremented a third counter by 1 and subprocess 1100 proceeded to block 1106.

The third criterion described in this example is provided for explanation purposes only and embodiments are not intended to be limited to the examples described herein.

Next, subprocess 1100 proceeds to block 1106. The functionality of block 1106 to be described below is substantially similar to block 706 and the previous description of the latter can be applied to the former with the exceptions as described below.

At block 1106, subprocess 1100 may include processing CAN payload data for identifying one or more subsets of the CAN payload data satisfying the second correlation relationship. If one or more of the subsets satisfies the second correlation relationship, subprocess 1100 proceeds to block 1107, otherwise subprocess returns to block 1102.

Shown in FIG. 8E, is a conceptual diagram of CAN payload data 807*g* to 807*a* presently stored in slots 1 to 7, respectively, of rolling buffer 800. For instance, CAN payload data 807*g* in slot 1 includes byte 807*ga* in byte position [0], 807*gb* in byte position [1], 807*gc* in byte position [2], 807*gd* in byte position [3], 807*ge* in byte position [4], 807*gf* in byte position [5], 807*gg* in byte position [6], and 807*gh* in byte position [7], as indicated in FIG. 8E. Similarly, CAN payload data 807*f* in slot 2 comprises bytes 807*fa* to 807*fh* corresponding to byte positions [0] to [7], respectively, and so forth.

Target data may be comprised of one or more bytes in any byte positions [0] to [7] of an undefined CAN message payload. Accordingly, processing CAN payload data for determining one or more subsets of the CAN payload data that satisfies the first correlation relationship may include processing a plurality of subsets of data of CAN payload data in any byte position(s) [0] to [7].

A specific and non-limiting example of a method for determining whether one or more subsets of the CAN payload data satisfies the second correlation relationship may include determining whether the one or more subsets of the CAN payload data meets a fourth criterion indicative of the second correlation relationship. An exemplary fourth criterion may be the relative difference between CAN payload data 807 in each slot of rolling buffer 800 and average thereof must not exceed a third predefined threshold, for instance, 50%.

In the present example, monitoring device 402 processes subset 811, shown in FIG. 8E for determining whether subset 811 meets the fourth criterion.

Referring now to FIG. 12B, shown is table 1206 comprising exemplary bytes 804*ga*-804*aa* presently stored in rolling buffer 800. Table 1206 includes exemplary values of bytes 804*ga*-804*aa* in Hex 1207 and Dec 1208.

In this example, monitoring device 402 determines the average 1222 value of bytes 804*ga*-804*aa* to be 207 and the percentage difference 1210 between the value of CAN payload data bytes 804*ga*-804*aa* and the average 1222 thereof, as shown in table 1206. For instance, the decimal value of CAN payload data byte 807*ga* in slot 1 is 170. The percentage difference between average 1222, 207 and decimal value of CAN payload data byte 807*ga* 170 is 22%, (i.e., (207−170)/207=22%).

In this example, the relative difference between CAN payload data bytes 807*ga*-807*aa* and the average 1222 thereof, 207 does not exceed the third predefined threshold, 50%, indicating that subset 811 meets the fourth criterion. As such, subset 811 corresponding to CAN ID 0x400, byte position [0], may be a candidate for target data.

In the present example, since subset 811 meets the fourth criterion, subprocess 1100 proceeds to block 1107. However, if subset 811 did not meet the fourth criterion subprocess would proceed to block 1108.

Additionally, and/or alternatively, a subset may comprise one or more bytes, in one or more byte positions [0] to [7], of CAN payload data.

The third criterion, fourth criterion and subsets of CAN payload data described in this example are provided for explanation purposes only. Embodiments are not intended to be limited to the examples described herein.

At block 1107, subprocess 1100 may include incrementing a fourth counter if a subset of CAN payload data meets the fourth criterion. A fourth counter indicates the total number of instances a subset corresponding to a specific byte position(s) satisfies the second correlation relationship. If a subset of undefined CAN payload meets the fourth criterion, an indication of the byte position(s) of that subset, and a fourth counter associated therewith, is stored for future use. Subprocess 1100 then proceeds to block 1108.

For example, as described hereinabove, subset 811 corresponding to byte position [0] of CAN payload data meets the fourth criterion. Accordingly, monitoring device 402 increments fourthcounter[0] by 1 and stores second subset data indicating byte position [0] and fourthcounter[0], for example, in datastore 506 of monitoring device 402.

A conceptual diagram of exemplary second subset data is 1301 shown in FIG. 13A. In this example, second subset data 1301*a* indicates byte position [0] and associated fourthcounter[0], 10. For instance, second subset data 1301*a* indicates that a data byte in position[0] of CAN payload data corresponding to a first CAN ID, e.g., 0x400, has met the fourth criterion 10 times.

Second subset data 1301*b* indicates byte position [5,6] and associated fourthcounter[5,6], 4. For instance, second subset data 1301*b* indicates that a data bytes in position[5,6] of CAN payload data corresponding to a first CAN ID, e.g., 0x400, has met the fourth criterion 4 times.

Finally, second subset data 1301*c* indicates byte position [4,3] and associated fourthcounter[4,3], 47. For instance, second subset data 1301*c* indicates that a data bytes in position[4,3] of CAN payload data corresponding to a first CAN ID, e.g., 0x400, has met the fourth criterion 47 times.

Next, at block 1108, subprocess 1100 may include determining whether all subsets, from a group of predefined subsets, of CAN payload data has been processed for identifying one or more subsets of the CAN payload data satisfying the second correlation relationship. In the event there are other subsets still to be processed, the loop of blocks 1106 to 1108 will be repeated. Otherwise subprocess 1110 will proceed to the next block.

An exemplary group of predefined subsets is shown in table 1302 of FIG. 13B. At block 1108, monitoring device 402 determines whether all subsets in table 1202 have been processed. If so, subprocess 1100 proceeds to the next block. Otherwise subprocess 1100 returns to block 106.

At block 1110, subprocess 1100 may include comparing the third counter to a third counting threshold. The third counter not exceeding the third counting threshold indicates that the number instances of valid test conditions for evaluating whether the first reference data and CAN payload data satisfy the second correlation relationship is insufficient. Should the third counter exceed the third counting threshold, subprocess 1100 proceeds to block 1111. Otherwise, subprocess 1100 returns to block 1102.

An exemplary third counting threshold is 49. In the present example the third counter is 50, indicating that there were 50 instances of valid test conditions for evaluating whether the first reference data and CAN payload data satisfy the second correlation relationship. As the third counter 50 exceeds the first counting threshold 49, subprocess 1100 proceeds block 1111.

At block 1111, path A and path B merge, and subprocess 1100 may include comparing one or more second counters with a second counting threshold. A second counting threshold indicates a minimum number of instances a subset must satisfy the first correlation relationship to be a possible candidate for target data. Subprocess 1100 further includes comparing one or more fourth counters with a fourth counting threshold. A fourth counting threshold indicates a minimum number of instances a subset must satisfy the second correlation relationship to be a possible candidate for target data. Should one or more second counters and one or more fourth counters exceed the second counting threshold and fourth counting threshold, respectively, subprocess 1100 proceeds to block 1112, otherwise, subprocess 1100 proceeds to block 1114.

An exemplary second counting threshold is 39. In the present example, monitoring device 402 processes first subset data 1001 to determine if one or more of secondcounter[0], secondcounter[3,4] and secondcounter[4,3], exceeds the second counting threshold. Monitoring device 402 determines secondcounter[4,3], exceeds the second counting threshold 39. However, if none of the second counters exceeded the second count threshold, subprocess 1100 would proceed to block 1114.

An exemplary fourth counting threshold is 39. In the present example, monitoring device 402 processes second subset data 1301 to determine if one or more of fourthcounter[0], fourthcounter[5,6] and fourthcounter[4,3], exceeds the fourth counting threshold. Monitoring device 402 determines fourthcounter[4,3], 47, exceeds the fourth counting threshold 39. However, if none of the fourth counters exceeded the fourth count threshold, subprocess 1100 would proceed to block 1114.

As secondcounter[4,3], 44, exceeds the second counting threshold 39 and fourthcounter[4,3], 47, exceeds the fourth counting threshold 39, subprocess 1100 proceeds to block 1112.

At block 1112, subprocess 1100 forms first position data based on first subset data having a second counter exceeding the second counting threshold and forms second position data based on second subset data having a fourth counter exceeding the fourth counting threshold.

In the present example, monitoring device 402 forms first position data 1003 indicating a possible candidate at position [4,3] of CAN payload data and second position data 1303 indicating a possible candidate at position [4,3] of CAN payload data. Exemplary second position data 1303 is shown in FIG. 13C. Optionally, first position data 1003 and second position data 1303 may also indicate associated second counter, 44, and fourth counter 47, as shown.

Next, at block 1113, subprocess 1100 includes processing first position data and second position data to determine if each thereof indicate a same byte position. If so, subprocess 1100 also includes forming first candidate data indicative of that same byte position and the first CAN ID. Optionally, first candidate data may indicate the second counter and fourth counter associated with the same byte position. Optionally, at block 1113 subprocess 1100 may provide the first candidate data to another subprocess.

For example, monitoring device 402 processes first position data 1003 and second position data 1303 and determines that both thereof indicate a possible candidate at a same byte position [4,3]. FIG. 13D shows exemplary first candidate data 1304 formed by monitoring device 402 indicating same byte position [4,3] and first CAN ID 0x400. First candidate data 1304 may also indicate a second counter and fourth counter associated with byte position [4,3] as shown.

In some instances, monitoring device 402 may transmit first candidate data 1304 to remote server 404 via communication network 406 for future use.

One of ordinary skill will appreciate that a plurality of candidates corresponding to a same first CAN ID may be identified. For instance, if secondcounter[0] of position data 1001*b* exceeded the second counting threshold, and fourthcounter[0] also exceeded the fourth counting threshold, first candidate data may also indicate another candidate of the target data in byte position [0] of an undefined CAN payload corresponding to CAN ID 0x400.

Finally, at block 1114, subprocess 1100 includes determining whether there is other CAN payload data corresponding to another first CAN ID of the group of available CAN IDs to be processed. If so, subprocess 1100 returns to block 701A, otherwise, subprocess 1100 is complete.

For example, monitoring device 402 determines whether CAN payload data corresponding to another first CAN ID in the group of available CAN IDs comprising 0x001 to 0x7FF, is still to be processed. If this is the case, subprocess 1100 returns to block 701A wherein another first CAN ID is selected, for instance, 0x689.

In some instances, CAN messages corresponding to the selected first CAN ID are not transmitted on the CAN bus. In such instances, subprocess 1100 may timeout and proceed directly to block 1114.

Target data, first reference data, first correlation relationship and second correlation relationship described in this example are provided for explanation purposes only. Similarly, third criterion and/or fourth criterion described in this example are provided for explanation purposes only. Embodiments are not intended to be limited to the examples described herein.

Subprocess 1400

Figure 14:
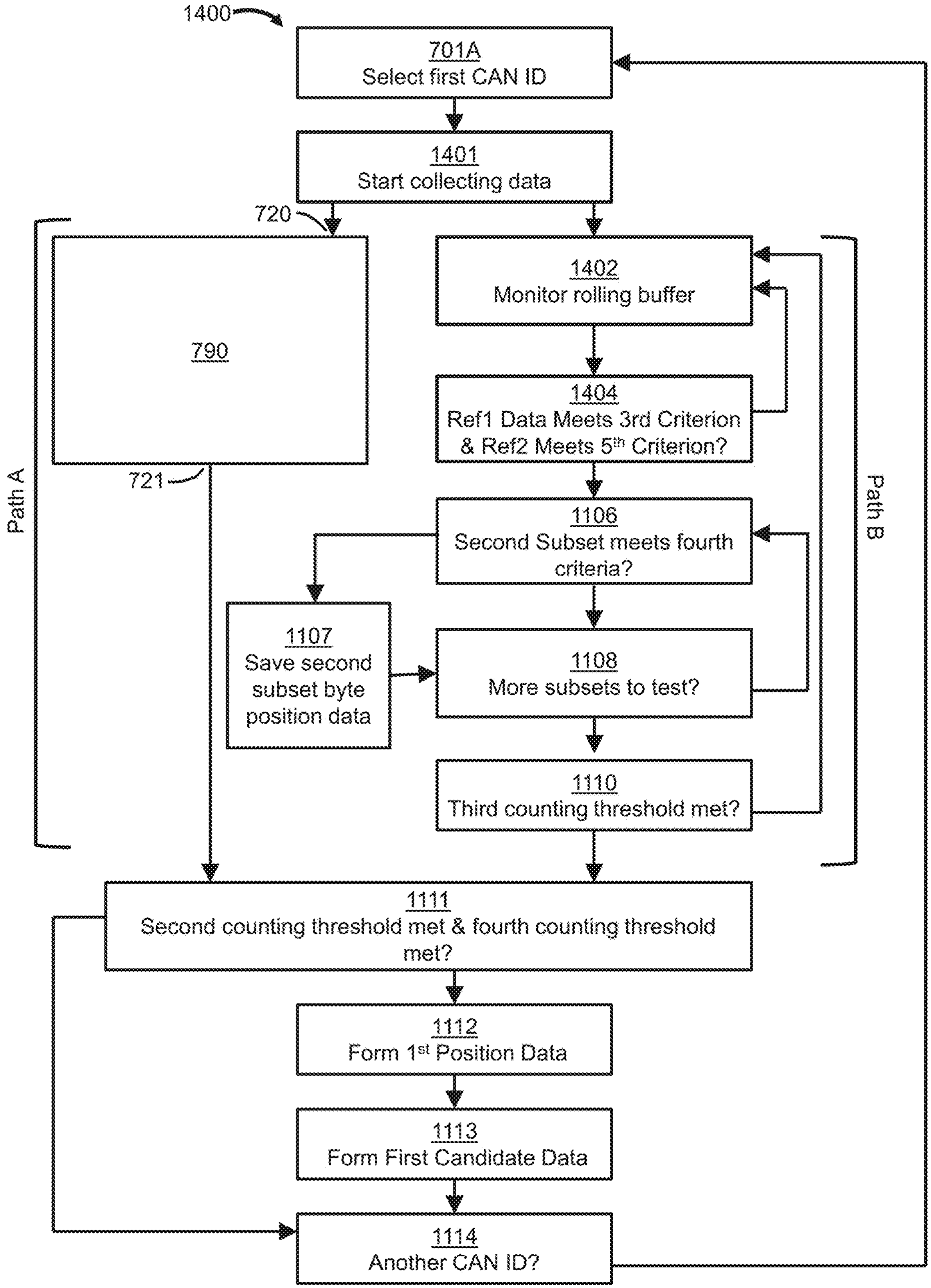
FIG. 14 depicts a simplified flow diagram of another subprocess for identifying one or more candidates for target data according to an embodiment.

Illustrated in FIG. 14 is a simplified flow diagram of another subprocess 1400 for identifying one or more candidates for target data according to an embodiment. Subprocess 1400 may include determining first candidates based on a first correlation relationship between target data and first reference data and a second correlation relationship between target data, first reference data and second reference data.

In a present example, target data may be in the form of fuel rate data, first reference data may be in the form of engine load data and second reference data may be in the form of speed data. An exemplary first correlation relationship between fuel consumption and engine load may be characterized as an increase in engine load correlates to an increase in fuel consumption. An exemplary second correlation relationship between fuel consumption, engine load and speed may be characterized as constant engine load and constant speed correlates to constant fuel consumption.

The functionality of blocks of subprocess 1400 to be described below are substantially similar and/or the same to blocks of subprocess 1100 and the previous description of the latter can be applied to the former with the exceptions as described below.

Blocks 701B, 1102, and 1104 of subprocess 1100 are replaced with blocks 1401, 1402 and 1404 respectively, in subprocess 1400.

Subprocess 1400 begins at block 701A and proceeds therefrom to block 1401. The functionality of block 1401 to be described below is substantially similar to block 701B and the previous description of block 701A can be applied to the former with the exceptions as described below.

At block 1401, in addition to collecting and storing a plurality of first reference data and a plurality of CAN payload data from a CAN bus and storing that data in a rolling buffer of size S, subprocess 1400 also includes collecting and storing a plurality of second reference data from the CAN bus and storing the plurality of second reference data in the same rolling buffer.

In some instances, first reference data, second reference data and CAN payload data are collected and stored at predefined intervals. Once all S slots of the rolling buffer are filled, subprocess 1400 proceeds to the next blocks. Notwithstanding subprocess 1400 proceeding to the next blocks, samples of first reference data, second reference data, and CAN payload data may continue to be collected and stored in the rolling buffer at predefined intervals.

Shown in FIG. 15A is a conceptual diagram of the contents of rolling buffer 800' of size 7. In this example monitoring device 402 has collected first reference data in the form of engine load data 804, undefined payload data 807 corresponding to first CAN ID 0x400, and second reference data in the form of speed data 1504. For instance, rolling buffer 800' comprises engine load data 804*g* to 804*a* in slots 1 to 7, CAN payload data 807*g* to 807*a* in slots 1 to 7, and speed data 1507*g* to 1500*a* in slots 1 to 7, respectively.

In this example, rolling buffer 800' is size 7, however, a rolling buffer may be any size.

For descriptive purposes, first reference data, second reference data, and CAN payload data are described to be collected at a predefined interval of 1 second. In practise, however, first reference data, second reference data, and CAN payload data may be collected at another predefined interval.

Alternatively, each of the plurality of second reference data is collected at a time temporally proximate a time CAN payload data is collected and first reference data is collected. For example, CAN payload data may be collected at the same time as, or at a time close to, the time first reference data and the time second reference data is collected.

From block 1401, subprocess 1400 diverges along two paths, A and B.

Referring to path A, subprocess 1400 proceeds to block 790 comprising blocks 702 to 710 via interface 720, as shown. The series of steps in block 790 as previously described with reference to FIG. 7A, and associated rolling buffer 800, are the same with reference to first reference data 804 and CAN payload data 807.

For example, the series of steps in block 790 as previously described with reference to FIG. 7A and rolling buffer 800 are the same with reference to the first column 1501 of rolling buffer 800' comprising first reference data 804 and 2nd column 1502 of rolling buffer 800' comprising CAN payload data 807.

At block 790, subprocess 1400 includes identifying candidates based on the first correlation relationship between target data and first reference data, by forming, for example, first subset data 1001 in FIG. 10A. When a first counter exceeds the first counting threshold, subprocess 1400 proceeds to block 1111 via interface 721 of block 790.

Referring now to path B, at block 1402, subprocess 1400 may include monitoring the rolling buffer and, upon receipt of new first reference data, new CAN payload data, and new second reference data, subprocess 1400 proceeds to the next block.

For example, monitoring device 402 monitors rolling buffer 800' and upon storage of new engine load data 804*g*, new CAN payload data 807*g*, and new speed data 1507*g*, for example in slot 1, subprocess 1400 proceeds to block 1404.

At block 1404, subprocess 1400 may include determining whether the first reference data and the second reference data provide a valid test condition for evaluating whether the first reference data, second reference data and CAN payload data satisfy a second correlation relationship.

A specific and non-limiting example of a method for determining whether the first reference data and second reference data provide a valid test condition is by determining whether the first reference data and second reference data meets a fifth criterion and sixth criterion, respectively, indicative of the second correlation relationship.

An exemplary fifth criterion may be engine load represented by engine load data 804 in each slot of rolling buffer 800' must be within a predefined value of the average thereof, An exemplary predefined value is 1. An exemplary sixth criterion may be speed represented by speed data 1507 in each slot of rolling buffer 800' must be within a predefined value of the average thereof, for example, 2 km/hr.

Referring again to FIG. 12A, shown is table 1201 comprising exemplary engine load data 804*a*-804*g* presently stored in rolling buffer 800. Table 1201 also includes the difference 1205 between engine load 904 and the average engine load 1220 as determined by monitoring device 402. As engine load 1204 represented by engine load data 804 in each slot of rolling buffer 800 is within 1 of the average engine load 1220, 4.7%, engine load data 804 meets the fifth criterion.

Referring now to FIG. 15B, shown is table 1510 comprising exemplary speed data 1507*a*-1507*g* presently stored in rolling buffer 800'. In the present example, monitoring device 402 calculates the speed 1513 indicated by speed data 1507 and the average speed 1520, 110 km/hr. Next, monitoring device 402 determines the difference 1514 between speed 1513 and average speed 1520, as shown in table 1510. As the difference 1514 is within 2 km/hr of the average speed, speed data 1507 meets the sixth criterion.

Still at block 1404, subprocess 1400 may include incrementing a third counter if the first reference data meets the fifth criterion and the second reference data meets the sixth criterion. In this example, the third counter indicates the total number of instances first reference data and second reference data provides a valid test condition for evaluating whether the first reference data, second reference data and CAN payload data satisfy the second correlation relationship.

If the first reference data and the second reference data provide a valid test condition for evaluating whether the first reference data, second reference data and CAN payload data satisfy the second correlation relationship, subprocess 1400 proceeds to block 1106, otherwise, subprocess 1400 returns to block 1402.

In other embodiments for identifying one or more candidates for target data according to an embodiment. Subprocess 1400 may include determining first candidates based on a first correlation relationship between target data and first reference data and a second correlation relationship between target data, first reference data and second reference data.

In some embodiments of subprocesses for identifying one or more candidates for target data may include determining first candidates based on one or more correlation relationships between target data and one or more reference data. Some specific and non-limiting examples include, determining first candidates based on a first reference data, second reference data and target data satisfying a first correlation relationship; determining first candidates based on a first reference data, second reference data, third reference data and target data satisfying a second correlation relationship; determining first candidates based on a first reference data, second reference data, and target data satisfying a second correlation relationship and at least a third reference data and target data satisfying a third correlation relationship. Other correlation relationships between target data and various reference data for identifying one or more candidates for target data may be envisioned. Numerous other embodiments of the invention will be apparent to persons skilled in the art without departing from the scope of the invention as defined in the appended claims.

The example above describes target data, i.e., undefined manufacturer-specific CAN data, as fuel rate data, first reference data as engine load data, and second reference data as speed data for illustrative purposes only. However, target data may be any vehicle variable-related data, first reference data and second reference data may also be any vehicle variable-related data. Specific and non-limiting examples of target data include, odometer data and speed data, e.g., speed data included in manufacturer-specific CAN data.

Target data, first reference data, second reference data, first and second correlation relationships described in the examples above are for explanation purposes only and embodiments are not intended to be limited to the examples described herein. Target data may include any vehicle-related transmitted on a CAN bus.

Subprocess 1600

Figure 16:
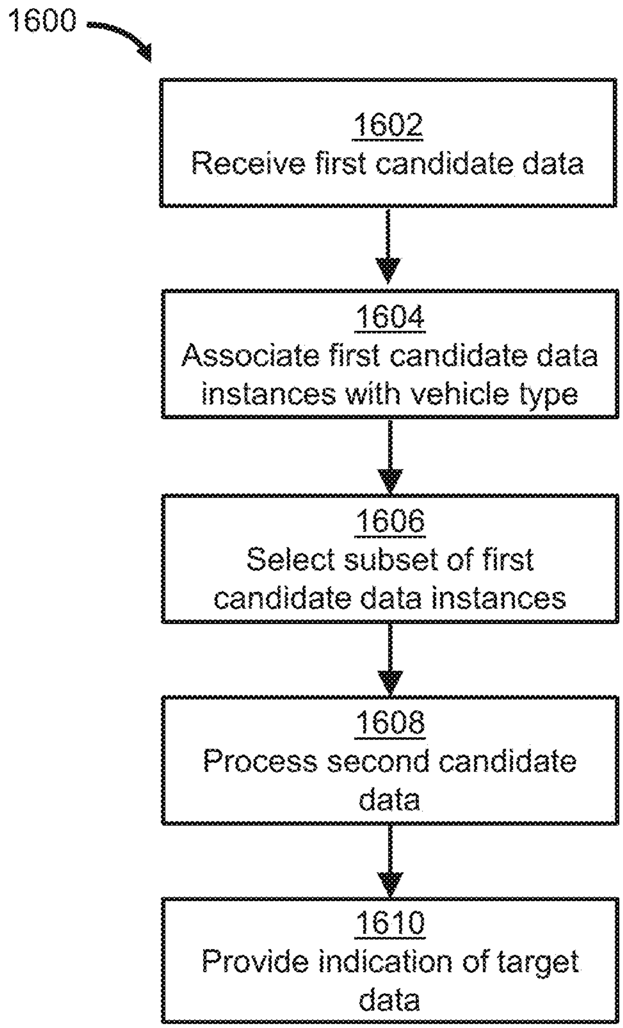
FIG. 16 depicts a simplified flow diagram of a subprocess for identifying manufacturer-specific CAN data for a first vehicle type according to an embodiment.

Shown in FIG. 16 is a simplified flow diagram of subprocess 1600 for identifying manufacturer-specific CAN data, i.e., target data, for a first vehicle type according to an embodiment. Starting at block 1602, subprocess 1600 may include receiving a plurality of first candidate data from a plurality of first processes, for example, subprocesses 700, 700', 1100, 1400, 2100, 2500, 2700, and 2900.

In a first example, target data may be in the form of fuel rate data and a vehicle type may be in the form of a 2020 Toyota Corolla.

In this example, monitoring devices 402 of telematics system 400 may each transmit a plurality of first candidate data to remote server 404 via communication network 406. Shown in FIG. 17A is a conceptual diagram of exemplary first candidate data 1700 received by remote server 404. First candidate data 1700 may be stored in a datastore TBD of remote server 404 or other datastore.

Firstly, at block 1604, subprocess 1600 includes associating a vehicle type with each first candidate data of the plurality of first candidate data received.

For example, remote server 404 associates first candidate data 1701 of the plurality of first candidate data 1700 with a vehicle type ID 6002 corresponding to a vehicle type, as shown in FIG. 17A. Vehicle type ID 6002 indicates a vehicle type of vehicle 408 associated with each monitoring device 402. Remote server 404 may have previously received data indicating a vehicle type associated with each monitoring device 402.

In this example, vehicle types are defined by vehicle make, model and year. Exemplary vehicle type IDs are provided in table 1720 in FIG. 17B. For instance, vehicle type ID 5674 corresponds to a vehicle type defined as a 2017 Toyota Corolla. In this example, each first candidate data 1701 of the plurality of first candidate data 1700 indicates a first candidate for fuel rate data for a vehicle type.

Next, at block 1606, subprocess 1600 includes selecting a subset of first candidate data corresponding to a first vehicle type for forming second candidate data. Second candidate data indicates candidates for target data for the first vehicle type.

For example, remote server 404 selects a subset of first candidate data 1700 corresponding to vehicle type ID 6002 associated with vehicle type 2020 Toyota, Corolla to form exemplary second candidate data 1730, shown in FIG. 17C. Second candidate data 1730 indicates two possible candidates for target data, i.e., fuel rate data. In particular, a first candidate in byte position [4,3] of CAN payload data corresponding to CAN ID 0x400 and a second candidate in byte position [0,1] of CAN payload data corresponding to CAN ID 0x022.

Next, at block 1608, subprocess 1600 processes second candidate data to determine which of the first candidates indicated thereby is likely to indicate target data associated with the first vehicle type.

In a first example, remote server 402 may process second candidate data 1730 to determine the most likely first candidate by selecting the first candidate that is indicated in the greatest number of instances thereof. For instance, a first candidate corresponding to byte position [4,3] and CAN ID 0x400 is indicated in six instances out of seven instances. Whereas a first candidate corresponding to byte position [0,1] and CAN ID 0x022 is indicated once out of seven instances.

Alternatively, remote server 402 may process second candidate data 1730 and other data for determining the most likely first candidate. For example, data indicative of a counter related to a first candidate may be included in first candidate data. In such instances, remote server 402 may process second candidate data 1730 and data indicative of a counter related to a first candidate data for determining the most likely first candidate.

In this example, remote server 404 identifies fuel rate data for a 2020 Toyota Corolla as data in byte position [4,3] of CAN payload data corresponding to CAN ID 0x400.

Finally, at block 1608, subprocess 1600 generates identification data corresponding to the identity of the manufacturer-specific CAN data for the first vehicle type, the identification data indicative of a manufacturer-specific CAN data byte position and corresponding manufacturer-specific CAN data CAN ID associated with the second candidate data. In other words, identification data provides an indication of a byte position(s) and CAN ID corresponding to the target data, i.e. manufacturer-specific CAN data.

For example, remote server 404 generates identification data for providing thereof to a fleet manager. In the present example, remote server 404 may indicate to a fleet manager that fuel rate data for a 2020 Toyota Corolla is located at byte positions [4,3] of CAN payload data corresponding to CAN ID 0x400. Shown in FIG. 17D is a conceptual diagram of exemplary identification data indicating fuel rate data for a 2020 Toyota Corolla that may be provided by remote server 404 to a fleet manager.

Alternatively, and/or additionally, identification data is stored, for example, in a datastore of the remote server 404, for future use thereby.

Process 1800

Figure 18:
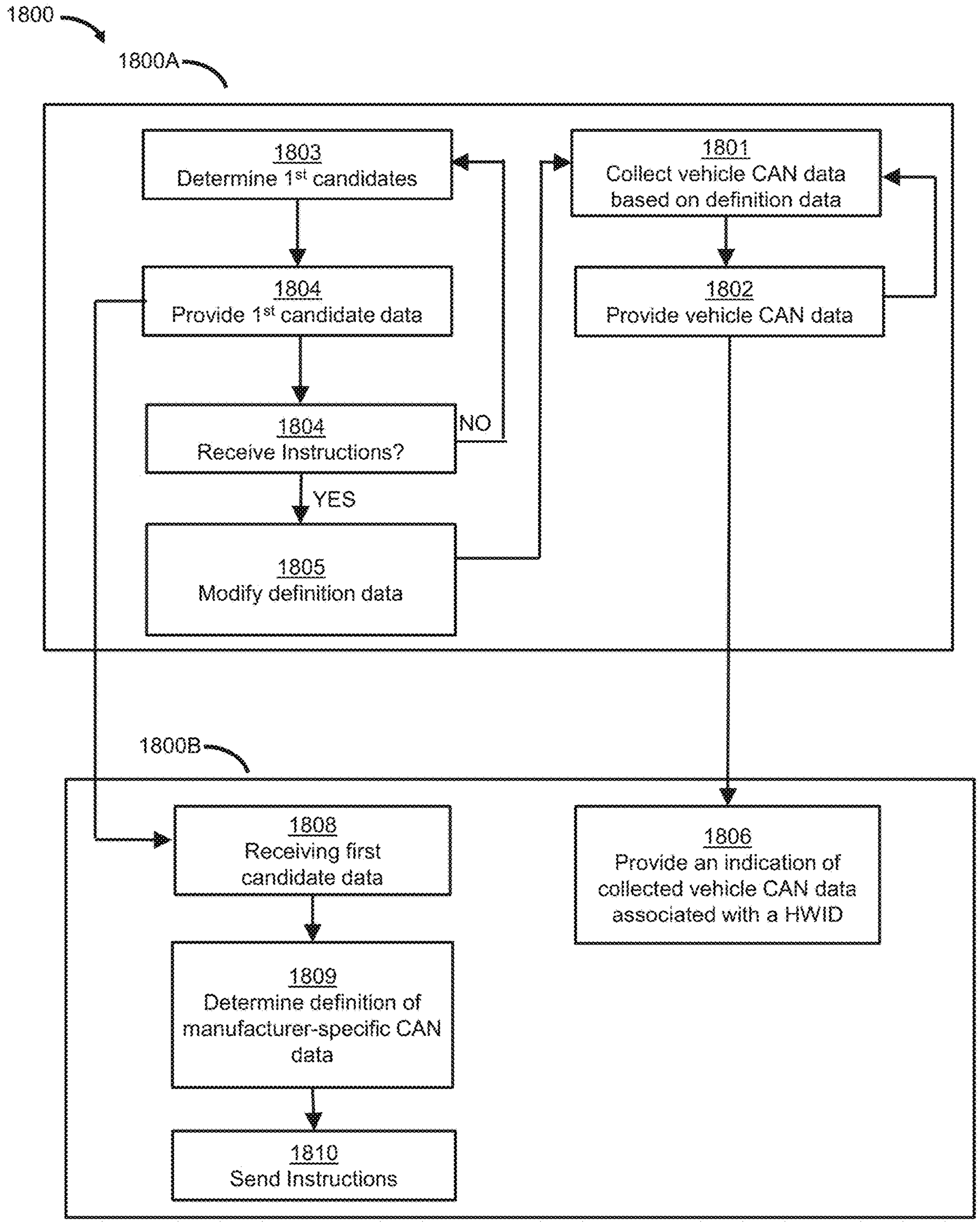
FIG. 18 depicts a simplified flow diagram of a process for collecting manufacture-specific CAN data according to an embodiment.

Now referring to FIG. 18, shown is a simplified flow diagram of a process 1800 for collecting manufacture-specific CAN data for at least a first vehicle type according to an embodiment.

Process 1800 includes a plurality of subprocesses 1800A and a subprocess 1800B. Subprocess 1800 and subprocess 1800B are described further below with reference to FIGS. 18, 19, 20A, and 20B.

Figure 19:
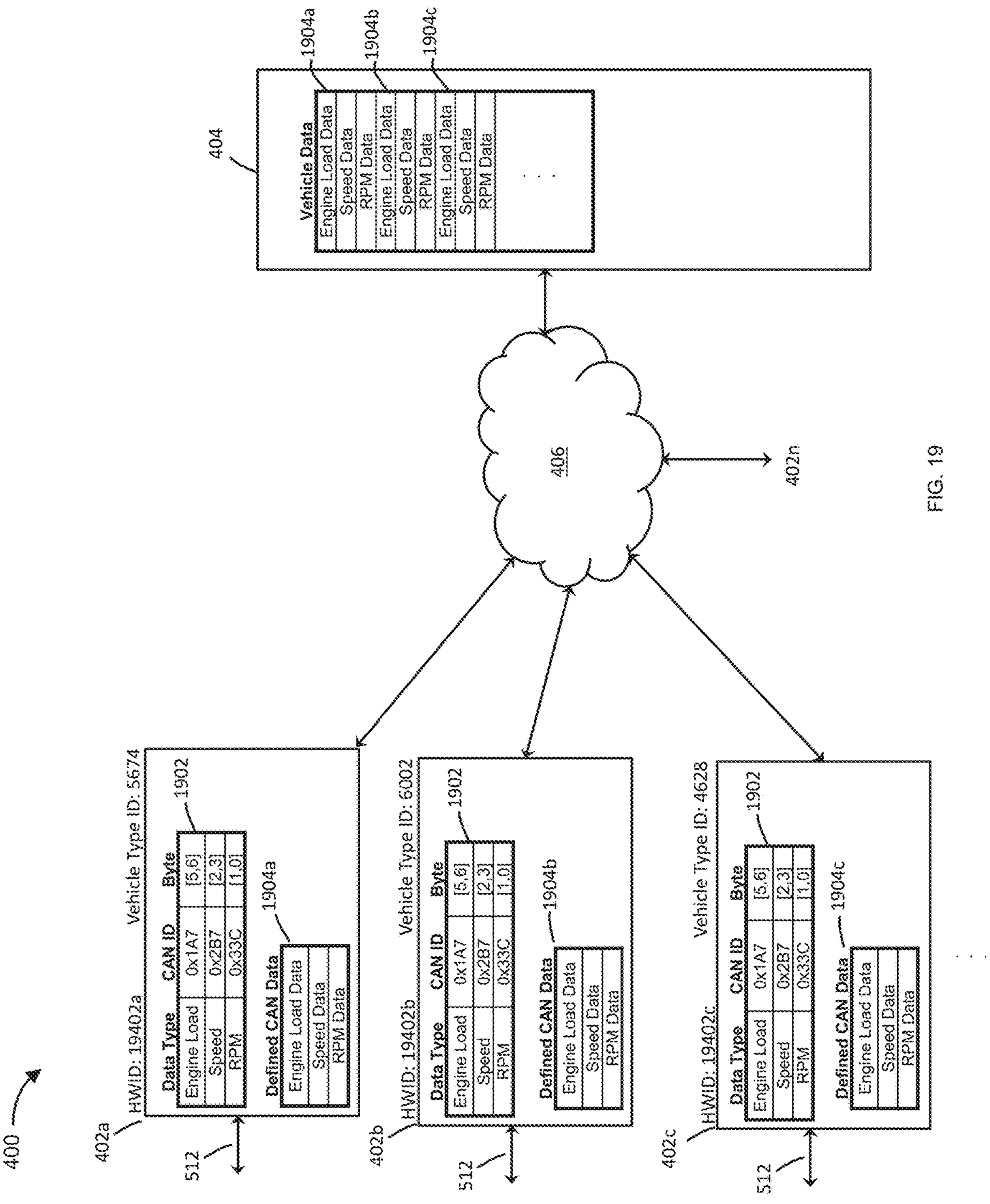
FIG. 19 depicts a simplified diagram of an exemplary telematics system according to an embodiment.

Shown in FIG. 19 is another simplified diagram of exemplary telematics system 400 including remote server 404 communicatively coupled to monitoring devices 402*a*, 402*b* and 402*c* via communication network 406.

Subprocess 1800A

Beginning at block 1801, subprocess 1800A includes collecting vehicle CAN data based on definition data. Definition data includes definitions defining CAN payload data bytes and CAN ID for vehicle CAN data to be collected. Subprocess 1800A is associated with a unique hardware ID (HWID) and a vehicle type of a plurality of vehicle types.

For instance, each of monitoring devices 402*a*, 402*b*, and 402*c*, are assigned HWIDs 19402*a*, 19402*b*, 19402*c*, respectively, and correspond to vehicle type IDs 5674, 6002 and 4628, respectively, indicative of a vehicle type. In this example, monitoring device 402 is configured to collect a plurality of vehicle CAN data from CAN bus 512. For instance, exemplary definition data 1902 stored, for example, in datastore 506, include definitions of a plurality of vehicle CAN data including CAN payload byte position(s) and corresponding CAN ID of vehicle CAN data to be collected. In this example definition data 1902 indicates that vehicle CAN data, engine load, speed and RPM are to be collected from CAN payload data bytes [5,6] corresponding to CAN ID 0x1A7, CAN payload data bytes [2,3] corresponding to CAN ID 0x2B7 and CAN payload data bytes [1,0] corresponding to CAN ID 0x33C, respectively.

In the present example, monitoring device 402 collects vehicle CAN data 1904 including engine load data, speed data, and RPM data from CAN bus 512 and stores vehicle CAN data 1904, for example, in datastore 506.

Next, at block 1802, subprocess 1800A includes providing collected vehicle CAN data indicated to subprocess 18008.

For example, each of monitoring devices 402*a*, 402*b*, and 402*c*, transmits vehicle CAN data 1904*a*,1904*b*, and 1904*c*, to remote sever 404 via communication network 406.

At block 1803, subprocess 1800A includes determining first candidates for manufacturer-specific CAN data for forming first candidate data.

In the present example, manufacturer-specific data includes fuel data.

Figure 20A:
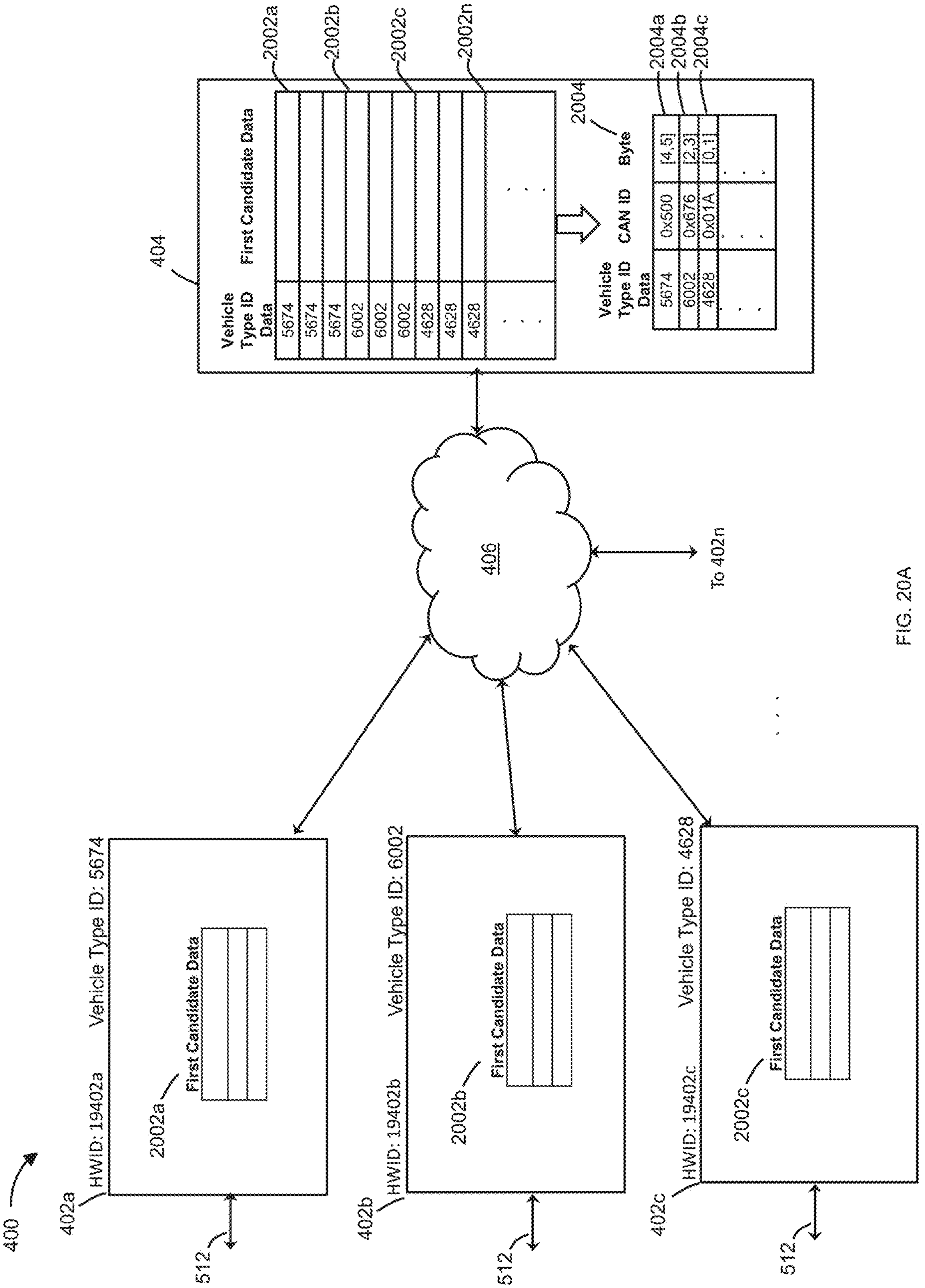
FIG. 20A depicts another simplified diagram of an exemplary telematics system according to an embodiment.

Referring now to FIG. 20A, shown is another simplified diagram of exemplary telematics system 400 including remote server 404 communicatively coupled to monitoring devices 402*a*, 402*b* and 402*c* via communication network 406. In the present example, monitoring device 402 follows steps described in one or more subprocesses including, 601, 700, 700', 1100, 1400, 2100, 2500, 2700 and 2900 for determining first candidates for manufacturer-specific CAN data. For example, each of monitoring devices 402*a*, 402*b*, and 402*c* determines first candidate data 2002*a*, 2002*b*, and 2002*c*, as shown.

Next, at block 1804, subprocess 1800A includes providing first candidate data to subprocess 18008.

For example, each of monitoring devices 402*a*, 402*b*, and 402*c*, transmits first candidate data 2002*a*, 2002*b*, and 2002*c* to remote sever 404 via communication network 406.

At block 1805, subprocess 1800A includes determining whether instruction data was provided by subprocess 18008, instructing modification of definition data to include a definition of manufacturer-specific CAN data. If so, subprocess 1800A proceeds to block 1805, otherwise, subprocess 1800A proceeds to block 1803.

For example, monitoring device 402 determines if it has received instruction data from remote server 404 instructing definition data 1902 to be modified to include a definition of manufacturer-specific CAN data.

According to an embodiment, instruction data may be received in the form of an instruction including definitions of manufacturer-specific CAN data.

For instance, monitoring devices 402 receives instruction data from remote server 404 including instructions to modify definition data 1902 to include definitions of manufacturer-specific CAN data, i.e., fuel data.

In a first example, monitoring devices 402*a*, 402*b* and 402*c* receives first instruction data including definitions of manufacturer-specific CAN data associated with vehicle type ID 5674. In this example, monitoring device 402*a* associated with vehicle type ID 5674 determines it has received instructions to modify definition data 1902. However, monitoring devices 402*b* and 402*c* associated with vehicle type IDs, 6002 and 4628, ignore the instruction data as if it was never received.

In a second example, monitoring device 402*a* receives first instruction data including definitions of manufacturer-specific CAN data associated with vehicle type ID 5674, monitoring device 402*b* receives second instruction data including definitions of manufacturer-specific CAN data associated with vehicle type ID 6002, and monitoring device 402*c* receives third instruction data including definitions of manufacturer-specific CAN data associated with vehicle type ID 4628.

According to another embodiment, instruction data may be received in the form of second monitoring device instructions.

For example, upon receiving second monitoring device instructions, monitoring device 402 stores the second monitoring device instructions in a non-transitory machine-readable storage medium, included in, for example, datastore 506. The monitoring device instructions that when executed cause processing resource 504 to, collect CAN payload data defined by definition data, definition data indicative of definitions of vehicle CAN data including a definition of manufacturer-specific CAN data associated with the at least a first vehicle type, and to transmit the vehicle CAN data.

At block 1805, subprocess 1800A includes modifying definition data to include definitions of manufacturer-specific CAN data.

Figure 20B:
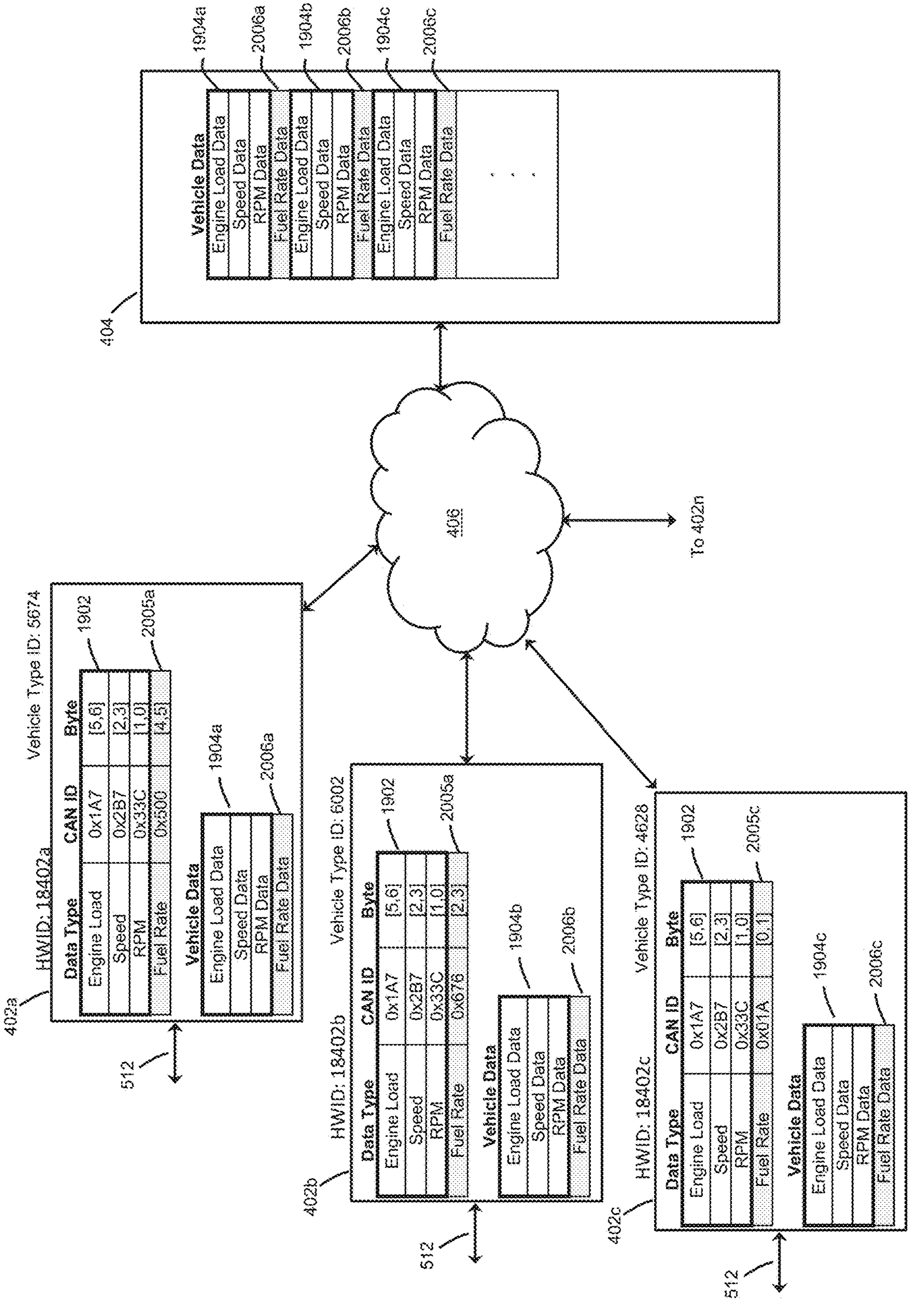
FIG. 20B depicts yet another simplified diagram of an exemplary telematics system according to an embodiment.

For example, provided each of monitoring devices 402*a*, 402*b* and 402*c* have received instruction data to modify definition data 1902, and definition data 1902 is modified to include definition data 2005*a*, 2005*b*, and 2005*b*, corresponding to fuel data associated with vehicle type IDs 5674, 6002 and 4628, respectively, as shown in FIG. 20B. FIG. 20B is yet another simplified diagram of exemplary telematics system 400.

Next, subprocess 1800A proceeds to block 1801.

In this example, monitoring devices 402*a*, 402*b* and 402*c*, collects vehicle data 1904*a*, 1904*b* and 1904*c*, including fuel rate data 2006*a*, 2006*b* and 2007*c* according to definition data 1902, as shown in FIG. 20B.

Next, at block 1802, subprocess 1800A includes providing collected vehicle CAN data indicated by definition data 1902 to subprocess 1800B.

For example, each of monitoring devices 402*a*, 402*b*, and 402*c*, transmits vehicle CAN data 1904*a*, 1904*b* and 1904*c*, including fuel rate data 2006*a*, 2006*b* and 2007*c*, respectively, to remote sever 404 via communication network 406, as shown.

Subprocess 1800B

Subprocess 1800B begins at block 1806, including receiving a plurality of CAN vehicle data from a plurality of subprocesses 1800A and providing an indication of CAN vehicle data associated with at least a HWID.

For example, remote server 404 receives CAN vehicle data 1904*a*, 1904*b* and 1900*c* from monitoring devices 402*a*, 402*b* and 402*c* respectively, as shown in FIG. 19. Remote server 404 then provides an indication of CAN vehicle data 1904*a* associated with HWID 19402*a*, for example, to a fleet manager including engine load data, speed data and RPM data of vehicle 402*a*.

At block 1808, subprocess 1800B includes receiving a plurality of first candidate data from the plurality of subprocess 1800A.

For example, remote server 404 receives first candidate data 2002*a*, 2002*b* and 2002*c* from monitoring devices 402*a*, 402*b* and 402*c* respectively, as shown in FIG. 20A.

Next, at block 1809, subprocess 1800B includes identifying manufacturer-specific CAN data and determining a definition thereof for at least one vehicle type, e.g., identification data.

For instance, remote server 404 follows steps described in one or more subprocesses including, subprocess 602 or 1600 for determining a definition of manufacturer-specific CAN data, i.e., fuel rate, for at least of one the vehicle types associated with vehicle type IDs 4574, 6002, or 4628.

In this example, remote server 404 determines a definition of manufacturer-specific CAN data, i.e., fuel data, for a vehicle type associated with vehicle type IDs 4574. For instance, a definition for manufacturer-specific CAN data associated with a vehicle type associated with vehicle type ID 4574, includes CAN ID 0x500 and CAN payload bytes [4,5] as shown in data 2004*a*.

Optionally, remote server 404 determines a definition of manufacturer-specific CAN data, i.e., fuel data, for multiple vehicle types with associated vehicle type IDs 4574 and 6002 For instance, a definition for manufacturer-specific CAN data associated with a vehicle type associated with vehicle type ID 4574, includes CAN ID 0x500 and CAN payload bytes [4,5] as shown in data 2004*a*. A definition for manufacturer-specific CAN data associated with a vehicle type associated with vehicle type ID 6002, includes CAN ID 0x676 and CAN payload bytes [2,3] as shown in data 2004*a*.

Further optionally, remote server 404 determines a definition of manufacturer-specific CAN data, i.e., fuel data, for multiple vehicle types with associated vehicle type IDs 4574, 6002 and 4628. For instance, a definition for manufacturer-specific CAN data associated with a vehicle type associated with vehicle type ID 4574, includes CAN ID 0x500 and CAN payload bytes [4,5] as shown in data 2004*a*. A definition for manufacturer-specific CAN data associated with a vehicle type associated with vehicle type ID 6002, includes CAN ID 0x676 and CAN payload bytes [2,3] as shown in data 2004*b*. A definition for manufacturer-specific CAN data associated with a vehicle type associated with vehicle type ID 4628, includes CAN ID 0x01A and CAN payload bytes [0,1] as shown in data 2004*c*.

Finally, in block 1810, subprocess 1800B includes providing instruction data to a portion of the plurality of subprocesses 1800A for modifying definition data to include a definition for manufacturer-specific CAN data associated with at least a first vehicle type.

For example, remote server 404 transmits to all monitoring devices 402 first instruction data instructing monitoring devices to modify definition data 1902 to include a definition of manufacturer-specific CAN data 2005*a* associated with the at least a vehicle type associated with vehicle type ID 5674.

Alternatively, remote server 404 transmits to a portion of monitoring devices 402 corresponding to vehicle types associated with vehicle type ID 5674 first instruction data to modify definition data 1902 to include a definition of manufacturer-specific CAN data 2005*a* associated with the at least a vehicle type associated with vehicle type ID 5674.

Further alternatively, remote server 404 transmits first instruction data to a portion of monitoring devices 402 corresponding to vehicle types associated with vehicle type ID 5674 to modify definition data 1902 to include a definition of manufacturer-specific CAN data 2005*a* associated with a vehicle type associated with vehicle type ID 5674. Then remote server 404 transmits second instruction data to another portion of monitoring devices 402 corresponding to vehicle types associated with vehicle type ID 6002 to modify definition data 1902 to include a definition of manufacturer-specific CAN data 2005*b* associated with a vehicle type associated with vehicle type ID 6002.

Yet further alternatively, remote server generates second monitoring device instructions and transmits instruction data including the second monitoring device instructions. For example, second monitoring device instructions may include instructions to perform a firmware upgrade and a corresponding firmware file. Second monitoring device instructions further include definition data including a definition of manufacturer-specific CAN data.

According to an alternative embodiment, steps described in block 1803 of subprocess 1800A are not carried out unless a subprocess 1800A is associated with a vehicle type for which a definition is not provided in definition data.

For example, upon adding a new monitoring device 402 to telematics system 400, and detecting that definition data for manufacturer-specific CAN data (e.g., fuel data) is not included in definition data 1902, only then will the new monitoring device start to determine first candidates as described in block 1803 of subprocess 1800A. In such instances, the new monitoring device may be a monitoring device associated with a new vehicle type in telematics system 400. Alternatively, remote server 404 may not have sufficient first candidate data to determine a definition of manufacturer-specific data.

According to an embodiment, steps described in subprocess 1800A may be embodied in computer-executable instructions implemented as software, system software, firmware, middleware, embedded code, or any other suitable type of computer code.

For example, steps described in subprocess 1800A may be performed on monitoring device 402. For instance, monitoring device 402 may include a first processing resource, e.g., processing resource 504, and a first non-transitory machine-readable storage medium, for example, stored in datastore 506 comprising first monitoring device instructions that when executed cause the first processing resource to, collect vehicle CAN data based on definition data, transmit the vehicle CAN data to remote server 404, determine first candidate data indicative of first candidates for manufacturer-specific CAN data, transmit the first candidate data to remote server 404 and upon receiving second monitoring device instructions, storing the second monitoring device instructions in the first non-transitory machine-readable storage medium, the second monitoring device instructions that when executed cause the processing resource to collect CAN payload data defined by definition data, definition data indicative of definitions of vehicle CAN data including a definition of manufacturer-specific CAN data associated with the at least a first vehicle type and transmit the vehicle CAN data.

According to an embodiment, steps described in subprocess 18008 may be embodied in computer-executable instructions implemented as software, system software, firmware, middleware, embedded code, or any other suitable type of computer code.

For example, steps described in subprocess 1800B may be performed on remote server 404. For instance, remote server 404 may include a second processing resource and a second non-transitory machine-readable storage medium, for example, stored in a local datastore, comprising instructions that when executed cause the second processing resource to, receive from the plurality of monitoring devices a plurality of vehicle CAN data, process the plurality of vehicle CAN data for providing an indication of vehicle CAN data associated with at least a first HWID, receive a plurality of first candidate data, process the plurality of the first candidate data for determining a definition for the manufacturer-specific CAN data associated with the at least a first vehicle type, generate second monitoring device instructions, and transmit second monitoring device instructions to a portion of the plurality of monitoring devices associated with the at least a first vehicle type.

Coefficient of Correlation

According to some embodiments, candidates for target data may be identified based on a correlation coefficient between CAN payload data and reference data, wherein the reference data is known to have a strong correlation with the manufacturer-specified CAN data (i.e., target data). As described hereinabove, target data may include one or more bytes of an undefined CAN message payload. Some embodiments may include determining a first correlation coefficient between one or more subsets, e.g., at least a first subset, of CAN payload data in any byte position(s) [0] to [7] and the reference data. A high correlation coefficient may indicate a subset of CAN payload data to be a candidate for target data.

Subprocess 2100

Figure 21:
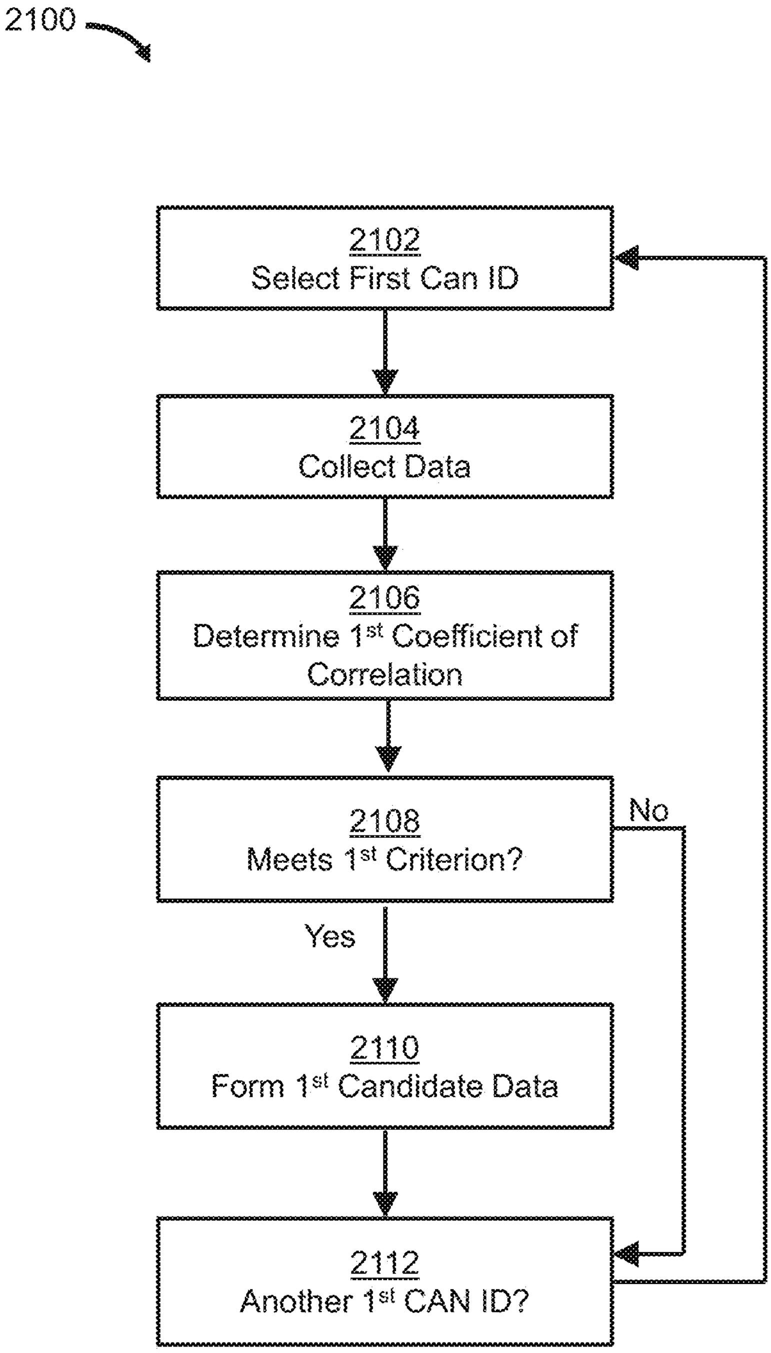
FIG. 21 depicts a simplified flow diagram of another subprocess for identifying one or more candidates for target data based on a high correlation coefficient between a product of fourth reference data and fifth reference data, and CAN payload data, according to an embodiment.

Shown in FIG. 21 is a simplified flow diagram of a subprocess 2100 for identifying one or more candidates for target data according to an embodiment. Subprocess 2100 includes identifying candidates based on a high correlation coefficient between reference data and CAN payload data. For instance, candidates may be identified by determining a coefficient of correlation between CAN payload data and fourth reference data. In another instance, candidates may be identified by determining a coefficient of correlation between CAN payload data and a product of a fourth reference data and a fifth reference data.

In a first example, target data may be in the form of fuel rate data, a fourth reference data may be in the form of engine load data, and a fifth reference data may be in a form of RPM data.

In the present example, candidates for target data, in the form of fuel rate data, may be identified by determining a correlation coefficient between CAN payload data and a product of fourth reference data in the form of engine load data and fifth reference data in the form of RPM data.

For instance, airflow through a vehicle engine is proportional to EL*RPM i.e., engine load*revolutions per min. As fuel rate is proportional to airflow through a vehicle engine, fuel rate may also be proportional to a product of engine load and RPM. Correspondingly, there may a high correlation coefficient between fuel rate data and a product of engine load data and RPM data.

Beginning at block 2102, subprocess 2100 includes selecting a first CAN ID from a group of available CAN IDs. Some examples of available CAN IDs may include unreserved CAN IDs in the SAE J1939 standard, the SAE J1962 standard, and/or other vehicle bus standards.

In the present example, monitoring device 402 selects first CAN ID 0x400 from a group of available CAN IDs including 0x001 to 0x7FF. However, any available CAN ID from the group may be selected.

Next, at block 2104, subprocess 2100 includes collecting a plurality of fourth reference data, a plurality of fifth reference data and a plurality of CAN payload data from a CAN bus and storing thereof in a rolling buffer of size S.

In some instances, fourth reference data, fifth reference data and CAN payload data are collected at predefined intervals. Alternatively, the plurality of CAN payload data, fourth reference data and fifth reference data are each collected at a time temporally proximate one another. For example, CAN payload data may be collected at the same time as, or at a time close to, the time fourth reference data, and at the same time, or at a time close to, the time fifth reference data is collected.

Shown in FIG. 22A is a conceptual diagram of a rolling buffer 2200 of size 12, i.e., S=12. In the present example, monitoring device 402 collects fourth reference data in the form of engine load data 2202, fifth reference data in the form of RPM data 2204, and CAN payload data 2207 corresponding to first CAN ID 0x400 from a CAN bus, such as CAN bus 512, and stores this data in rolling buffer 2200. In this example, rolling buffer 2200 has a size of 12, however, a rolling buffer may be any size (i.e., have any number of slots). In some instances, RPM data on a CAN bus is provided in units of 0.25 RPM/bit. In these instances, upon collecting RPM data on a CAN bus, a monitoring device may process the collected RPM data, such as divide the collected RPM data by 4, and store a result as RPM data in the rolling buffer. Alternatively, a monitoring device may convert RPM data at any time to reflect the actual RPM value.

Optionally, one or more of fourth reference data, fifth reference data and CAN payload data may be stored in a separate rolling buffer of a same size, S.

For descriptive purposes, engine load data 2202, RPM data 2204, and CAN payload data 2207 are collected at a predefined interval of 1 second. In practise, however, this data may be collected at another predefined interval.

Rolling buffer 2200 comprises engine load data 2202-1 to 2202-12 in slots 1 to 12, respectively, RPM data 2204-1 to 2204-12 in slots 1 to 12, respectively, and CAN payload data 2207-1 to 2207-12 in slots 1 to 12, respectively, as shown.

FIG. 22B, is a conceptual diagram of CAN payload data 2207-1 to 2207-12 presently stored in slots 1 to 12, respectively, of rolling buffer 2200. For instance, CAN payload data 2207-1 in slot 1 includes byte 2207-1-0 in byte position [0], 2207-1-1 in byte position [1], 2207-1-2 in byte position [2], and so forth. Similarly, CAN payload data 2207-12 in slot 12 includes byte 2207-12-0 in byte position [0], 2207-12-1 in byte position [1], 2207-12-2 in byte position [2], and so forth. Shown in FIG. 23A, shown are exemplary engine load values 2302 indicative of engine load data 2202 and exemplary RPM values 2304 indicative of RPM data 2204 presently stored in rolling buffer 2200.

Next, at block 2106, subprocess 2100 includes determining a first correlation coefficient between each of the one or more subsets, e.g., at least a first subset, of the CAN payload data and a product of fourth reference data and fifth reference data. Subprocess 2100 further includes forming first correlation coefficient data indicative of the first correlation coefficients.

In the present example, monitoring device 402 processes engine load data 2202 and RPM data 2204 to calculate a product thereof to form product data 2210, shown in FIG. 22C. Exemplary values 2310 of product data 2210, (i.e., EL*RPM) are shown in FIG. 23B.

Monitoring device 402 then determines a first correlation coefficient between one or more subsets, e.g., at least a first subset, of CAN payload data 2207 and product data 2210.

According to an embodiment, determining a first correlation coefficient between one or more subsets, e.g., at least a first subset, of the CAN payload data and a product of fourth reference data and fifth reference data may be determined according to Pearson's correlation coefficient, a statistic that measures linear correlation between two variables X and Y, and is defined as $$r1 = \frac{\mathrm{CoVar}(XY)}{\sqrt{\mathrm{Var}(X)}\sqrt{\mathrm{Var}(Y)}} = \frac{\mathrm{CoVar}(XY)}{\sigma_x * \sigma_y}, \quad \text{Eq. 1}$$

wherein

CoVar(X,Y) is the covariance of X and Y,

σx, is the standard deviation of X and σy is the standard deviation of Y.

The covariance of X and Y is defined as:

$$\mathrm{CoVar}(X, Y) = \frac{\sum_{i=1}^{n} [(x_i - \overline{x}) * (y_i - \overline{y})]}{N}, \quad \text{Eq. 2}$$

wherein xi represents an i-th sample of X and $\bar{x}$ represents a mean of samples of X, yi represents an i-th sample Y and $\bar{y}$ represents a mean of samples Y, and N represents the number of samples of each of X and Y.

The standard deviation, σx, of X, is defined as, $$\sigma x = \sqrt{\mathrm{Var}(X)} = \sqrt{\frac{\sum_{i=1}^{n}(x_i - \bar{x})^2}{N}} \quad \text{Eq. 3}$$

Var(X) is the variance of X and is defined as, $$\mathrm{Var}(X) = \frac{\sum_{i=1}^{n}(x_i - \bar{x})^2}{N} \quad \text{Eq. 4}$$

The standard deviation, σy, of Y, is defined as, $$\sigma y = \sqrt{\mathrm{Var}(Y)} = \sqrt{\frac{\sum_{i=1}^{n}(y_i - \bar{y})^2}{N}} \quad \text{Eq. 5}$$

Var(Y) is the variance of Y and is defined by:

$$\mathrm{Var}(Y) = \frac{\sum_{i=1}^{n}(y_i - \bar{y})^2}{N} \quad \text{Eq. 6}$$

Pearson's correlation coefficient may be applied to a sample of variables X and Y for determining a correlation coefficient therebetween. For instance, a sample may comprise paired data {(x1,y1), . . . , (xn, yn)} including n pairs of samples.

In the present example, a first correlation coefficient, r1, between a subset of CAN payload data 2207 and product data 2210, (i.e., EL*RPM) is determined according to Pearson's correlation coefficient.

For instance, X represents product data, i.e., a product of engine load data and RPM data, and Y represents a subset of CAN payload data.

Monitoring device 402 may calculate r1 according to the steps described below.

Var(X)

Firstly, monitoring device 402 may calculate $$\mathrm{Var}(X) = \frac{\sum_{i=1}^{n}(x_t - \bar{x})^2}{N}$$

wherein xi represents an i-th instance of product data 2210. For example, x1 corresponds to a first instance of product data 2210-1, having exemplary value 2310-1, 831312, as shown in FIG. 23B. N represents the number of instances of product data 2210. In this example, buffer 2200 has 12 slots, thus N=12. Monitoring device 402 calculates $\bar{x}$, a mean of all instances of product data 2210 to be $\bar{x}$=450107.

Monitoring device 402 then calculates $(x_i - \bar{x})^2$ for each of the 12 instances of product data 2210 to form first data. Exemplary values 2308 of first data are shown in FIG. 23C. For example, $(x_i - \bar{x})^2$ for a first instance of product data 2210-1, a value 2308-1 of first data is calculated as (831312–450107)2=145317246942.27, as shown.

Next, a total sum of first data is determined as having a value of, $\Sigma_{i=1}^{n}(x_i - \bar{x})^2$=578915305762.6, and then the variance of product data 2210 is determined as, $$\mathrm{Var}(X) = \frac{\sum_{i=1}^{n}(x_i - \bar{x})^2}{N} = \frac{578915305762.7}{12} = 48242942146.9.$$

Var(Y)

Secondly, monitoring device 402 may calculate Var(Y) for a subset of CAN payload data 2207.

A first exemplary subset of CAN payload data 2207 is shown in FIG. 22B including a byte in a same byte position of CAN payload data 2207 presently stored in each slot of rolling buffer 2200, such as subset 2207-*z*-0 in byte position [0]. Exemplary values 2307-0 of subset 2207-*z*-0 of CAN payload data 2207 are shown in FIG. 23D.

Monitoring device 402 calculates Var(Y) for subset 2207-*z*-0 of CAN payload data 2207, $$\mathrm{Var}(Y) = \frac{\sum_{i=1}^{n}(y - \bar{y})^2}{N}$$

wherein yi represents an i-th instance of a subset 2207-*z*-0 of CAN payload data 2207. For example, y1 corresponds to a first instance 2207-1-0 of subset 2207-*z*-0 of CAN payload data 2207, having exemplary value 2307-0-1, 45, as shown in FIG. 23D. N represents the number of instances of subset 2207-*z*-0 of CAN payload data 2207. In this example, buffer 2200 has 12 slots, thus N=12. Monitoring device 402 calculates $\bar{y}$, a mean of all instances of subset 2207-*z*-0 of CAN payload data 2207 to be $\bar{y}$=22.32.

Monitoring device 402 then calculates $(y_i - \bar{y})^2$ for each of the 12 instances of subset 2207-*z*-0 of CAN payload data 2207 to form second data. Exemplary values 2309 of second data are shown in FIG. 23E. For example, for first instance 2207-1-0 of subset 2207-*z*-0 of CAN payload data 2207 a value 2309-1 of second data is calculated as (45–22.32)2=514.53, as shown.

$$\frac{\sum_{i=1}^{n}(y - \bar{y})^2}{N} = 2983.24$$

Next, a total sum of second data is determined as having a value of and then the variance of subset 2207-*z*-0 of CAN payload data 2207 is determined as, $$\mathrm{Var}(Y) = \frac{\sum_{i=1}^{n}(y - \bar{y})^2}{N} = \frac{2983.24}{12} = 248.6.$$

CoVar(X,Y)

Thirdly, monitoring device 402 may calculate for each instance of subset 2207-*z*-0 of CAN payload data 2207 and product data 2206, $(xi-\bar{x})*(yi-\bar{y})$ to form third data. Exemplary values 2312 of third data are shown in FIG. 23F.

For example, for a first instance of product data 2210-01 a value of $(xi-\bar{x})$=831312-450107=381205 and for a first instance of a subset 2207-*z*-0 of CAN payload data 2207 a value of $(yi-\bar{y})$=45-22.32=22.68 is determined. Thus, a first value 2312-1 of third data is calculated as $(xi-\bar{x})*(yi-\bar{y})$=381205*22.68=8646999.9, as shown in FIG. 23F.

Monitoring device 402 then calculates $\Sigma_{i=0}^{n}[(x_i-\bar{x})*(y_i-\bar{y})]$=40915775.47 and the covariance of X and Y, $$\text{CoVar}(X, Y) = \frac{\sum_{i=1}^{n}[(x_i - x)*(y_i - y)]}{N} = \frac{40915775.47}{12} = 3409647.95$$

Finally, monitoring device 402 determines r1, a first coefficient of correlation between subset 2207-*z*-0 of CAN payload data 2207 and product data 2210 as, $$r1 = \frac{\text{CoVar}(X, Y)}{\sqrt{\text{Var}(X)}\sqrt{\text{Var}(Y)}} = \frac{\text{CoVar}(X, Y)}{\sigma_x * \sigma_y} = \frac{3409647.95}{\sqrt{48242942146.9 * 248.6}} = .9085$$

Monitoring device 402 may form first correlation coefficient data 2400-0 corresponding to a first correlation coefficient 2402 between subset 2207-*z*-0 of CAN payload data 2207 and product data 2210, as shown in FIG. 24A In this example, monitoring device 402 further calculates a plurality of first correlation coefficients between each subset of a single byte of CAN payload data in each byte position [1] to [7] and product data 2210, and forms first correlation coefficient data 2400 indicative thereof, such as first correlation coefficient data 2400-1 to 2400-7 shown in FIG. 24A.

Exemplary subsets of a single byte of CAN payload data in each byte position [1] to [7] include bytes is positions [1], [2], [3], [4], [5], [6], and [7], corresponding to first correlation coefficient data 2400_1, 2400_2, 2400_3, 2400_4, 2400_5, 2400_6, and 2400_7, respectively.

Additionally, and/or alternatively, monitoring device 402 may calculate a first coefficient of correlation between each subset of two bytes of CAN payload data 2207 in ordered byte positions [1] to [7] and product data 2210, and form first correlation coefficient data 2400-02 to 2400-67 indicative thereof, as shown in FIG. 24A.

An exemplary subset of two bytes of CAN payload data in ordered byte positions [1] to [7] include subset 2207-*z*-0,1 occupying byte positions [0,1]. Other exemplary subsets of two bytes of CAN payload data in ordered byte positions [1] to [7] include bytes is positions, [1,2], [2,3], [3,4], [4,5], [5,6], and [6,7], corresponding to first correlation coefficient data 2400_01, 2400_12, 2400_23, 2400_34, 2400_45, 2400_56, and 2400_67, respectively.

Additionally, and/or alternatively, monitoring device 402 may calculate a first coefficient of correlation between each subset of two CAN payload data 2207 in ordered byte positions [1] to [7] in reverse order, and product data 2210, and form first correlation coefficient data 2400_10 to 2400_76 as shown in FIG. 24A.

An exemplary subset of two bytes of CAN payload data in reverse ordered byte positions [1] to [7] include subset [2207-*z*-1,0] occupying byte positions [1,0], as shown in FIG. 22D. Other exemplary subsets of two bytes of CAN payload data in positions [1] to [7] in reverse order includes bytes in byte positions, [2,1], [3,2], [4,3], [5,4], [6,5], and [7,6], corresponding to first correlation coefficient data 2400_10, 2400_21, 2400_32, 2400_43, 2400_54, 2400_65, and 2400_76, respectively.

Additionally, and/or alternatively, monitoring device 402 calculates a first coefficient of correlation between other subsets of ordered bytes of CAN payload data 2207 and product data 2210 and forms first correlation coefficient data. Exemplary subsets of ordered bytes include bytes in positions: [0,1,2], [1,2,3], [2,3,4], [3,4,5], [4,5,6], [5,6,7], among others.

Additionally, and/or alternatively, monitoring device 402 calculates a first coefficient of correlation between other subsets of reverse ordered bytes of CAN payload data 2307 product data 2306 and forms first correlation coefficient data. Exemplary subsets of reverse ordered bytes include bytes in byte positions: [2,1,0], [3,2,1], [4,3,2], [5,4,3], [6,5,4], [7,6,5], among others.

Next, at block 2108, subprocess 2100 includes processing first correlation coefficient data indicative of the plurality of first correlation coefficients for determining whether any thereof meets a seventh criterion.

In the present example, monitoring device 402 processes first correlation coefficient data 2400 for determining whether an instance thereof meets a seventh criterion, for example meets or exceeds a fourth predefined threshold, such as, 0.90. A first correlation coefficient equal to or greater than 0.90 indicates there is a strong correlation between a corresponding subset of CAN payload data 2207 and product data 2210.

Referring again to FIG. 24A, each of first correlation coefficients 2402-0, 0.90, 2402-12, 0.91, and 2402-54, 0.92, corresponding to subsets [0], [0,1] and [5,4] of CAN payload data 2207, respectively, meets or exceeds 0.90. As such subprocess 2100 proceeds to block 2110. However, should no first correlation coefficient 2402 meet or exceed 0.90, process 2100 proceeds directly to block 2112.

At block 2110, subprocess 2100 includes forming first candidate data based on a first correlation coefficient meeting the seventh criterion. First candidate data indicating the one or more first byte positions of the CAN payload data occupied by the at least a first subset of the CAN payload data and the first CAN ID associated with the first correlation coefficient meeting the seventh criterion.

For example, as mentioned hereinabove, each of first correlation coefficients 2402-0, 0.90, 2402-12, 0.91, and 2402-54, 0.92, corresponding to subsets in byte positions [0], [0,1] and [5,4] of CAN payload data 2207, respectively, meets or exceeds 0.90.

As such, monitoring device 402 forms first candidate data 2408 indicative thereof, as shown in FIG. 24B. For instance, first candidate data 2408*a* indicates a candidate of target data in byte position [0] of an undefined CAN payload corresponding to CAN ID 0x400. First candidate data 2408*b* indicates a candidate of target data in byte positions [1,2] of an undefined CAN payload corresponding to CAN ID 0x400. Finally, first candidate data 2408*c* indicates a candidate of target data in byte position [5,4] of an undefined CAN payload corresponding to CAN ID 0x400. Optionally, first candidate data 2408 includes data indicative of a corresponding first correlation coefficient.

In some instances, monitoring device 402 may transmit first candidate data 2408 to remote server 404 via communication network 406.

At block 2112, subprocess 2100 includes determining whether there is other CAN payload data corresponding to another first CAN ID of the group of available CAN IDs to be processed. If so, subprocess 2100 returns to block 2102, otherwise, subprocess 2100 is complete.

For example, monitoring device 402 determines whether CAN payload data corresponding to another first CAN ID in the group of available CAN IDs comprising 0x001 to 0x7FF, is still to be processed. If this is the case, subprocess 2100 returns to block 2101 wherein another first CAN ID is selected, for instance, 0x689.

In some instances, CAN messages corresponding to a selected first CAN ID are not transmitted on the CAN bus. In such instances, subprocess 2100 may timeout and proceed directly to block 2112.

Alternatively, subprocess 2100 includes identifying one or more first candidates for target data based on a high correlation coefficient between fourth reference data and CAN payload data, wherein the fourth reference data has at least a fourth correlation relationship with the manufacturer-specific CAN data.

For instance, at block 2104, subprocess 2100 includes collecting a plurality of fourth reference data and a plurality of CAN payload data from a CAN bus and storing thereof in a rolling buffer of size S. At block 2104, subprocess 2100 does not include collecting and storing fifth reference data. Then at block 2106, subprocess 2100 includes determining a first coefficient of correlation between one or more subsets, e.g., at least a first subset, of the CAN payload data and a fourth reference data.

For example, at block 2106, a first coefficient of correlation between one or more subsets, e.g., at least a first subset, of the CAN payload data and a fourth reference data may be determined according to Pearson's correlation coefficient, $$r1 = \frac{\mathrm{CoVar}(X, Y)}{\sqrt{\mathrm{Var}(X)}\sqrt{\mathrm{Var}(Y)}} = \frac{\mathrm{CoVar}(X, Y)}{\sigma_x * \sigma_y}, \quad \text{Eq. 1}$$

wherein

X represents fourth reference data, i.e., engine load data, and Y represents a subset of CAN payload data.

The example above describes target data, i.e., undefined manufacturer-specific CAN data, as fuel rate data, fourth data as engine load data, and fifth reference data as RPM data for illustrative purposes only. However, target data, fourth reference data and fifth reference data may be any vehicle variable-related data. Specific and non-limiting examples of target data include, odometer data and speed data, e.g., speed data included in manufacturer-specific CAN data.

Target data, fourth reference data, fifth reference data and seventh criterion in the examples described above are provided for explanation purposes only. Similarly, other steps for calculating a first correlation coefficient may be implemented. Embodiments are not intended to be limited to the examples described herein.

Subprocess 2500

In some instances, a desired number of fourth reference data and CAN payload data samples to be collected for determining an accurate first correlation coefficient is greater than allotted storage capacity of a rolling buffer. For example, 60 samples of fourth reference data, fifth reference data and CAN payload data may be desired to be collected for determining a first correlation coefficient between CAN payload data and a product of fourth reference data and fifth reference data. However, a rolling buffer may have been allotted storage capacity to store 12 samples (i.e., has been allotted only 12 slots). A method for determining a first correlation coefficient between CAN payload data and a product of fourth reference data and fifth reference data when a rolling buffer has insufficient storage capacity is described below.

Figure 25:
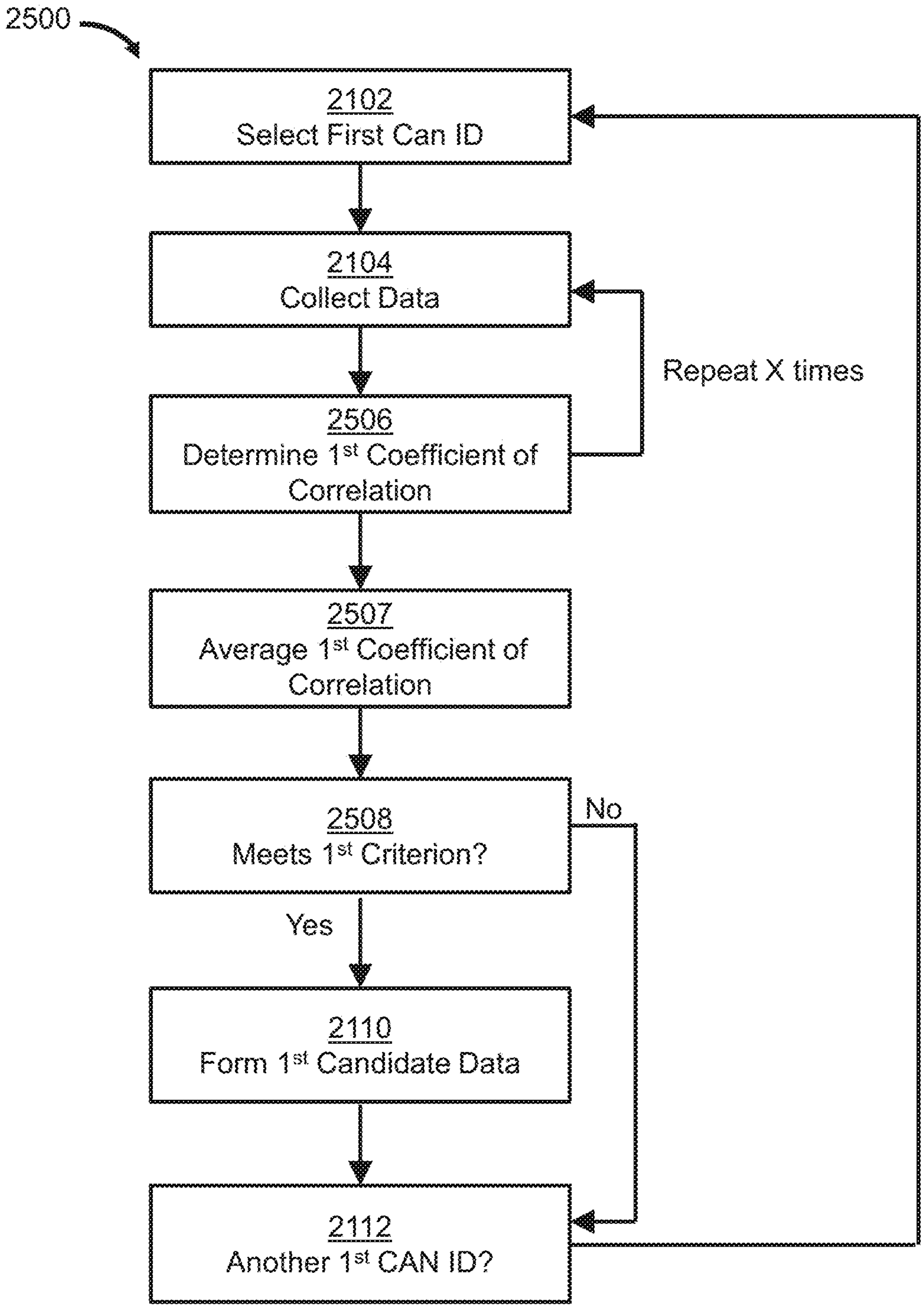
FIG. 25 depicts a simplified flow diagram of another subprocess for identifying one or more candidates for target data based on a high correlation coefficient between a product of fourth reference data and fifth reference data, and CAN payload data, according to an embodiment.

Shown in FIG. 25 is a simplified flow diagram of a subprocess 2500 for identifying one or more candidates for target data according to an embodiment. Subprocess 2500 includes identifying candidates based on a high correlation coefficient between CAN payload data and a product of fourth reference data and fifth reference data. Subprocess 2500 may include determining a first correlation coefficient by averaging a plurality of first correlation coefficients determined over a period of time.

For example, candidates for target data, in the form of fuel consumption, may be identified by determining a first coefficient of correlation between CAN payload and a product of fourth reference data in the form of a product of engine load data and fifth reference data in the form RPM data.

In the present example, 60 samples of engine load data, RPM data and CAN payload data are to be collected for determining a first correlation coefficient between CAN payload data and a product of engine load data and RPM data. However, in this example, rolling buffer 2200 of monitoring device 402, has a storage capacity allotment of only 12 slots, (i.e., S=12) and cannot accommodate 60 samples simultaneously. Subprocess 2500 overcomes this limitation by averaging a plurality of first correlation coefficients over a period of time.

The functionality of some blocks of subprocess 2500 to be described below are the same and/or substantially similar to blocks of subprocess 2100 and the previous description of the latter can be applied to the former with the exceptions as described below.

At blocks 2102 and 2104, subprocess 2500 includes selecting a first CAN ID and collecting fourth reference data, fifth reference data and CAN payload data as described hereinabove with reference to subprocess 2100 in FIG. 21.

For example, monitoring device 402 collects engine load data 2202, RPM data 2204 and CAN payload data 2207 corresponding to a first CAN ID 0x400 and stores the data in rolling buffer 2200.

In some instances, RPM data on a CAN bus is provided in units of 0.25 RPM/bit. In these instances, upon collecting RPM data on a CAN bus, a monitoring device may process the collected RPM data, such as divide the collected RPM data by 4, and store a result as RPM data in the rolling buffer. Alternatively, a monitoring device may convert RPM data at any time to reflect the actual RPM value.

Next, at block 2506, subprocess 2500 determines a first correlation coefficient between one or more subsets, e.g., at least a first subset, of CAN payload data and a product of fourth reference data and fifth reference data. Steps performed at block 2506 are the same as those at block 2106 with one exception. Upon formation of first correlation coefficient data, subprocess 2500 repeats the loop of blocks 2104 to 2506 a predefined number, X, times, to form and store a plurality of first correlation coefficients.

For example, monitoring device 402 forms first correlation coefficient data 2600A based on engine load data 2202, RPM data 2204 and CAN payload data 2207 currently present in rolling buffer 2200. For instance, first correlation coefficient data 2600A_0 corresponds to a first correlation coefficient 0.86 between a subset of CAN payload data 2207 in byte position [0] (i.e., CAN payload data 2207-*z*-0) and product data 2210.

Additionally, and/or alternatively, monitoring device 402 further calculates a plurality of first correlation coefficients between each subset of a single byte of CAN payload data in each byte position [1] to [7] and product data 2210, and forms first correlation coefficient data 2600A indicative thereof, such as first correlation coefficient data 2600A_1 to 2600A_7 shown in FIG. 26A. Exemplary subsets of a single byte of CAN payload data in each byte position [1] to [7] include bytes in positions [1], [2], [3], [4], [5], [6], and [7], corresponding to first correlation coefficient data 2600A_1 to 2600A_7, respectively.

Additionally, and/or alternatively, monitoring device 402 then calculates a first coefficient of correlation between each subset of two bytes of CAN payload data 2207 in ordered byte positions [1] to [7] and product data 2210, and forms first correlation coefficient data 2600A_01 to 2600A_67 indicative thereof, as shown in FIG. 26A. An exemplary subset of two bytes of CAN payload data in ordered byte positions [1] to [7] include a subset occupying byte positions [0,1]. Other exemplary subsets of two bytes of CAN payload data in ordered byte positions [1] to [7] include bytes in positions, [1,2], [2,3], [3,4], [4,5], [5,6], and [6,7], corresponding to first coefficient data 2600A_01 to 2600A_67, respectively.

Additionally, and/or alternatively, monitoring device 402 calculates a first coefficient of correlation between each subset of two CAN payload data 2207 in ordered byte positions [1] to [7] in reverse order, and product data 2210, and forms first correlation coefficient data 2600A_10 to 2600A_76 as shown in FIG. 26A. An exemplary subset of two bytes of CAN payload data in reverse ordered byte positions [1] to [7] include a subset occupying byte positions [1,0]. Other exemplary subsets of two bytes of CAN payload data in positions [1] to [7] in reverse order includes bytes in byte positions, [2,1], [3,2], [4,3], [5,4], [6,5], and [7,6], corresponding to first coefficient data 2600A_10 to 2600A_76, respectively.

Monitoring device 402 then stores first correlation coefficient data 2600A, for instance, in datastore 506.

Next, monitoring device 402 reiterates loop of blocks 2104 to 2506 X=4 times. In this example, 60 samples of engine load data, RPM data and CAN payload data are to be collected for determining a first correlation coefficient between CAN payload data and a product of engine load data and RPM data. As rolling buffer 2200 has only 12 slots, monitoring device 402 iterates loop of blocks 2104 to 2506 5 times such that a total of 60 samples are collected it total.

During each iteration, new engine load data, RPM data and CAN payload data are collected and stored in slots 1 to 12 of rolling buffer 2200, and first correlation coefficient data is formed based on engine load data, RPM data and CAN payload data present in buffer 2200. For instance, first correlation coefficient data 2600B, 2600C, 2600D and 2600E, shown in FIGS. 26B, 26C,26D and 26E, is formed at each of the four reiterations of loop of blocks 2104 to 2506, respectively.

Monitoring device 402 then stores first correlation coefficient data 2600B, 2600C, 2600D and 2600E, for instance, in datastore 506.

At block 2507, subprocess 2500 includes averaging the plurality of first correlation coefficients for determining a first correlation coefficient between CAN payload data and a product of fourth reference data and fifth reference data. Block 2507 is further described below with reference to FIGS. 26A, 26B, 26C, 26D, 26E and 26F.

For example, monitoring device 402 averages the plurality of first correlation coefficients indicated by first correlation coefficient data 2600A_0, 0.86, 2600B_0, 0.87, 2600C_0, 0.86, 2600D_0, 0.94, and 2600E_0, 0.97, and forms first coefficient data 2600F_0, 0.90, indicative thereof.

Monitoring device 402 averages the remaining plurality of first correlation coefficients indicated by first correlation coefficient data 2600A, 2600B, 2600C, 2600D and 2600E to form first correlation coefficient data 2600F.

Next, at block 2508, subprocess 2500 includes processing each of the plurality of first correlation coefficients for determining whether any thereof meets a seventh criterion.

In the present example, monitoring device 402 processes first correlation coefficient data 2600F for determining whether an instance thereof meets a seventh criterion. An exemplary seventh criterion includes meeting or exceeding a fourth predefined threshold, such as, 0.90. A first correlation coefficient greater than 0.90 indicates a strong correlation between a corresponding subset of CAN payload data and a product of engine load and RPM.

Referring to FIG. 26F, each first correlation coefficient 2600F_0, 0.90, 2600F_12, 0.91, and 2600F_54, 0.92, corresponding to subsets [0], [0,1] and [5,4] of CAN payload data, respectively, meets or exceeds 0.90. As such subprocess 2500 proceeds to block 2110. However, should none of first correlation coefficients 2600F meet or exceed 0.90, process 2500 proceeds directly to block 2112.

At block 2110, first candidate data is formed as described hereinabove in relation to subprocess 2100 of FIG. 21. In some instances, monitoring device 402 may transmit first candidate data 2408 to remote server 404 via communication network 406.

At block 2112 subprocess 2500 includes determining whether there is other CAN payload data corresponding to another first CAN ID of the group of available CAN IDs to be processed as described hereinabove in relation to subprocess 2100 of FIG. 21. If there is no other CAN payload data to be processed subprocess 2500 is complete.

The example above describes target data, i.e., undefined manufacturer-specific CAN data, as fuel rate data, fourth data as engine load data, and fifth reference data as RPM data for explanation purposes only. However, target data, fourth reference data and fifth reference data may be any vehicle variable-related data. Specific and non-limiting examples of target data include, odometer data and speed data, e.g., speed data included in manufacturer-specific CAN data.

Target data, fourth reference data, and seventh criterion described in the examples described above are provided for explanation purposes only. Similarly, other steps for calculating a first correlation coefficient may be implemented. Embodiments are not intended to be limited to the examples described herein.

Subprocess 2700

In some instances, a vehicle manufacturer may transmit engine load data on a CAN bus corresponding to a manufacturer-specific CAN ID. In such cases, false positive candidates for target data may be identified. For example, CAN payload data that includes engine load data may appear to be fuel rate data because a high correlation coefficient between CAN payload data and a product of engine load data and RPM is determined. Methods for identifying one or more candidates for target data while minimizing false positives are described below.

Figure 27:
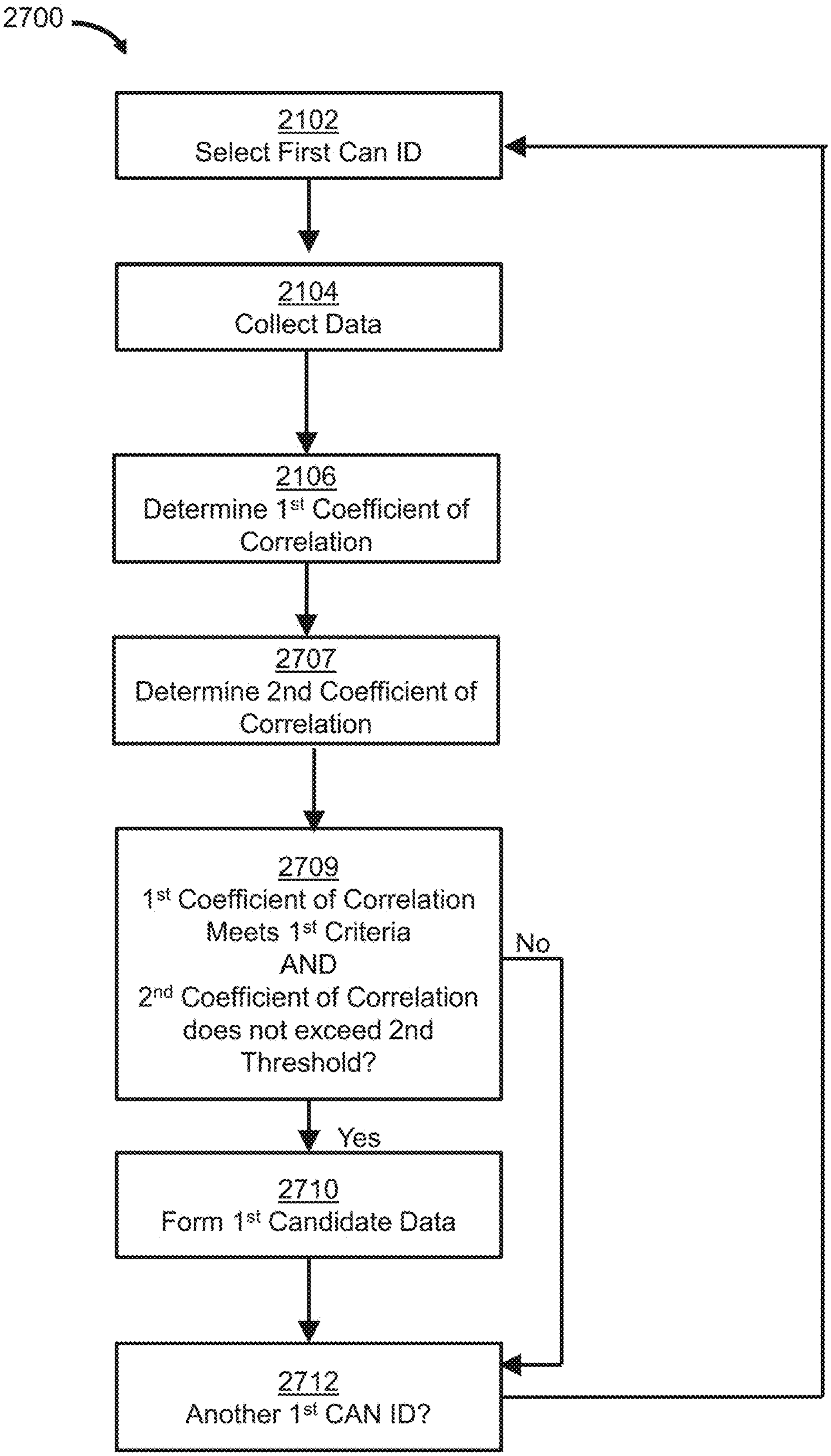
FIG. 27 depicts a simplified flow diagram of another subprocess for identifying one or more candidates for target data based on a high correlation coefficient between a product of fourth reference data and fifth reference data, and CAN payload data, according to an embodiment.

Shown in FIG. 27 is a simplified flow diagram of subprocess 2700 for identifying one or more candidates for target data according to an embodiment.

The functionality of some blocks of subprocess 2700 to be described below are the same and/or substantially similar to blocks of subprocess 2100 and the previous description of the latter can be applied to the former with the exceptions as described below.

At blocks 2102, 2104 and 2106 subprocess 2700 includes selecting a first CAN ID, collecting fourth reference data, fifth reference data and CAN payload data, and determining a plurality of first correlation coefficients, respectively, as described hereinabove with respect to subprocess 2100 of FIG. 21

For example, monitoring device 402 collects engine load data 2202, RPM data 2204 and CAN payload data 2207 corresponding to a first CAN ID 0x400 and stores the data in rolling buffer 2200. Next, monitoring device 402 forms first correlation coefficient data 2400.

In some instances, RPM data on a CAN bus is provided in units of 0.25 RPM/bit. In these instances, upon collecting RPM data on a CAN bus, a monitoring device may process the collected RPM data, such as divide the collected RPM data by 4, and store a result as RPM data in the rolling buffer. Alternatively, a monitoring device may convert RPM data at any time to reflect the actual RPM value.

In some instances, RPM data on a CAN bus is provided in units of 0.25 RPM/bit. In these instances, upon collecting RPM data on a CAN bus, a monitoring device may process the collected RPM data, such as divide the collected RPM data by 4, and store a result as RPM data in the rolling buffer. Alternatively, a monitoring device may convert RPM data at any time to reflect the actual RPM value.

Next, at block 2707, subprocess 2700 includes determining a second correlation coefficient between one or more subsets, e.g., at least a first subset, of CAN payload data and the fourth reference data including a same one or more subsets, e.g., at least a first subset, of CAN payload data and the fourth reference data.

In this example, monitoring device 402 determines a second correlation coefficient between the same plurality of subsets of CAN payload data 2207 and engine load data 2202 processed at block 2106 in subprocess 2100 as described herein above, for determining a second correlation coefficient. For instance, if engine load data 2202 corresponding to exemplary engine load values 2302 are processed at block 2106 for determining a first correlation coefficient, the same are processed at block 2707 for determining a second correlation coefficient.

For example, a second correlation coefficient, r2, between a subset of CAN payload data 2207 and engine load data 2202 may be determined according to Pearson's correlation coefficient, defined as $$r2 = \frac{\mathrm{CoVar}(Z, Y)}{\sqrt{\mathrm{Var}(Z)}\sqrt{\mathrm{Var}(Y)}} = \frac{\mathrm{CoVar}(Z, Y)}{\sigma_Z * \sigma_y}. \quad \text{Eq. 7}$$

In this example, Z represents engine load data and Y represents a subset of CAN payload data and σz, is the standard deviation of Z and ay is the standard deviation of Y.

Monitoring device 402 may calculate r2 according to the steps described below.

Var(Z)

Firstly, monitoring device 402 calculates $$\mathrm{Var}(Z) = \frac{\sum_{i=1}^{n}(z_i - \bar{z})^2}{N}$$

wherein zi represents an i-th instance of engine load data 2202. For example, z1 corresponds to a first instance of engine load data 2202-1, having exemplary value 2302-1, 110.4, as shown in FIG. 23A. N represents the number of instances of engine load data 2202. In this example, buffer 2200 has 12 slots, thus N=12. Monitoring device 402 calculates $\bar{z}$, a mean of all instances of engine load data 2202 to be $\bar{z}$=74.92.

Monitoring device 402 then calculates $(zi-\bar{z})^2$ for each of the 12 instances of engine load data 2202 to form fourth data. Exemplary values 2802 of fourth data are shown in FIG. 28A. For example, $(zi-\bar{z})^2$ for a first instance of engine load data 2202-1, a value 2802-1 of fourth data is calculated as (110.4−74.92)2=1259.07, as shown.

Next, the total sum of fourth data is determined as having a value of, $\Sigma_{i=1}^{n}(z_i-\bar{z})^2$=5178.68, and then the variance of engine load data 2202 is determined as, $$\mathrm{Var}(Z) = \frac{\sum_{i=1}^{n}(z_i - \bar{z})^2}{N} \frac{5178.68}{12} = 431$$

As discussed hereinabove, monitoring device 402 calculated Var(Y) for subset of 2207-*z*-0 of CAN payload data 2207 to be, $$\mathrm{Var}(Y) = \frac{\sum_{i=1}^{n}(y - \bar{y})^2}{N} = \frac{2983.24}{12} = 248.6.$$

CoVar(Z,Y)

Next, monitoring device 402 calculates for each instance of subset 2207-*z*-0 of CAN payload data 2207 and engine load data 2202, $(zi-\bar{z})*(yi-\bar{y})$ to form fifth data 2804. Exemplary values 2804 of fifth data are shown in FIG. 28B.

For example, for a first instance of engine load data 2202-1 a value of, $(zi-\bar{z})$=110.4-74.92=35.48 and for a first instance of a subset 2207-*z*-0 of CAN payload data 2207 a value of $(yi-\bar{y})$=45-22.32=22.68 is determined. Thus, a first value 2804-1 of fifth data is calculated as $(zi-\bar{z})*(yi-\bar{y})$=35.48*22.68=804.88 as shown in FIG. 28B.

Monitoring device 402 then calculates $\Sigma_{i=0}^{n}[(z_i-\bar{z})*(y_i-\bar{y})]$=3262.80 and the covariance of Z and Y, $$\mathrm{CoVar}(Z, Y) = \frac{\sum_{i=1}^{n}[(z_i - \bar{z}) * (y_i - \bar{y})]}{N} = \frac{3262.80}{12} = 271.9$$

Finally, monitoring device 402 determines r2, a second coefficient of correlation between engine load data 2202 and a subset 2207-*z*-0 of CAN payload data 2207 as, $$r2 = \frac{\mathrm{coVar}(Z, Y)}{\sqrt{\mathrm{Var}(Z)}\sqrt{\mathrm{Var}(Y)}} = \frac{\mathrm{CoVar}(Z, Y)}{\sigma_Z * \sigma_y} = \frac{271.9}{\sqrt{(431 * 248.6)}} = .83$$

Monitoring device 402 may form second correlation coefficient data 2806-0 corresponding to a second correlation coefficient 2806 between subset 2207-*z*-0 of CAN payload data 2207 and product data 2210, as shown in FIG. 28C.

In this example, monitoring device 402 further calculates a plurality of second correlation coefficients between each subset of a single byte of CAN payload data in each byte position [1] to [7] and engine load data 2202, and forms second correlation coefficient data 2806 indicative thereof, such as second correlation coefficient data 2806-1 to 2806-7, as shown in FIG. 28C.

Exemplary subsets of a single byte of CAN payload data in each byte position [1] to [7] include bytes is positions [1], [2], [3], [4], [5], [6], and [7], corresponding to second correlation coefficient data 2806_1, 2806_2, 2806_3, 2806_4, 2806_5, 2806_6, and 2806_7, respectively.

Additionally, and/or alternatively, monitoring device 402 calculates a second coefficient of correlation between each subset of two bytes of CAN payload data 2207 in ordered byte positions [1] to [7] and engine load data 2302, and form further second correlation coefficient data 2806 indicative thereof, as shown in FIG. 28.

An exemplary subset of two bytes of CAN payload data in ordered byte positions [1] to [7] include subset 2207-*z*-0,1 occupying byte positions [0,1]. Other exemplary subsets of two bytes of CAN payload data in ordered byte positions [1] to [7] include bytes is positions, [1,2], [2,3], [3,4], [4,5], [5,6], and [6,7], corresponding to second correlation coefficient data 2806_01, 2806_12, 2806_23, 2806_34, 2806_45, 2806_56, and 2806_67, respectively.

Additionally, and/or alternatively, monitoring device 402 may calculate a second coefficient of correlation between each subset of two CAN payload data 2207 in ordered byte positions [1] to [7] in reverse order, engine load data 2202, and form second correlation coefficient data 2806_10 to 2800_76, as shown in FIG. 28C.

An exemplary subset of two bytes of CAN payload data in reverse ordered byte positions [1] to [7] include subset [2207-*z*-1,0] occupying byte positions [1,0], as shown in FIG. 22D. Other exemplary subsets of two bytes of CAN payload data in positions [1] to [7] in reverse order includes bytes in byte positions, [2,1], [3,2], [4,3], [5,4], [6,5], and [7,6], corresponding to second correlation coefficient data 2806_10, 2806_21, 2806_32, 2806_43, 2806_54, 2806_65, and 2806_76, respectively.

Additionally, and/or alternatively, monitoring device 402 calculates a second coefficient of correlation between other subsets of ordered bytes of CAN payload data 2207 and engine load data 2202 and forms second correlation coefficient data. Exemplary subsets of ordered bytes include bytes in positions: [0,1,2], [1,2,3], [2,3,4], [3,4,5], [4,5,6], [5,6,7], among others.

Additionally, and/or alternatively, monitoring device 402 calculates a second coefficient of correlation between other subsets of reverse ordered bytes of CAN payload data 2207 engine load data 2202 and forms second correlation coefficient data. Exemplary subsets of reverse ordered bytes include bytes in byte positions: [2,1,0], [3,2,1], [4,3,2], [5,4,3], [6,5,4], [7,6,5], among others.

Next, at block 2709, subprocess 2700 includes processing each of the plurality of first correlation coefficients for determining whether any thereof meets a seventh criterion and each of the plurality of associated second correlation coefficients for determining whether any thereof meets an eighth criterion.

In the present example, monitoring device 402 processes first correlation coefficient data 2400 for determining whether an instance thereof meets a seventh criterion. Exemplary seventh criterion includes meeting or exceeding a fourth predefined threshold, such as, 0.90. A first correlation coefficient the same or greater than 0.90 indicates a strong correlation between a corresponding subset of CAN payload data 2207 and product data 2206.

Referring again to FIG. 24A, each of first correlation coefficients 2400-0, 0.90, 2400-12, 0.91, and 2400-54, 0.92, corresponding to subsets [0], [0,1] and [5,4] of CAN payload data 2207, respectively meets or exceeds 0.90. Should none of first correlation coefficients 2400 meet or exceed 0.90, process 2700 proceeds to directly block 2712.

Next monitoring device 402 processes second correlation coefficient data 2806 associated with each first correlation coefficient data 2400 that meets the fourth predefined threshold, for determining whether an instance thereof meets an eighth criterion. Exemplary eighth criterion includes not exceeding a fifth predefined threshold, such as, 0.95. For instance, second correlation coefficient data 2806 associated with each of first correlation coefficients 2400_0, 2400_12, and 2400_54, is processed to determine whether it does not exceed a fifth predefined threshold, such as 0.95. In this example, second correlation coefficients 2806_0, 0.44, 2806_12, 0.99, and 2806_54, 0.98, correspond to first correlation coefficients 2400_0, 2400_12, and 2400_54, respectively. Second correlation coefficient 2806_0, 0.44, does not exceeds the fifth predefined threshold 0.95 and thus meets the eighth criterion. As such, process 2700 proceeds to block 2710. However, should all second correlation coefficients 2806 exceed 0.95, process 2700 proceeds directly block 2712. At block 2710, subprocess 2700 includes forming first candidate data based on a first correlation coefficient meeting the seventh criterion and a corresponding second correlation coefficient meeting an eighth criterion.

For example, as mentioned hereinabove, first correlation coefficients 2400-0 corresponding to subset [0] of CAN payload data 2207 meets the seventh criterion and corresponding second correlation coefficient 2806_0 meets the eighth criterion.

As such, monitoring device 402 forms first candidate data 2810 shown in FIG. 28D indicating a candidate of the target data in byte position [0] of an undefined CAN payload corresponding to CAN ID 0x400. Optionally, candidate data 2810 includes data indicative of a corresponding first correlation coefficient.

In some instances, monitoring device 402 may transmit first candidate data 2810 to remote server 404 via communication network 406.

At block 2712, subprocess 2700 includes determining whether there is other CAN payload data corresponding to another first CAN ID of the group of available CAN IDs to be processed. If so, subprocess 2700 returns to block 2102, otherwise, subprocess 2700 is complete.

For example, monitoring device 402 determines whether CAN payload data corresponding to another first CAN ID in the group of available CAN IDs comprising 0x001 to 0x7FF, is still to be processed. If this is the case, subprocess 2700 returns to block 2102 wherein another first CAN ID is selected, for instance, 0x689.

In some instances, CAN messages corresponding to a selected first CAN ID are not transmitted on the CAN bus. In such instances, subprocess 2700 may timeout and proceed directly to block 2712.

The example above describes target data, i.e., undefined manufacturer-specific CAN data, as fuel rate data, fourth data as engine load data, and fifth reference data as RPM data for illustrative purposes only. However, target data, fourth reference data and fifth reference data may be any vehicle variable-related data. Specific and non-limiting examples of target data include, odometer data and speed data, e.g., speed data included in manufacturer-specific CAN data.

Target data, fourth reference data, fifth reference data, seventh criterion, and eighth criterion, described in the examples described above are provided for explanation purposes only. Similarly, other steps for calculating a first and second correlation coefficient may be implemented. Embodiments are not intended to be limited to the examples described herein.

Subprocess 2900

In some instances, a vehicle manufacturer may transmit engine load data on a CAN bus corresponding to a manufacturer-specific CAN ID. In such cases, false positive candidates for target data may be identified. In some other instances, a desired number of fourth reference data and CAN payload data samples to be collected for determining an accurate first correlation coefficient is greater than allotted storage capacity of a rolling buffer. For example, 60 samples of fourth reference data, fifth reference data and CAN payload data may be desired to be collected for determining a first correlation coefficient between CAN payload data and a product of fourth reference data and fifth reference data. However, a rolling buffer may have been allotted storage capacity to store 12 samples (i.e., has been allotted only 12 slots). A method for determining a first correlation coefficient between CAN payload data and a product of fourth reference data and fifth reference data for minimizing false positives and when a rolling buffer has insufficient storage capacity is described below.

Figure 29:
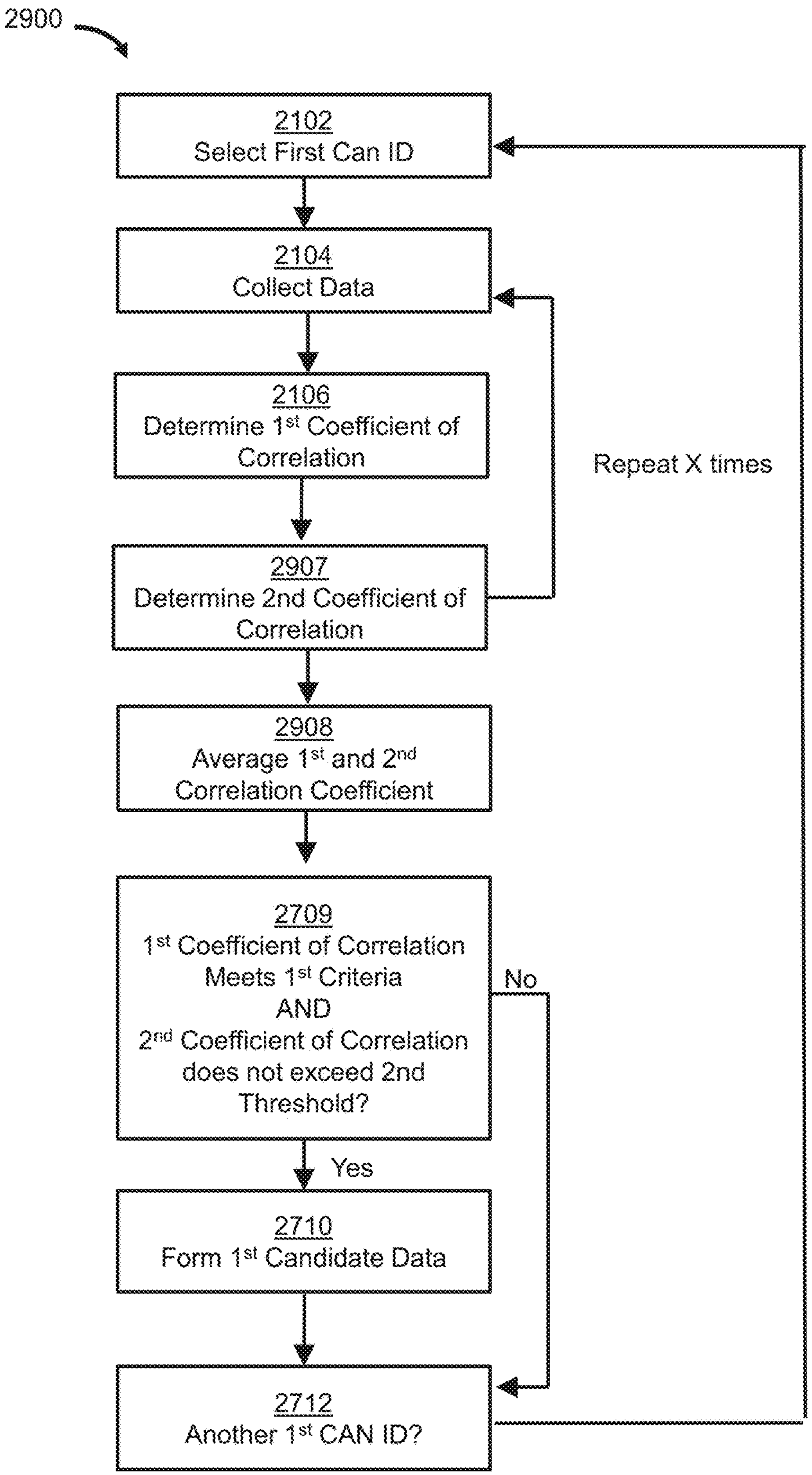
FIG. 29 depicts a simplified flow diagram of another subprocess for identifying one or more candidates for target data based on a high correlation coefficient between a product of fourth reference data and fifth reference data, and CAN payload data, according to an embodiment.

Shown in FIG. 29 is a simplified flow diagram of another subprocess 2900 for identifying one or more candidates for target data based on a high correlation coefficient between a product of fourth reference data and fifth reference data, and CAN payload data according to an embodiment.

In a first example, target data may be in the form of fuel rate data, a fourth reference data may be in the form of engine load data, and a fifth reference data may be in a form of RPM data.

In the present example, candidates for target data, in the form of fuel rate data, may be identified by determining a correlation coefficient between CAN payload data and a product of fourth reference data in the form of engine load data and fifth reference data in the form of RPM data.

The functionality of some blocks of subprocess 2900 to be described below are the same and/or substantially similar to blocks of subprocess 2100 and/or blocks of subprocess 2700 and the previous description of the latter can be applied to the former with the exceptions as described below.

At blocks 2102 and 2104, subprocess 2900 includes selecting a first CAN ID and collecting fourth reference data and CAN payload data as described hereinabove with reference to subprocess 2100 in FIG. 21.

For example, monitoring device 402 collects engine load data 2302, RPM data 2304 and CAN payload data 2307 corresponding to a first CAN ID 0x400 and stores the data in rolling buffer 2200.

In some instances, RPM data on a CAN bus is provided in units of 0.25 RPM/bit. In these instances, upon collecting RPM data on a CAN bus, a monitoring device may process the collected RPM data, such as divide the collected RPM data by 4, and store a result as RPM data in the rolling buffer. Alternatively, a monitoring device may convert RPM data at any time to reflect the actual RPM value.

Next at block, 2106, subprocess 2900 includes determining a first correlation coefficient between one or more subsets, e.g., at least a first subset, e.g., at least a first subset, of the CAN payload data and the fourth reference data.

For example, monitoring device 402 determines a first correlation coefficient between one or more subsets, e.g., at least a first subset, e.g., at least a first subset, of the CAN payload data 2207 and a product data 2206 and forms first correlation coefficient data 2600A in FIG. 24A.

Next, at block 2907, subprocess 2900 includes determining a second correlation coefficient between one or more subsets, e.g., at least a first subset, e.g., at least a first subset, of the CAN payload data and the fourth reference data.

Steps performed at block 2907 are the same as those at block 2707 with the following differences: Upon formation of second correlation coefficient data, subprocess 2900 repeats the loop of blocks 2104 to 2907 a predefined number, X, times, to form and store a plurality of first correlation coefficients and a plurality of second correlation coefficients.

For example, monitoring device 402 determines a second correlation coefficient between one or more subsets, e.g., at least a first subset, of the CAN payload data 2207 and engine load data 2202 and forms second correlation coefficient data 3000_A, as shown in FIG. 30A.

Next, monitoring device 402 reiterates loops 2104 to 2907 four times, (i.e., X=4). During each iteration, new engine load data, RPM data and CAN payload data is collected, and first correlation coefficient data is formed based on engine load data, RPM data and CAN payload data present in buffer 2200. For instance, first correlation coefficient data 2600_A, 2600_B, 2600_C, 2600_D and 2600_E is formed at each of the 5 total iterations of loop of blocks 2104 to 2907, respectively.

Furthermore, during each iteration, second correlation coefficient data is formed based on engine load data and CAN payload data present in buffer 2200. For instance, second correlation coefficient data 3000_B, 3000_C, 3000_D and 3000_E is formed at each of the four reiterations of loop of blocks 2104 to 2907, respectively, as shown in FIGS. 30B, 30C, 30D, and 30E.

Monitoring device 402 stores first correlation coefficient data 2600_A, 2600_B, 2600_C, 2600_D and 2600_E, and second correlation coefficient data 3000_A, 3000_B, 3000_C, 3000_D and 3000_E, for instance, in datastore 506.

Upon reiterating loops 2104 to 2907 four times, subprocess 2900 proceeds to block 2908.

At block 2908, subprocess 2900 includes averaging the plurality of first correlation coefficients and the plurality of second correlation coefficients.

For example, monitoring device 402 averages the plurality of first correlation coefficients indicated by first correlation coefficient data 2600A_0, 0.86, 2600B_0, 0.87, 26000_0, 0.86, 2600D_0, 0.94, and 2600E_0, 0.97, and forms first coefficient data 2600F_0, 0.90. Next, monitoring device 402 averages the plurality of second correlation coefficients indicated by second correlation coefficient data 3000A_0, 0.41, 3000B_0, 0.42, 30000_0, 0.50, 3000D_0, 0.50, and 3000E_0, 0.42, and forms second coefficient data 3000F_0, 0.45 as shown in FIG. 30F.

Monitoring device 402 averages the remaining plurality of first correlation coefficients indicated by first correlation coefficient data 2600_A, 2600_B, 2600_C, 2600_D and 2600_E to form first correlation coefficient data 2600_F and second correlation coefficient data 3000_B, 3000_C, 3000_D and 3000_E to form second correlation coefficient data 3000_F.

Next, at block 2709, subprocess 2900 includes processing each of the plurality of first correlation coefficients for determining whether any thereof meets a seventh criterion and each of the plurality of associated second correlation coefficients for determining whether any thereof meets an eighth criterion.

For instance, a seventh criterion may include meeting or exceeding a fourth predefined threshold, such as, 0.90 and an eighth criterion may include not exceeding a fifth predefined threshold, such as, 0.95

In the present example, monitoring device 402 determines each of first correlation coefficients 2600F_0, 0.90, 2600F_12, 0.91, and 2600F_54, 0.92, corresponding to subsets [0], [0,1] and [5,4] of CAN payload data, respectively, meets or exceeds 0.90.

Next, monitoring device 402 processes second correlation coefficient data 3000_F associated with each of first correlation coefficients 2600F_0, 2600F_12, and 2600F_54, to determine whether it does not exceed a fifth predefined threshold, such as 0.95. In this example, second correlation coefficients 3000F_0, 0.44, 3000F_12, 0.99, and 3000F_54, 0.99, correspond to first correlation coefficients 2400_0, 2400_12, and 2400_54, respectively. Second correlation coefficient 3000F_0, 0.44, does not exceed the fifth predefined threshold 0.95 and thus meets the eighth criterion. As such, process 2900 proceeds to block 2710. However, should all second correlation coefficients 3000F exceed 0.95, process 2900 proceeds to directly block 2712.

At block 2710, subprocess 2900 includes forming first candidate data based on a first correlation coefficient meeting the seventh criterion and a corresponding second correlation coefficient meeting the eighth criterion, as described herein above with respect to subprocess 2700 in FIG. 27.

As such, monitoring device 402 forms first candidate data 2810 shown in FIG. 28D indicating a candidate of the target data in byte position [0] of an undefined CAN payload corresponding to CAN ID 0x400.

Optionally, first candidate data 2810 includes data indicative of a corresponding first correlation coefficient. In such instances, for example, at block 1608 of subprocess 1600, subprocess 1600 may further include processing data indicative of a corresponding first correlation coefficient for determining which of the first candidates indicated thereby is likely to indicate target data associated with the first vehicle type.

In some instances, monitoring device 402 may transmit first candidate data 2810 to remote server 404 via communication network 406.

At block 2712, subprocess 2900 includes determining whether there is other CAN payload data corresponding to another first CAN ID of the group of available CAN IDs to be processed as described hereinabove with respect to subprocess 2700 in FIG. 27.

The example above describes target data, i.e., undefined manufacturer-specific CAN data, as fuel rate data, fourth data as engine load data, and fifth reference data as RPM data for illustrative purposes only. However, target data, fourth reference data and fifth reference data may be any vehicle variable-related data. Specific and non-limiting examples of target data include, odometer data and speed data, e.g., speed data included in manufacturer-specific CAN data.

Target data, fourth reference data, fifth reference data, seventh criterion, and eighth criterion, described in the examples described above are provided for explanation purposes only. Similarly, other steps for calculating a first and second correlation coefficient may be implemented. Embodiments are not intended to be limited to the examples described herein.

In some instances, a manufacturer may transmit manufacturer-specific accumulated fuel consumption data on a CAN bus instead of fuel rate data. Accumulated fuel consumption data represents the total fuel consumed by a vehicle from initial operation to the time of transmission of the accumulated fuel consumption data.

According to an embodiment, there is a method for converting CAN payload data carrying accumulated fuel consumption data into fuel rate data. For instance, the method includes collecting a plurality of fourth reference data, a plurality of fifth reference data and a plurality of CAN payload data from a CAN bus. Next, the plurality of CAN payload data is processed prior to storing that data in a rolling buffer of size S.

For instance, the method includes processing present CAN payload data, an immediately previously received CAN payload data, and a time data indicating a time interval between receiving the present CAN payload data and the immediately previously received CAN payload data for determining a rate of change of CAN payload data over time, i.e., fuel rate data. The fuel rate data many be stored as CAN payload data in the roller buffer simultaneously with the present fourth reference data and fifth reference data.

Figure 31A:
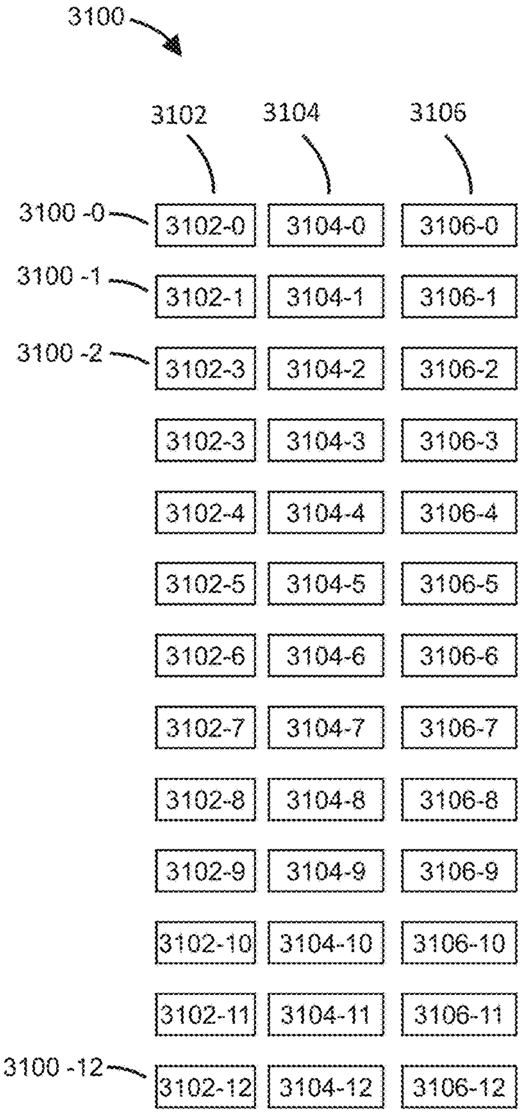
FIG. 31A depicts a conceptual diagram of data, including CAN payload data, fourth reference data, and fifth reference data received by a monitoring device at predefined intervals.

For example, shown in FIG. 31A is a conceptual diagram of data 3100, including CAN payload data 3106, fourth reference data 3102, and fifth reference data 3104 received by monitoring device 402 at predefined intervals, for example, 1 second intervals. Time data is indicative of 1 second. Data 3100 in FIG. 31A is presented in a time ordered sequence. For example, monitoring device 402 initially receives data 3100-0, a second later it receives data 3100-1, a second after that it receives data 3100-2, and so on.

Figure 31B:
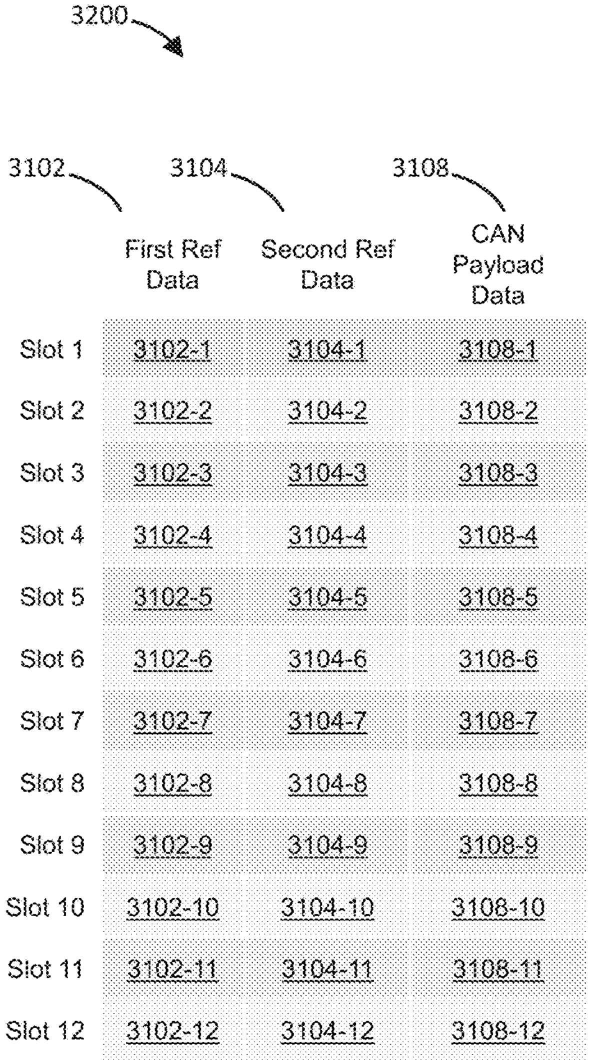
FIG. 31B depicts a conceptual diagram of a rolling buffer.

FIG. 31B shows a conceptual diagram of a rolling buffer, rolling buffer 3200, having a size of 12, i.e., 12 slots.

Upon receiving data 3100-0, including CAN payload data 3106-0, fourth reference data 3102-0, and fifth reference data 3104-0, monitoring device 402 saves a copy of present CAN payload data 3106-0, for future use.

Next, monitoring device receives data 3100-1, including CAN payload data 3106-1, fourth reference data 3102-1, and fifth reference data 3104-1 and stores fourth reference data 3102-1 and fifth reference data 3106-1 in slot 1 of rolling buffer 3200 as shown.

Monitoring device 402 processes immediately previously received CAN payload data 3106, present CAN payload data 3106-1 and time data indicating 1 second, for determining a CAN payload data representing fuel rate data.

For example, CAN payload data 3106-0 represents an accumulated fuel consumption of 2000 L, and CAN payload data 3106-1 and represents accumulated fuel consumption of 2000.01 L. CAN payload data 3106-0 and CAN payload data 3106-1 were collected 1 s apart. Monitoring device 402 determines a fuel rate of (2000.01 L−2000 L)/1 s=0.01 L/s. As such, monitoring device 402 stores CAN payload data 3108-1 representing 0.01 L/s in slot 1 of rolling buffer 3200.

Monitoring device 402 maintains a copy of the present CAN payload data 3106-1 for determining a fuel rate for the vehicle based thereon and the next immediately received CAN payload data 3106-2.

Monitoring device 402 repeats the steps described above until all 12 slots of the rolling buffer are filled.

For descriptive purposes, an immediately previously received CAN payload data and present CAN payload data is processed for determining fuel rate data. Alternatively, one or more bytes of CAN payload data may be processed for determining fuel rate data.

For example, a byte in byte position [0] of a present CAN payload data represents 36,024.56 L of accumulated fuel consumption and a byte in byte position [0] of an immediately previously received CAN payload data represents 36,024.52 L accumulated fuel consumption. Monitoring device 402 determines a fuel rate of (36,024.56 L−36,024.52 L)/1 s=0.04 L/s. In this example, fuel rate data indicative of the fuel rate is stored in byte position [0] of CAN payload data in a same slot of a rolling buffer as present fourth reference data and fifth reference data. Monitoring device 402 may proceed to process one or more bytes in byte positions [1] to [7] as described herein above.

Included in the discussion above are a series of flow charts showing the steps and acts of various processes. The processing and decision blocks of the flow charts above represent steps and acts that may be included in algorithms that carry out these various processes. Algorithms derived from these processes may be implemented as software integrated with and directing the operation of one or more processors, may be implemented as functionally-equivalent circuits such as a Digital Signal Processing (DSP) circuit, a Field Programmable Gate Array (FPGA), an Application-Specific Integrated Circuit (ASIC), or may be implemented in any other suitable manner. It should be appreciated that the flow charts included herein do not depict the syntax or operation of any circuit or of any programming language or type of programming language. Rather, the flow charts illustrate the functional information one skilled in the art may use to fabricate circuits or to implement computer software algorithms to perform the processing of an apparatus carrying out the types of techniques described herein. It should also be appreciated that, unless otherwise indicated herein, the sequence of steps and/or acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, embedded code, or any other suitable type of computer code. Such computer-executable instructions may be written using any of several suitable programming languages and/or programming or scripting tools and may be compiled as executable machine language code or intermediate code that is executed on a framework or virtual machine.

Computer-executable instructions implementing the techniques described herein may, in some embodiments, be encoded on one or more computer-readable media to provide functionality to the media. Computer-readable media include magnetic media such as a hard disk drive, optical media such as a Compact Disk (CD) or a Digital Versatile Disk (DVD), Blu-Ray disk, a persistent or non-persistent solid-state memory (e.g., Flash memory, Magnetic RAM, etc.), or any other suitable storage media. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

Embodiments have been described where the techniques are implemented in circuitry and/or computer-executable instructions. It should be appreciated that some embodiments may be in the form of a method or process, of which at least one example has been provided. The acts performed as part of the method or process may be ordered in any suitable way. Accordingly, embodiments may be constructed in which acts are performed in an order different than illustrated, which may include performing some acts simultaneously, even though shown as sequential acts in illustrative embodiments. Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

It should be understood that aspects are described herein with reference to certain illustrative embodiments. The illustrative embodiments described herein are not necessarily intended to show all aspects, but rather are used to describe a few illustrative embodiments. Thus, aspects described herein are not intended to be construed narrowly in view of the illustrative embodiments. In addition, it should be understood that certain features disclosed herein might be used alone or in any suitable combination with other features.

TECHNICAL EFFECTS

Embodiments described herein provide one or more technical effects and improvements to a telematics system, fleet management system and underlying technology components. For example, an ability to identify manufacturer-specific controller-area network data not defined in vehicle bus standards, unique to a vehicle type, and generally obfuscated from non-OEM parties, e.g., $3^{rd}$ parties, vehicle monitoring devices for enabling remote identification of manufacturer-specific CAN data; spontaneous remote identification of manufacturer-specific CAN data for a new vehicle type added to a telematics system, including new vehicle types added to the vehicle market; a telematics system enabling parallel remote identification of manufacturer-specific CAN data for hundreds, thousands, or tens of thousands of vehicles and vehicle types; leveraging remote communication with a large number of vehicles monitoring devices for enabling parallel remote identification of manufacturer-specific CAN data for hundreds, thousands, or tens of thousands of vehicles and vehicle types; once manufacturer-specific CAN data for a vehicle type is identified, automatic collection thereof, automatic collection and transmission thereof to a fleet manager, and automatic reconfiguration of monitoring devices for collection and transmission of newly identified manufacturer-specific CAN data.

What is claimed is:

1. A method for identifying manufacturer-specific controller area network (CAN) data for a first vehicle type of a plurality of vehicle types comprising:

a plurality of first subprocesses, a first subprocess comprising, collecting CAN payload data corresponding to a first CAN ID;

collecting first reference data corresponding to a second CAN ID having at least a first correlation relationship with the manufacturer-specific CAN data;

storing the first reference data and the CAN payload data in a rolling buffer;

following receipt of new first reference data and new CAN payload data, determining whether the first reference data present in the rolling buffer meets a first criterion;

in response to determining the first reference data present in the rolling buffer meeting the first criterion, determining whether one or more first subsets of the CAN payload data present in the rolling buffer meets a second criterion, each of the one or more first subsets occupying a first byte position in each slot of the rolling buffer;

dependent on first reference data meeting the first criterion exceeding a first counting threshold, for each of the one or more first subsets meeting the second criterion exceeding a second counting threshold, forming first position data indicative of the first byte position in each slot of the rolling buffer occupied thereby;

forming first candidate data indicative of a first candidate of the manufacturer-specific CAN data corresponding to the first position data and the first CAN ID;

a second subprocess comprising, selecting a subset of a plurality of the first candidate data corresponding to the first vehicle type to form second candidate data;

selecting from the second candidate data a second candidate; and generating identification data corresponding to the identity of the manufacturer-specific CAN data for the first vehicle type, the identification data indicative of a manufacturer-specific CAN data byte position and corresponding manufacturer-specific CAN data CAN ID associated with the second candidate data.

2. The method of claim 1 comprising reiterating the plurality of first subprocesses for a plurality of first CAN IDs.

3. The method of claim 2 wherein the first byte position includes a plurality of byte positions.

4. The method of claim 2 wherein the first criterion and the second criterion are indicative of the at least first correlation relationship.

5. The method of claim 2 wherein determining whether the first reference data present in the rolling buffer meets a first criterion comprises determining whether the first reference data in each slot in the rolling buffer exceeds an immediately previously received first reference data by at least a first predefined threshold.

6. The method of claim 2 wherein determining whether the first reference data present in the rolling buffer meets a first criterion comprises determining whether a value represented by the first reference data in each slot in the rolling buffer exceeds a value represented by an immediately previously received first reference data by at least a first predefined threshold.

7. The method of claim 2 wherein determining one or more first subsets of the CAN payload data meets a second criterion comprises determining for each subset thereof, whether a difference between each consecutive pair of bytes in the first byte position of the rolling buffer exceeds a second predefined threshold.

8. The method of claim 2 wherein collecting first reference data having at least a first correlation relationship with the manufacturer-specific CAN data comprises collecting first reference data having a first correlation relationship with the manufacturer-specific CAN data and collecting first reference data having a second correlation relationship with the manufacturer-specific CAN data.

9. The method of claim 8 comprising following receipt of the new first reference data and the new CAN payload data, determining whether the first reference data present in the rolling buffer meets a third criterion;

in response to determining the first reference data present in the rolling buffer meeting the third criterion, determining whether one or more second subsets of the CAN payload data present in the rolling buffer meets a fourth criterion, each of the one or more second subsets occupying a second byte position in each slot of the rolling buffer;

dependent on the first reference data meeting a third criterion exceeding a third counting threshold, for each of the one or more second subsets meeting the fourth criterion exceeding a fourth counting threshold, forming second position data indicative of the second byte position in each slot of the rolling buffer occupied thereby; and wherein forming first candidate data indicative of the first position data and the first CAN ID comprises forming first candidate dependent on the first byte position of the first position data and the second byte position of the second position data being same, and the first CAN ID.

10. The method of claim 9 wherein the third criterion and the fourth criterion are indicative of the second correlation relationship.

11. The method of claim 9 wherein determining whether the first reference data in the rolling buffer meets a third criterion comprises determining whether a value represented by the first reference data in each slot of the rolling buffer is within a predefined value of the average value represented thereby.

12. The method of claim 9 wherein determining whether one or more second subsets of the CAN payload data present in the rolling buffer meets a fourth criterion comprises determining whether the relative difference in value of the one or more second subsets in each slot of the rolling buffer.

13. The method according to claim 8 wherein collecting first reference data having a second correlation relationship with the manufacturer-specific CAN data comprises collecting first reference data and second reference data having a second correlation relationship with the manufacturer-specific CAN data.

14. The method according to claim 9 comprising collecting a plurality of second reference data corresponding to a third CAN ID having at least a second correlation relationship with the first reference data and the manufacturer-specific CAN data;

storing the second reference data in the rolling buffer;

following receipt of the new first reference data, new second reference data and the new CAN payload data, determining whether the first reference data present in the rolling buffer meets a fifth criterion and the second reference data present in the rolling buffer meets a sixth criterion;

in response to determining the first reference data present in the rolling buffer meeting the fifth criterion and the second reference data present in the rolling buffer meeting the sixth criterion, determining whether one or more second subsets of the CAN payload data present in the rolling buffer meets a fourth criterion, each of the one or more second subsets occupying a second byte position in each slot of the rolling buffer;

dependent on the first reference data meeting a fifth criterion and the second reference data meeting the sixth criterion exceeding a third counting threshold, for each of the one or more second subsets meeting the fourth criterion exceeding a fourth counting threshold, forming second position data indicative of the second byte position in each slot of the rolling buffer occupied thereby; and wherein forming first candidate data indicative of the first position data and the first CAN ID comprises forming first candidate dependent on the first byte position of the first position data and the second byte position of the second position data being same, and the first CAN ID.

15. The method of claim 14 wherein the fourth criterion, fifth criterion and the sixth criterion are indicative of the second correlation relationship.

16. The method of claim 14 wherein determining whether the first reference data present in the rolling buffer meets a fifth criterion comprises determining whether the value represented by first reference data in each slot of the rolling buffer is within a predefined value of the average thereof.

17. The method of claim 2 wherein the first reference data includes first reference data corresponding to a second CAN ID and second reference data corresponding to a third CAN ID, the first reference data and the second reference data having at least a first correlation relationship with the manufacturer-specific CAN data.

18. The method of claim 17 wherein determining whether the first reference data present in the rolling buffer meets a first criterion comprises determining whether the first reference data and the second reference data in the rolling buffer meets a first criterion.

19. The method of claim 2 wherein collecting first reference data having at least a first correlation relationship with the manufacturer-specific CAN data comprises collecting first reference data and second reference data having a first correlation relationship with the manufacturer-specific CAN data.

20. The method of claim 2 wherein selecting from the second candidate data a second candidate comprises selecting a second candidate indicated in the greatest number of instances of the second candidate data.

* * * * *